US008671387B2

(12) United States Patent
Quine

(10) Patent No.: US 8,671,387 B2
(45) Date of Patent: Mar. 11, 2014

(54) COMPILATION AND INJECTION OF SCRIPTS IN A RAPID APPLICATION DEVELOPMENT

(75) Inventor: Daniel Nicholas Quine, London (GB)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 13/106,191

(22) Filed: May 12, 2011

(65) Prior Publication Data

US 2012/0291005 A1 Nov. 15, 2012

(51) Int. Cl.
*G06F 9/44* (2006.01)

(52) U.S. Cl.
USPC ........... 717/105; 717/109; 717/113; 717/115; 717/125

(58) Field of Classification Search
USPC .......................................... 717/100–125, 140
See application file for complete search history.

(56) References Cited

U.S. PATENT DOCUMENTS

| 5,548,703 | A | 8/1996 | Berry et al. |
|---|---|---|---|
| 5,673,401 | A | 9/1997 | Volk et al. |
| 6,061,696 | A | 5/2000 | Lee et al. |
| 6,256,030 | B1 | 7/2001 | Berry et al. |
| 6,510,468 | B1 | 1/2003 | Hayne |
| 6,668,354 | B1 | 12/2003 | Chen et al. |
| 6,678,882 | B1 | 1/2004 | Hurley et al. |
| 6,928,610 | B2 | 8/2005 | Brintzenhofe et al. |
| 6,981,209 | B1 | 12/2005 | Parikh et al. |
| 7,117,433 | B1 | 10/2006 | Glaser et al. |
| 7,131,057 | B1 | 10/2006 | Ferrucci et al. |
| 7,134,086 | B2 | 11/2006 | Kodosky |
| 7,155,676 | B2 | 12/2006 | Land et al. |
| 7,437,614 | B2 * | 10/2008 | Haswell et al. ............ 714/38.13 |
| 7,568,178 | B2 | 7/2009 | Moriat |
| 7,788,579 | B2 | 8/2010 | Berkner et al. |
| 8,302,074 | B1 * | 10/2012 | Waldorf ........................ 717/110 |
| 2003/0212987 | A1 | 11/2003 | Demuth et al. |
| 2003/0226111 | A1 | 12/2003 | Wirts et al. |

(Continued)

FOREIGN PATENT DOCUMENTS

WO 01/02928 1/2001

OTHER PUBLICATIONS

Microsoft Access from Wikipeida, the Free Encyclopedia, http://en.wikipedia.org/wiki/Microsoft_Access, Feb. 15, 2011, pp. 1-13.

(Continued)

*Primary Examiner* — Don Wong
*Assistant Examiner* — Marina Lee
(74) *Attorney, Agent, or Firm* — Birch, Stewart, Kolasch & Birch, LLP

(57) ABSTRACT

Systems, computer-readable media, and methods are disclosed for generating compiled scripts from scripts that include at least one scripting-language instruction. The least one scripting-language instruction may include a script extension to specify a computational model of the application and/or a method extension to specify a function of the computational model. The script extension may be identified within the at least one scripting-language instruction and an identifier for the computational model specified by the script extension may be determined. A compiled script may be generated that includes scripting-language code for replacing the script extension by an access of the computational model identified by the identifier. The application may be executed by locating a compiled script for the application based on an identifier assigned to the compiled script, injecting the compiled script into the application, and executing the injected script in the application.

20 Claims, 33 Drawing Sheets

(56) References Cited

U.S. PATENT DOCUMENTS

| | | | |
|---|---|---|---|
| 2003/0236577 A1* | 12/2003 | Clinton | 700/10 |
| 2004/0258299 A1 | 12/2004 | Proteau et al. | |
| 2004/0268299 A1 | 12/2004 | Lei et al. | |
| 2006/0015842 A1* | 1/2006 | DeSantis | 717/106 |
| 2006/0075382 A1 | 4/2006 | Shaburov | |
| 2007/0005634 A1 | 1/2007 | Selca et al. | |
| 2007/0089089 A1* | 4/2007 | Kelly et al. | 717/110 |
| 2007/0168933 A1 | 7/2007 | Berger et al. | |
| 2008/0189682 A1* | 8/2008 | Rude | 717/111 |
| 2009/0007056 A1* | 1/2009 | Prigge et al. | 717/104 |
| 2009/0328010 A1* | 12/2009 | Cao et al. | 717/139 |
| 2010/0146481 A1 | 6/2010 | Binder et al. | |
| 2012/0192069 A1* | 7/2012 | Zhang et al. | 715/704 |
| 2012/0290940 A1* | 11/2012 | Quine | 715/744 |
| 2012/0290955 A1* | 11/2012 | Quine | 715/763 |
| 2012/0290959 A1* | 11/2012 | Quine | 715/765 |
| 2012/0291005 A1* | 11/2012 | Quine | 717/105 |
| 2012/0291006 A1* | 11/2012 | Quine | 717/105 |
| 2012/0291011 A1* | 11/2012 | Quine | 717/115 |

OTHER PUBLICATIONS

Welcome to Eclipse, http://help.eclipse.org/helios/index.jsp?topic=/org.eclipse.platform.doc.isv/guide/int.htm, Feb. 15, 2011, pp. 1-4.

Visual Basic.NET from Wikipedia, the Free Encyclopedia, http://en.wikipedia.org/wik/Visual_Basic_.NET, pp. 1-10.

The ADO.NET Entity Framework Overview, Visual Studio 2005, http://msdn.microsoft.com/en-us/library/aa697427 (v=vs.80).aspx, Feb. 15, 2011, pp. 1-23.

JavaScript, from Wikipedia, the Free Encyclopedia, http://en.wikipedia.org/wiki/JavaScript, Feb. 15, 2011, pp. 1-13.

IntelliJ IDEA—The Most Intelligent Java IDE, http://www.jetbrains.com/idea/, Feb. 15, 2011, pp. 1-3.

Clark, Doug, Introducing EclipseLink, Eclipse Zone, Introducing EclipseLink/Eclipse Zone, Jun. 30, 2008, pp. 1-3.

HyperTalk from Wikipedia, the Free Encyclopedia, http://en.wikipedia.org/wiki/HyperTalk, Feb. 15, 2011, pp. 1-4.

HyperCard from Wikipedia, the Free Encyclopedia, http://en.wikipedia.org/wiki/HyperCard, Feb. 15, 2011, pp. 1-10.

Hibernate (Java) from Wikipedia, the Free Encyclopedia, http://en.wikipedia.org/wiki/Hibernate_(Java), Feb. 15, 2011, pp. 1-5.

Google Code, Google Web Toolkit Overview—Google, http://code.google.com/webtoolkit/overview.html, Feb. 15, 2011, pp. 1-2.

FileMaker from Wikipedia, the Free Encyclopedia, http://en.wikipedia.org/wiki/FileMaker, Feb. 15, 2011, pp. 1-8.

EclipseLink from Wikipedia, the Free Encyclopedia, http://en.wikipedia.org/wiki/EclipseLink, Feb. 15, 2011, pp. 1-2.

Google Code, Google Web Toolkit, Developer's Guide—Accessing the Browser's DOM, http://code.google.com/webtoolkit/doc/latest/DevGuideUiDom.html, Feb. 15, 2011, pp. 1-4.

Embarcadero Delphi from Wikipedia, the Free Encyclopedia, htt://en.wikipedia.org/wiki/Embarcadero-Delphi, Feb. 16, 2011, pp. 1-11.

Zoho Quick Start Guide, https://help.creator.zoho.com/Quick-Start-Guide.html, Feb. 15, 2011, pp. 1-22.

The Omni Group, Omni Graffle 5 Professional Manual, copyright 2000-2008, pp. 1-100.

David, Pascal et al., Redbooks Wiki: Building Domino Web Applications Using Domino 8.5.1, pp. 1-404.

Quine, Daniel Nicholas, U.S. Appl. No. 13/106,112, filed May 12, 2011, "Data Model Generation Based on User Interface Specification".

Quine, Daniel Nicholas, U.S. Appl. No. 13/106,134, filed May 12, 2011, "Creation and Configuration of Compound Widgets".

Quine, Daniel Nicholas, U.S. Appl. No. 13/106,170, filed May 12, 2011, "Layout Management in a Rapid Application Development Tool".

Quine, Daniel Nicholas, U.S. Appl. No. 13/106,212, filed May 12, 2011, "User Interface to Assist in Creating Application Scripts".

Quine, Daniel Nicholas, U.S. Appl. No. 13/106,214, filed May 12, 2011, "Development Architecture for Cloud-Based Applications".

International Search Report and Written Opinion for PCT/US2012/03040 mailed Jul. 5, 2012 (11 pages).

* cited by examiner

COMPILATION AND INJECTION OF SCRIPTS IN A RAPID APPLICATION DEVELOPMENT

BACKGROUND

Cloud-based computing generally refers to networked computer architectures in which application execution and storage are divided, to some extent, between client and server devices. In contrast to a predominately client-based or server-based application, a cloud-based application may store copies of data and/or executable program logic at remote server devices, while allowing client devices to download at least some of this data and program logic as needed for execution at the client device. An advantage of this approach is that the downloaded data and program logic can be tailored to the capabilities of the specific client device (e.g., a personal computer, tablet, or mobile phone) accessing the cloud based application.

An example class of application that can exploit the benefits of cloud-based computing is data-driven web-based services. Included in this class of applications are, for example, email, office productivity suites, blogs, online stores, games, as well as other types of networked applications. However, the development of these data-driven cloud-based applications often requires complex and time consuming programming and database design.

Attempts have been made to simplify the development of cloud-based applications. For example, rapid application development (RAD) tools have been offered. RAD tools are typically integrated development environments that assist a designer (e.g., a software architect and/or a programmer) in developing software applications by generating program logic based on high-level descriptions of what the designer wants to achieve. However, existing RAD tools used to develop data-driven cloud-based applications require designers to be proficient in computer programming and know how to design and manage databases. Additionally, these existing RAD tools often take the form of large, complex client-based applications that a designer must download and install on his or her computer. Furthermore, once the designer completes a version of the cloud-based application, the designer still has to move the cloud-based application to a web site for testing and public use.

SUMMARY

In order to simplify rapid application development (RAD) tools for cloud-based data-driven application, systems, devices, and methods for a software architecture and development environment that facilitates rapid development of data-driven cloud-based applications are presented herein. Through the use of graphical user interface (GUI) functions, individuals with little or no computer programming experience can develop dynamic web sites with persistent data storage. However, there is no limit to the complexity of web sites that could be developed with these tools. Thus, even more experienced designers could find these development environment GUI functions useful and time-saving. Additionally, the same software architecture may be used for both development and execution of cloud-based applications in order to minimize any discrepancies between the interfaces and functions as developed by their designer and those provided to the end-user application executing in the cloud.

The software architecture may be divided into components that are placed in a client software platform (e.g., a web browser) and those that are placed in a cloud-based server device. Designer interactions with the software architecture may occur via a client-based execution platform that may include a development environment GUI. This development environment GUI allows cloud-based applications to be developed in a what-you-see-is-what-you-get (WYSIWYG) fashion.

Each cloud-based application may be represented as a "stack" of related pages. Each page may contain metadata (e.g., one or more names, keywords, identifiers, etc.), one or more widgets (each of which may be associated with a size, a spatial location, a color, a font, an image, an identifier, an action, and/or other characteristics), and a set of scripts. From design mode, the designer may drag and drop widgets on a page, assign functions to these widgets, and associate the page metadata, widgets, and scripts with one another to form a cloud-based application. The client platform may represent this information, as well as any other information associated with each page, in an abstraction called the application model.

Data associated with the cloud-based application may be stored in a database model. The database model may consist of a database schema including at least one database table per page, with each unit of page metadata or widget associated with an automatically typed field in the database table. The database model can also be extended by the scripts. Advantageously, the designer can create and update the database substantially in real-time by using the development environment GUI to modify the cloud-based application. Further, the designer need not be aware of the database or its structure during cloud-based application development.

When developing the cloud-based application, the designer may use a design mode of the execution platform. The execution platform, in turn, may periodically or from time to time contact the server device to update representations of the application model and/or the data model that are stored at the server device. The server device may automatically store copies of the application model and data model. Thus, a cloud-based application's user interface design and program logic (as represented in the application model) and database schema and content (as represented in the database model) may be stored on the server device. When needed by a client device, the server device may deliver copies of at least part of these models to the execution platform on the client device for interpretation and/or execution.

When the designer wishes to test the cloud-based application, the designer may switch from the design mode to a preview mode. Unlike traditional software development tools, the designer may not be required to first compile, link, and distribute the cloud-based application before previewing its operation in the preview mode. Since the application model and data model are automatically stored on the server device, the designer can switch back and forth from design mode to preview mode while the cloud-based application is running. Any changes made in design mode may be reflected in near real-time in the previewed cloud-based application.

The designer can further publish the cloud-based application to a public or private Uniform Resource Locator (URL) so that users can access the published cloud-based application in run mode. Like in preview mode, changes made in design mode may be subsequently reflected in near real-time in instances of the cloud-based application that are in run mode.

Accordingly, in an example embodiment, a computing device may display, via a graphical development environment, a user interface of an application. The graphical development environment may have access to an application model and a data model. The application model may include program logic of the application and a representation of the user interface of the application, while the data model may include a database schema for storing data used by the application.

Perhaps via the graphical development environment, the computing device may receive a change to the application. In response to the change, the computing device may apply modifications to at least one of the application model and the data model to incorporate the change. Then, the computing device may automatically transmit a representation of at least some of the modifications to a server device for storage.

In another example embodiment, the cloud-based application's designer-created application GUI may form the basis for an automatically created database schema for the cloud-based application. Thus, a computing device may display at least part of the application GUI. The application GUI may include a page, and the page may include a widget. The computing device may create a database schema, based on the application GUI, such that the database schema includes data defining a relationship between the page and the widget. For instance, the database schema may include a database table for the page, and the database table may include a field for the widget.

In still another example embodiment, a computing device may receive a cloud-based application. The cloud-based application may include a stack with one or more pages for a user interface for the application and a database. The computing device may execute the application by locating a compiled script for the application based on a global identifier assigned to the compiled script. The global identifier may include an application identifier for specifically identifying the application in a plurality of applications and an object identifier for specifically identifying an object of a computational model. The computational model may be either the stack or the database. The compiled script may include a scripting language instruction for the application, and may inject the compiled script into the application. Then, the injected script may be executed as part of the application to perform at least one transaction of the computational model.

In an additional example embodiment, a script containing scripting language instructions may be created via a computing device using a guided script editor. The guided script editor may include a statement control, a variable control, and a script area. The guided script editor may be configured to generate one or more conversational statements of a non-programming language that are equivalent to the generated scripting language instruction. The generated scripting language instruction may be added to the script of scripting language instructions. The script of scripting language instructions, including the added scripting language instruction, may be stored via the computing device.

In a further example embodiment, an editor window may be displayed via a computing device. The editor window may include an editing area and an assistance button. The editor window may be configured to allow for editing a script including one or more scripting language instructions. The computing device may determine that the assistance button has been selected by the designer to request assistance with a particular scripting-language instruction, and an assistance display may be displayed as a result. The assistance display may be related to the particular scripting language instruction. Input may be received at the computing device via the assistance display and the particular scripting language instruction may be generated in response to the received input. The particular scripting language instruction may be added to the script, and the script may be stored.

In another example embodiment, a graphical development environment may depict a representation of one or more pages and a plurality of widgets, each of the widgets including one or more graphical display sub-components (e.g., visual characteristics) and a computer-executable functional characteristic. Responsive to receiving a first instruction, a compound widget may be created from a plurality of selected widgets, and may incorporate one or more graphical display sub-components of each selected widget and one or more functional characteristics of each selected widget. Responsive to receiving a second instruction, the compound widget may be instantiated a plurality of times in the representation of the one or more pages. Each of the instantiated compound widgets includes at least one characteristic that is shared across all instances of the compound widget such that an update to one instantiation of the compound widget updates all instantiations of the compound widget. Each of the instantiated compound widgets may also include at least one characteristic that is specific to a particular instance of the compound widget. When an update to the widget is received, a determination may be made of whether the update is to a shared characteristic (and thus might be propagated to all other instances) or whether the update is to a specific characteristic (and thus might not be propagated to all other instances).

In still another example embodiment, a graphical development environment may depict a representation of one or more pages and a plurality of widgets, each widget including one or more graphical display sub-components and a computer executable functional characteristic. Layout tools may be provided to aid a designer in laying out and defining inter-relationships of widgets (including compound widgets) and groups of widgets for each page. In one example, a most significant sub-component border determination may be made for each widget. Then, a grouping relationship determined between each of a plurality of the widgets. Finally, for each widget in each determined group, the widgets may be aligned based on the determined most significant sub-component border of each widget in the group.

In an additional example embodiment, a first set of connections is identified. This first set may include (i) connections between pairs of widgets that do not belong to a group of widgets, (ii) connections between groups of widgets and widgets that do not belong to a group of widgets, and (iii) connections between groups of widgets. Each connection in the first set is then assigned a default connection weight. Each connection that attaches to a group of widgets, as opposed to a single widget, has its relative assigned weight raised. Then, a multiplier is applied to each connection in the first set relative to a distance that the connection travels. The resulting weights of the connections in the first set are compared to a first threshold value, and a second set of connections identified including those connections from the first set having a weight that meets the first threshold (or, in another embodiment, does not meet the first threshold). The remaining connections in the second set are then compared to a second threshold value. Based on the relationship between the weight of each connection in the second set and the second threshold value, each connection in the second set is stored as either one of (i) a fixed distance connection that does not vary based on a size of the screen or window on which the representation of the page is rendered or (ii) a proportional distance connection that does vary based on a size of the screen or window on which the representation of the page is rendered.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Figure 1:
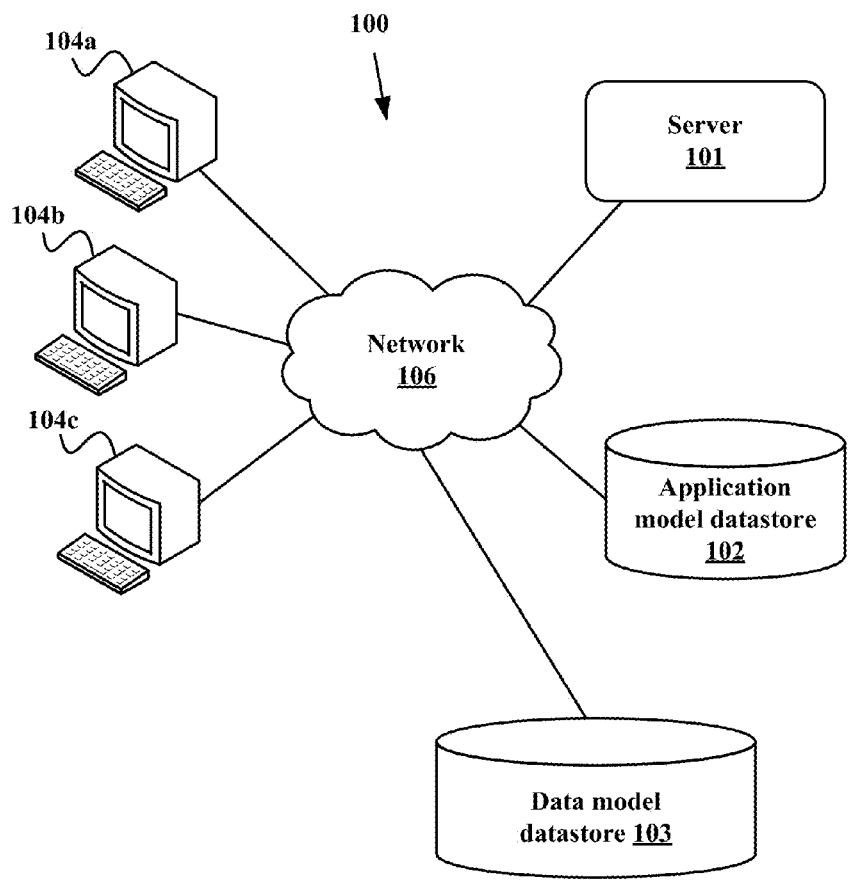
FIG. 1 depicts a distributed computing architecture in accordance with an example embodiment.

The following detailed description describes various features and functions of the disclosed systems, devices, and methods with reference to the accompanying figures. However, the illustrative embodiments described herein are not meant to be limiting. It will be readily understood that certain aspects of the disclosed systems, devices, and methods can be arranged and combined in a wide variety of different configurations, all of which are contemplated herein.

1. DISTRIBUTED COMPUTING ARCHITECTURE OVERVIEW

A distributed computing system may allow two or more distributed or co-located computing devices to coordinate their activities in order to achieve a particular goal or result. This coordination may occur via a network (e.g., a local area network, a wide area network, and/or the Internet) or some other form of communicative coupling. With the continued reduction in costs of computer storage (e.g., random access memory, solid state memory, and hard drives) and always-on, networking computing devices (e.g., personal computers (PCs), laptops, tablet devices, and cell phones), new techniques can be employed to take advantage of distributed computing systems.

In particular, cloud-based computing is a term that can refer to distributed computing architectures in which the data and program logic for a cloud-based application are shared between one or more client devices and server devices on a near real-time basis. Parts of this data and program logic may be dynamically delivered, as needed or otherwise, to various clients accessing the cloud-based application. Details of the architecture may be transparent to the users of client devices. Thus, a PC user accessing a cloud-based application may not be aware that the PC downloads program logic and/or data from the server devices, or that the PC offloads processing or storage functions to the server devices.

Advantageously, the cloud-based application may execute primarily or entirely in a web browser already installed on the client device. Thus, the user may not need to download, install, and manage client software for the cloud-based application in a traditional manner. The web browser may be a standard web browser that is capable of executing program logic consistent with one or more scripting and/or markup languages such as the JAVASCRIPT® scripting language, the HyperText Markup Language (HTML) version 3, 4, and/or 5, the eXtended Markup Language (XML), and so on. Alternatively or additionally, the web browser could be capable of supporting other scripting languages and/or markup languages.

Some advantages of a cloud-based application can be illustrated in the following example of a cloud-based email application. In this example, a user with an email account at a service provider may be able to log on to that email account from a PC web browser. As part of the process of logging on, or soon thereafter, the web browser can contact a cloud-based server device. This server device stores the user's email spool (e.g., the user's email messages, including new messages and old messages stored for potential later use). The server device may also store the user's email settings, such as the email application's configuration options that the user has selected.

The web browser may download, from the server device, at least some of the messages in the user's email spool. The web browser may also download, from the server device, a portion of the email application's program logic and settings so that the web browser can display the email messages according to user-selected settings. For example, the web browser, in accordance with user-selected settings, may display the user's email folders on the left side column of the browser's window, and display a listing of the email messages in main portion of the browser's window. When the user selects one of these email messages for display, the web browser may execute (or dynamically download and then execute) program logic to display the selected email message. If the selected email message has not already been downloaded, the web browser may execute program logic to download this message from the server device. If the user composes and sends an email message, the web browser may transmit a copy of the message to the server device, and the server device may, in turn, transmit the message towards its destination. The web browser may also store a copy of the message, locally or remotely, in a folder for sent mail.

The same user may also access the email application from his or her cell phone. The cell phone may also download, from the server device, application program logic and data in order to facilitate this access. However, cell phones usually have smaller screens than PCs, and usually access networks using lower-capacity wireless links than PCs (e.g., compared to wired links). Thus, the server device may determine that a cell phone is communicating with the server device, and consequently may transmit a different version of the program logic and data to the cell phone than was transmitted to the PC. This version of the program logic may use fewer communication resources (e.g., less network capacity) between the cell phone and the server device and/or have a simpler user interface designed for the cell phone's smaller screen and user interface.

An advantage of cloud-based applications, such as this example email application, is that copies of the program logic and data are stored at the server device (e.g., in the cloud). Thus, the user can switch between client devices without having to manually download and configure a client application at each client device from which the user accesses the cloud-based application. For example, the user may be able to access the email application from any device with a web browser. Further, if the user's client device is lost, stolen, or becomes unusable, the user's email is still stored at the server device, and can be accessed from any other supported client device. Thus, the user may be able to use any PC-based operating system (e.g., MICROSOFT WINDOWS®, LINUX®, or MAC OS®), any mobile operating system (e.g., IPHONE® IOS, ANDROID®, WINDOWS MOBILE®, or BLACKBERRY® OS), and/or any other computing platform now known or developed in the future to access cloud-based applications without fear of losing their data.

Additionally, the program logic that executes on the client device may enable offline access to the cloud-based application. Thus, for example, the user could download the email application's program logic and data, and then disconnect from the network(s) connecting the client device to the server device (e.g., the Internet and/or any other intervening network(s) used to access the server device). Then the user could use the email application for some time while in the offline mode. Offline mode use may allow, for example, filing of email messages in folders, replying to email messages, composing new email messages, and deleting email messages. When the client device is once again able to communicate with the server device, the email application program logic on the client device may synchronize the changes with the server device. Thus, the client device may inform the server device of the filed, replied to, composed, and/or deleted email messages. Then, the server device may update its copy of this data accordingly.

The email application described above is just one example of a cloud-based application. Other types of cloud-based applications may include office productivity suites, blogs, online stores, and/or multimedia applications. Given the distributed nature of cloud-based applications, various types of functionality included in these applications, or used to facilitate the design and execution of these applications, may also be distributed across multiple software modules and/or hardware platforms. To illustrate such a possible arrangement, FIG. 1 depicts a distributed computing architecture in accordance with an example embodiment.

In FIG. 1, a server device 101 is configured to communicate, via a network 106, with client devices 104a, 104b, and 104c. The server device 101 also has access to an application model datastore 102 and a data model datastore 103. The server device 101 may communicate with the application model datastore 102 and/or data model datastore 103 via a network 106, as shown. The network 106 may correspond to a local area network, a wide area network, a corporate intranet, the public Internet, combinations thereof, or any other type of network(s) configured to provide communication between networked computing devices. Alternatively, the application model datastore 102 and/or data model datastore 103 may be co-located with the server device 101, or may be accessible via a network separate from the network 106.

Although FIG. 1 only shows three client devices, cloud-based server devices may serve hundreds or thousands of client devices. Moreover, the client devices 104a, 104b, and 104c (or any additional client devices) may be any sort of computing device, such as an ordinary laptop computer, desktop computer, network terminal, wireless communication device (e.g., a cell phone or smart phone), and so on. In some embodiments, the client devices 104a, 104b, and 104c may be dedicated to the design and use of cloud-based applications. In other embodiments, the client devices 104a, 104b, and 104c may be general purpose computers that are not necessarily dedicated to cloud-based applications.

Similarly, as discussed below in reference to FIG. 2B, the server device 101 may include more than one computing device. Such a computing device may be based on PC hardware, rack-mounted hardware, blade-based hardware, or other types of hardware configurations.

2. COMPUTING DEVICE ARCHITECTURE

Figure 2A:
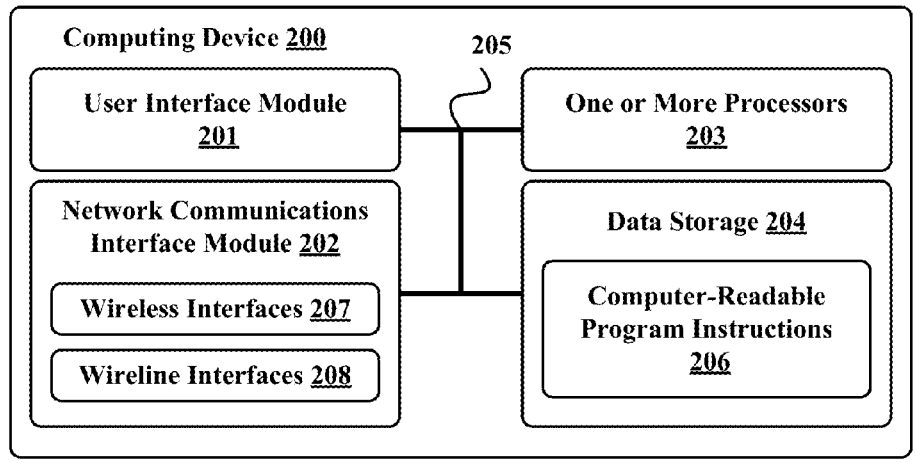
FIG. 2A is a block diagram of a computing device in accordance with an example embodiment.

FIG. 2A is a block diagram of a computing device in accordance with an example embodiment. In particular, a computing device 200 shown in FIG. 2A can be configured to perform one or more functions of the server device 101, application model datastore 102, data model datastore 103, and/or client devices 104a, 104b, and 104c. The computing device 200 may include a user interface module 201, a network-communication interface module 202, one or more processors 203, and data storage 204, all of which may be linked together via a system bus, network, or other connection mechanism 205.

The user interface module 201 may be operable to send data to and/or receive data from external user input/output devices. For example, the user interface module 201 may be configured to send/receive data to/from user input devices such as a keyboard, a keypad, a touch screen, a computer mouse, a track ball, a joystick, and/or other similar devices, now known or later developed. The user interface module 201 may also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 may also be configured to generate audible output(s), such as a speaker, speaker jack, audio output port, audio output device, earphones, and/or other similar devices, now known or later developed.

The network-communications interface module 202 may include one or more wireless interfaces 207 and/or wireline interfaces 208 that are configurable to communicate via a network, such as the network 106 shown in FIG. 1. The wireless interfaces 207 may include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wireline interfaces 208 may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline network.

In some embodiments, the network communications interface module 202 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms may be used as well or in addition to those listed herein to secure (and then decrypt/decode) communications.

The one or more processors 203 may include one or more general purpose processors and/or one or more special purpose processors (e.g., digital signal processors, application specific integrated circuits, etc.). The one or more processors 203 may be configured to execute computer-readable program instructions 206 that are contained in the data storage 204 and/or other instructions as described herein.

The data storage 204 may include one or more computer-readable storage media that can be read or accessed by at least one of the processors 203. The one or more computer-readable storage media may include volatile and/or non-volatile storage components, such as optical, magnetic, organic or other memory or disc storage, which can be integrated in whole or in part with at least one of the one or more processors 203. In some embodiments, the data storage 204 may be implemented using a single physical device (e.g., one optical, magnetic, organic or other memory or disc storage unit), while in other embodiments, the data storage 204 may be implemented using two or more physical devices.

The data storage 204 may include computer-readable program instructions 206 and perhaps additional data. In some embodiments, the data storage 204 may additionally include storage required to perform at least part of the herein-described techniques and/or at least part of the functionality of the herein-described devices and networks.

3. CLOUD-BASED SERVERS, APPLICATION MODEL, AND DATA MODEL

The server device 101, application model datastore 102, and data model datastore 103 may be cloud-based devices that store program logic and data of cloud-based applications. In some embodiments, the server device 101, application model datastore 102, and data model datastore 103 may be a single computing device residing in a single computing center. In another embodiment, the server device 101, application model datastore 102, and data model datastore 103 may include multiple computing devices in a single computing center, or even multiple computing devices located in multiple computing centers located in diverse geographic locations. For example, FIG. 1 depicts each of the server device 101, application model datastore 102, and data model datastore 103 residing in a different physical location.

In some embodiments, data stored at the server device 101, application model datastore 102, and/or data model datastore 103 may be encoded as computer readable information stored in tangible computer readable media (or computer readable storage media) and accessible by the client devices 104a, 104b, and 104c, and/or other computing devices. In some embodiments, the application model datastore 102 and/or data model datastore 103 may be a single disk drive or other tangible storage media, or for large cloud-based systems, the application model datastore 102 and/or data model datastore 103 may be implemented on multiple disk drives or other tangible storage media located at one or more diverse geographic locations.

Figure 2B:
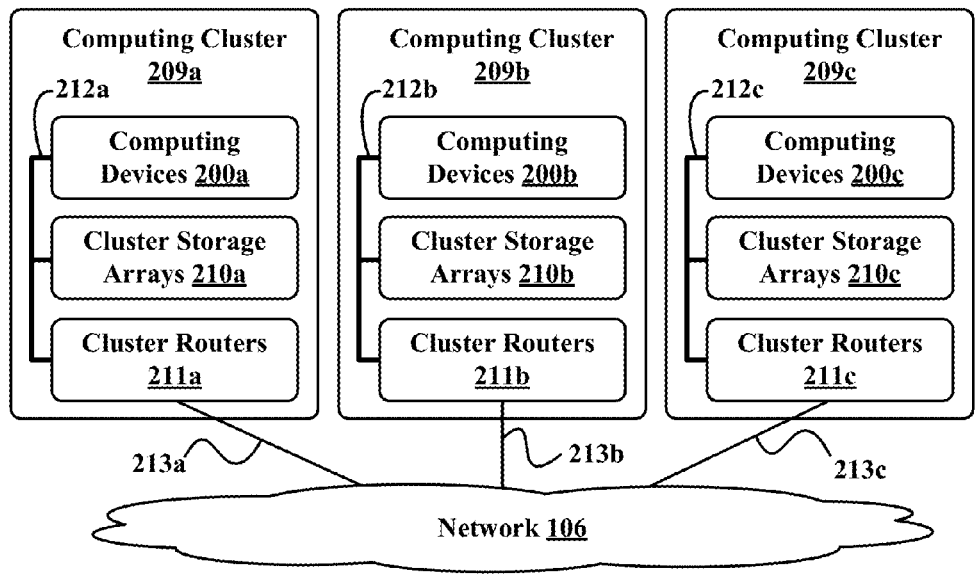
FIG. 2B depicts a cloud-based server system in accordance with an example embodiment.

FIG. 2B depicts a cloud-based server system in accordance with an example embodiment. In FIG. 2B, functions of the server device 101, application model datastore 102, and data model datastore 103 may be distributed among three computing clusters 209a, 209b, and 208c. The computing cluster 209a may include one or more computing devices 200a, cluster storage arrays 210a, and cluster routers 211a connected by a local cluster network 212a. Similarly, the computing cluster 209b may include one or more computing devices 200b, cluster storage arrays 210b, and cluster routers 211b connected by a local cluster network 212b. Likewise, the computing cluster 209c may include one or more computing devices 200c, cluster storage arrays 210c, and cluster routers 211c connected by a local cluster network 212c.

In some embodiments, each of the computing clusters 209a, 209b, and 209c may have an equal number of computing devices, an equal number of cluster storage arrays, and an equal number of cluster routers. In other embodiments, however, some or all of the computing clusters 209a, 209b, and 209c may have different numbers of computing devices, different numbers of cluster storage arrays, and/or different numbers of cluster routers. The number of computing devices, cluster storage arrays, and cluster routers in each computing cluster may depend on the computing task or tasks assigned to each computing cluster.

In the computing cluster 209a, for example, the computing devices 200a can be configured to perform various computing tasks of the server device 101. In one embodiment, the various functionalities of the server device 101 can be distributed among one or more of the computing devices 200a. For example, some of these computing devices may be configured to operate as a web server, and other computing devices may be configured to execute program logic defined by a cloud-based application. Still other computing devices of the computing cluster 209a may be configured to communicate with the application model datastore 102 and data model datastore 103. The computing devices 200b and 200c in the computing clusters 209b and 209c may be configured the same or similarly to the computing devices 200a in the computing cluster 209a.

On the other hand, in some embodiments, the computing devices 200a, 200b, and 200c each may be configured to perform different functions. For example, the computing devices 200a may be configured to perform one or more functions of the server device 101, the computing devices 200b may be configured to perform one or more functions of the application model datastore 102, and the computing devices 200c may be configured to perform one or more functions of the data model datastore 103.

The cluster storage arrays 210a, 210b, and 210c of the computing clusters 209a, 209b, and 209c may be data storage arrays that include disk array controllers configured to manage read and write access to groups of hard disk drives. The disk array controllers, alone or in conjunction with their respective computing devices, may also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of the server device 101, application model datastore 102, and/or data model datastore 103 can be distributed across the computing devices 200a, 200b, and 200c of the respective computing clusters 209a, 209b, and 209c, various active portions and/or backup/redundant portions of these components can be distributed across the cluster storage arrays 210a, 210b, and 210c. For example, some cluster storage arrays may be configured to store the data of the server device 101, while other cluster storage arrays may store the application model datastore 102, and/or data model datastore 103. Additionally, some cluster storage arrays may be configured to store backup versions of data stored in other cluster storage arrays.

The cluster routers 211a, 211b, and 211c in the computing clusters 209a, 209b, and 209c may include networking equipment configured to provide internal and external communications for the computing clusters. For example, the cluster routers 211a in the computing cluster 209a may include one or more internet switching and/or routing devices configured to provide (i) local area network communications between the computing devices 200a and the cluster storage arrays 201a via the local cluster network 212a, and/or (ii) wide area network communications between the computing cluster 209a and the computing clusters 209b and 209c via the wide area network connection 213a to the network 106. The cluster routers 211b and 211c can include network equipment similar to the cluster routers 211a, and the cluster routers 211b and 211c can perform similar networking functions for the computing clusters 209b and 209b that the cluster routers 211a perform for the computing cluster 209a.

In some embodiments, computing tasks and stored data associated with server device 101, application model datastore 102, and/or data model datastore 103 can be distributed across the computing devices 200a, 200b, and 200c. The distribution of tasks and stored data may be based at least in part on (i) the processing requirements of the server device 101, application model datastore 102, and/or data model datastore 103 functions, (ii) the processing capabilities of the computing devices 200a, 200b, and 200c, (iii) the latency of the local cluster networks 212a, 212b, and 212c and/or of the wide area network connections 213a, 213b, and 213c, and/or (iv) other factors that may contribute to the cost, speed, fault-tolerance, resiliency, efficiency, and/or other design goals of the overall system architecture.

Additionally, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of the local cluster networks 212a, 212b, 212c, the latency, throughput, and cost of the wide area network connections 213a, 213b, and 213c, and/or other factors that may contribute to the cost, speed, fault-tolerance, resiliency, efficiency and/or other design goals of the system architecture.

4. DISTRIBUTED DEVELOPMENT ARCHITECTURE

Figure 3:
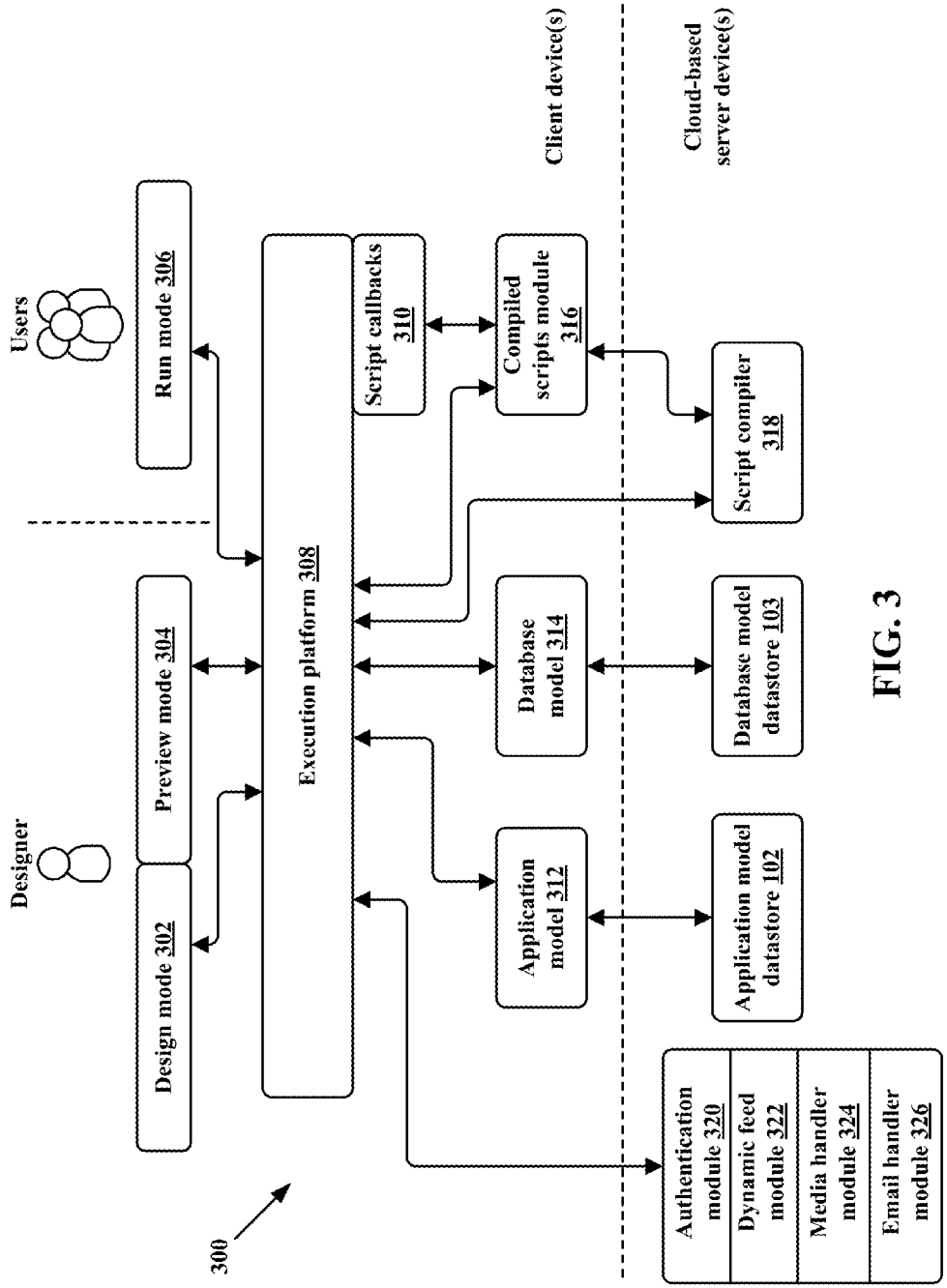
FIG. 3 is a block diagram of a distributed software architecture, in accordance with an example embodiment.

FIG. 3 is a block diagram of a development architecture, in accordance with an example embodiment. In particular, FIG. 3 shows a distributed software architecture 300 that can be used for efficient and rapid development of cloud-based applications. At a high level, the distributed software architecture 300 may include software components that reside on either a client device, such as one or more of the client devices 104a, 104b, and 104c, or on one or more cloud-based server devices. The cloud-based server devices may include multiple hardware components, and may be arranged according to the system depicted in FIG. 2B, or in other ways.

4.1 Client Software Architecture

An execution platform 308, script callbacks 310, an application model 312, a database model 314, and a compiled scripts module 316 may reside on a client device. In some embodiments, some or all of these software components may execute within a web browser or some other type of client platform (e.g., an operating system). The application model datastore 102, data model datastore 103, and script compiler 318, as well as an authentication module 320, a dynamic feed module 322, a media handler module 324, and an email handler module 326 may reside on one or more cloud-based server devices. Nonetheless, it is possible for any of these software components to be stored and/or execute on either a client device or on one or more cloud-based server devices.

Interactions with the distributed software architecture 300 may occur via the execution platform 308. To facilitate these interactions, the execution platform 308 may support multiple modes, such as a design mode 302, a preview mode 304, and a run mode 306. In the design mode 302, the execution platform 308 may visually present a GUI-based development environment. This development environment may allow a designer to develop cloud-based applications in a substantially what-you-see-is-what-you-get (WYSIWYG) fashion.

Figure 4:
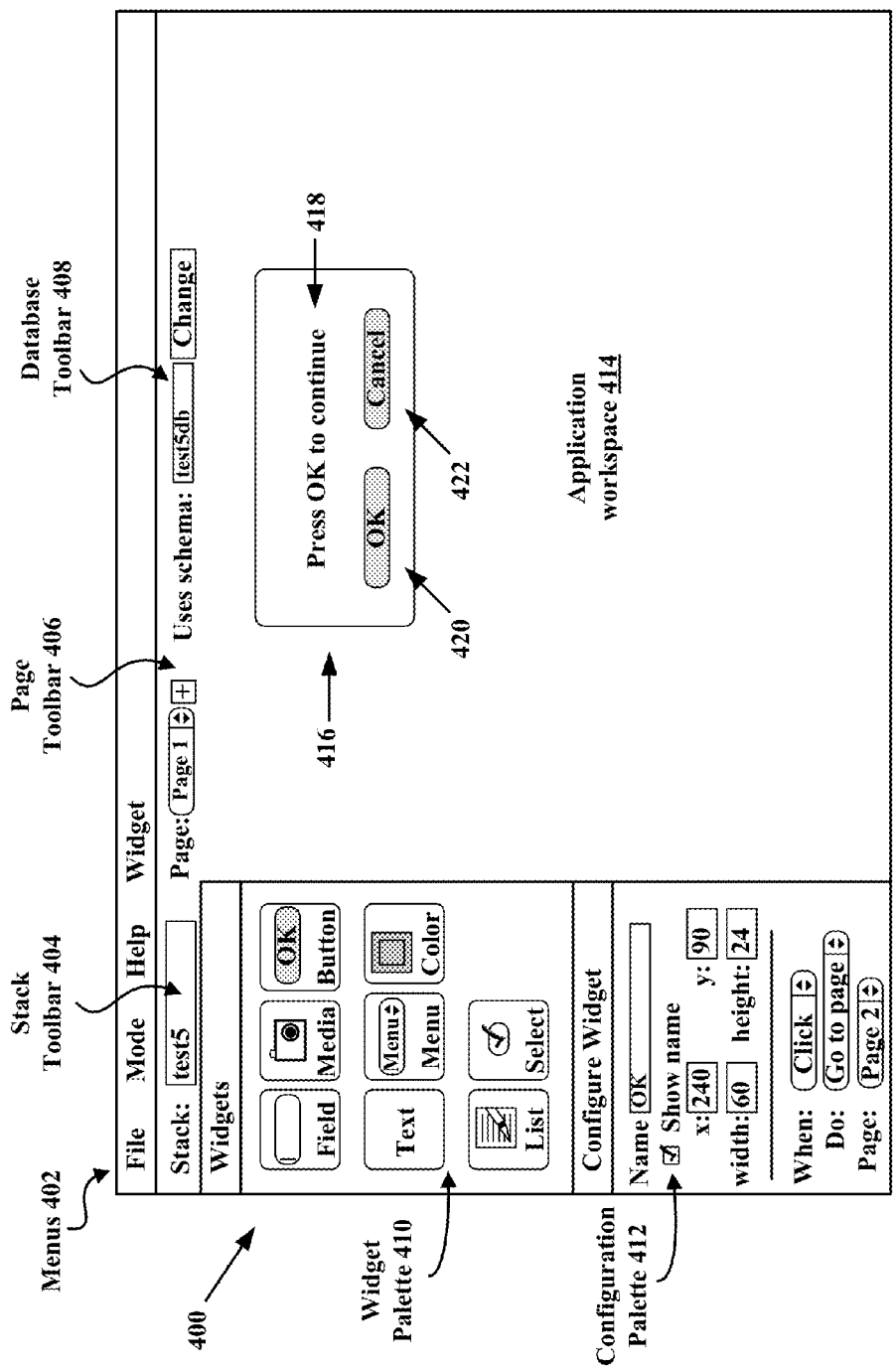
FIG. 4 depicts a development environment in accordance with an example embodiment.

FIG. 4, discussed in more detail below, provides an example view of the design mode 302.

The preview mode 304 may allow the designer to at least partially execute a cloud-based application, and to view the executing cloud-based application similar to how a user would see it. In the preview mode 304, the cloud-based application can be tested and debugged before being released for general use. For example, the preview mode 304 may enable setting breakpoints in the cloud-based application and/or enable monitoring data during execution of the cloud-based application. The design mode 302 and preview mode 304 may be able to execute in parallel. Thus, a cloud-based application executing in the preview mode 304 may automatically be updated to reflect any changes made in the design mode 302 to the cloud-based application.

The run mode 306 may allow users to execute, or otherwise interact with, the cloud-based application. To establish the run mode 306, the designer may publish the cloud-based application for user access via a URL, perhaps a public URL on the Internet. As previously discussed with respect to the preview mode 304, any changes to the cloud-based application made using the design mode 302 may be reflected in the run mode 306 in a near real-time fashion. Alternatively, these changes may not be immediately reflected in the run mode 306. For example, instances of the cloud-based application executing in the run mode 306 may continue to execute without these changes, perhaps until reloaded or refreshed by a web browser executing the cloud-based application. Alternatively or additionally, whether and when the changes take place in the cloud-based application may be under control of the application designer.

One way in which the appearance and behavior of the cloud-based application can be synchronized across the design mode 302, the preview mode 304, and the run mode 306 is for these modes to share the same program logic while executing. Thus, for example, the design mode 302 may be substantially the same as the preview mode 304 and the run mode 306, except with the menus 402, stack toolbar 404, page toolbar 406, database toolbar 408, widget palette 410, and configuration palette 412 removed. Thus, in some embodiments, the differences between the design mode 302, the preview mode 304, and the run mode 306 may be limited to the state of the development environment GUI and the widgets. As a result, the designer may be able to switch between the modes in a substantially instantaneous fashion, as compilation and linking of the program logic may not be necessary.

It should be understood that each of the design mode 302, preview mode 304, and run mode 306 may include different GUI-based representations of the cloud-based application, and each of these modes may provide different types of functionality and interactivity to the designer or user. For example, the design mode 302 may display the development environment GUI, with its associated menus and palettes, while the preview mode 304, and run mode 306 may display the application GUI without these menus and widgets. Additionally, the development environment may support other modes of operation not described herein.

The execution platform 308 may load and store cloud-based applications and their associated data. The execution platform 308 may also render and execute these cloud-based applications. In some embodiments, the execution platform 308 may be a script-based virtual machine that operates in a web browser. For example, some web browsers support JAVASCRIPT® to facilitate dynamic web pages and web-based user interfaces. Accordingly, the execution platform 308 may be based on pre-provided and/or designer-provided JAVASCRIPT® modules and functions. On the other hand, the execution platform 308 may use one or more different scripting languages, such as but not limited to PHP, PERL®, JAVA®, AWK, Tcl/Tk, Python, and/or various shell scripting languages. Any or all of these scripting languages may execute inside or outside of a web browser.

The application model 312 may be an abstract representation of the cloud-based application. For instance, the cloud-based application may be a data-driven application that includes several pages. The pages of such an application may be organized into a "stack" of pages, and each stack of pages may be referenced by a unique URL. Alternatively or additionally, each page within the stack may be associated with a unique URL. Data-driven applications may include, for instance, applications that use the values of stored data to influence how the application presents itself to the user, how generated or input data and/or objects are stored, or to otherwise influence the behavior of the application. Each of these pages may include one or more widgets (e.g., images, text boxes, menus, dialogs, etc.). Accordingly, the application model 312 may include a representation of pages and widgets. This representation may include, for example, the names of each page and widget, relationships between pages, relationships between pages and widgets, references to any data associated with each widget, metadata associated with pages and/or widgets, names of scripts associated with pages and/or widgets, names of scripts associated with the cloud-based application as a whole, and so on.

Together, these items of the application model 312 may form a partially-complete or complete representation of the cloud-based application executable by the execution platform 308. For example, information in the application model 312 may specify the cloud-based application's user interface and behavior of the cloud-based application.

The database model 314 may represent the data associated with various aspects of the application model 312. For example, the database model 314 may include a database schema that defines the data stored on behalf of the cloud-based application. This data may include information associated with the cloud-based application's pages and widgets. The database schema and the data stored in the database schema may be automatically generated by the execution platform 308 based on the defined pages and widgets. Additional scripts may extend the database schema and control the data stored in this schema.

To that point, the compiled scripts module 316 may be compiled versions of additional scripts provided by the designer or a third party to enhance the program logic of cloud-based applications or the program logic of the execution platform 308. The compiled scripts module 316 may include processed scripts, object code, machine code, or byte-code representations of program logic written in a scripting language. The use of the compiled scripts module 316 may be facilitated by the script callbacks 310, which may be used to include the compiled scripts module 316 into the execution platform 308.

To that end, the execution platform 308 may provide a number of insertion interfaces for injecting the compiled scripts module 316 into the execution platform 308. For instance, the script callbacks 310 may provide stub functions for one or more script names. The execution platform 308 may assign each compiled script a unique script name in accordance with one or more of these stub functions, such that when a stub function is invoked, the script associated with this stub function is executed. Scripts and their respective script names may be stored in the application model 312.

4.2 Server Software Architecture

Software components on the client device may interact with software components on cloud-based server devices (e.g., the server device 101). As shown in FIG. 3, one or more cloud-based server devices may provide software modules and storage to further facilitate the development of cloud-based applications. Particularly, the cloud-based server devices may include, and/or have access to, the application model datastore 102 and database model datastore 103.

The application model datastore 102 may include a database component for storing a representation of the application model 312. When the execution platform 308 makes changes to the application model 312, the execution platform 308 may transmit near real-time updates to the application model datastore 102 to reflect these changes. Additionally, the application model datastore 102 may provide parts of the application model 312 to the execution platform 308 on demand. The execution platform 308 may request portions of the application model 312 from the application model datastore 102 on an as needed basis.

For example, suppose that a cloud-based application consists of two pages. To generate a display of the first page, the execution platform 308 may only request portions of the application model 312 related to the first page. Then, to generate a display of the second page, the execution platform 308 may request portions of the application model 312 related to the second page.

The database model datastore 103 may include a database component for storing a representation of the database model 314. The database model datastore 103 may use a database schema defined by the execution platform 308 (and possibly enhanced by the compiled scripts module 316) to store data associated with the cloud-based application. This database schema may be arranged so that each page in the application model 312 is represented by a database table, and each widget on a given page is represented by a field in the database table. However, other arrangements of the database schema are also possible.

The databases in the database model datastore 103 may include a relational database, perhaps supporting a structured query language (SQL). Alternatively, these databases may include other types of computer file(s) arranged in one or more file systems. Various types of data structures may store the information in such a database, including but not limited to tables, arrays, lists, trees, fields, and tuples. These data structures may be defined using one or more data schemas. Furthermore, these databases may be monolithic (e.g., stored on a single physical device) or, as described in reference to FIG. 2B, distributed across multiple devices in a network.

Additionally, it should be understood that a database schema may include a structure of a database, where this structure defines the objects in the database. A database schema may be defined using a formal language. Some of the information defined by a database schema may include tables, fields within the tables, types of data stored in the tables and fields, and relationships between tables, between fields, and between tables and fields. A database schema may also include indexes, program logic, event triggers, links, and other components.

The script compiler 318 may be a software module that receives scripts from the execution platform 308, and compiles these scripts into an executable representation. Then, the script compiler 318 may transmit these executable representations of the scripts to the compiled scripts module 316. The script compiler 318 may include functionality that translates script-based program logic in the form of JAVASCRIPT® code, PHP code, PERL® code, JAVA® code, AWK code, Tcl/Tk code, Python code, various types of shell scripting code, and/or other types of program logic into some form of object code, machine code, and/or byte code. In some embodiments, the script-based program logic may be expressed using a superset (e.g., extensions or add-ons) of an existing scripting language. Additional details about script compilation are set forth in more detail in Section 6.

The authentication module 320 may ensure that designers and users accessing cloud-based applications are properly logged into the system. The authentication module 320 may also control access to individual application models and database models. For example, the application model 312 and/or database model 314 may have an access control list that defines the designers and users that are authorized to use the model. Via the authentication module 320, the execution platform 308 may allow or deny a particular designer or user access to a particular application model or database model. In order for a designer or user to be authenticated, the designer or user may be required to provide representations of their userid and/or password to the authentication module 320. These representations may be provided directly, or through a web authentication method such as OAuth, OpenID, the Security Assertion Markup Language (SAML), and/or X.509, among other possibilities. In some embodiments, some or all users may only have access to certain modes of the distributed software architecture 300. For example, some users may only be able to access the run mode 306.

In some embodiments, a database can only be read from and written to by the cloud-based application that created the database. However, the designer can override this behavior and allow other applications to access the database. For example, the designer may allow any cloud-based application that uses the server device 101 to access the database.

The dynamic feed module 322 may provide a way for a designer or user to access and parse one or more feeds. A feed may be, for example, a Really Simple Syndication (RSS) feed or Atom feed that is published on the Internet or a private network. Feeds may be used to provide frequently updated works, such as blog entries and online news sites, to readers in a standardized format. Some feeds may include a series of entries in chronological order, with each entry containing a headline, author, date of publication, and some content (e.g., text, hypertext, images, audio, video, etc.). Feeds may take the form of an eXtensible Markup Language (XML) file. These feeds may be used for rapidly populating a data model for a cloud-based application, so that the cloud-based application can be tested.

The media handler module 324 may facilitate the uploading of image files, audio files, video files, and so on by the designer or user. Such media may be added to the design of the cloud-based application by designers, or to the content of a running cloud-based application by users. When a media file is uploaded, the media handler module 324 may generate a unique identifier for the file. This identifier may be stored in the application model 312. When the execution platform 308 renders a cloud-based application containing a media file, the execution platform 308 may retrieve the media file via the media handler module 324.

The email handler module 326 may provide a service that allows executing cloud-based applications to send emails. For example, the email handler 326 may provide Simple Mail Transfer Protocol (SMTP) mail transfer agent functions for one or more of the cloud-based server devices. For a given outgoing email message, the email handler 326 may use the Domain Name System (DNS) to look up the outgoing email message's destination, and then transmit the outgoing email message to this destination.

It should be understood that the components depicted in FIG. 3 may be software, hardware, or some combination of software and hardware. These components may be collocated with one another or distributed across two or more physically distinct computing devices. Further, a distributed development architecture may have more or fewer components, and may arrange these components in a different fashion than shown in FIG. 3.

4.3 Development Environment Graphical User Interface

FIG. 4 depicts a development environment in accordance with an example embodiment. In particular, a development environment 400 represents a possible development environment GUI that could be presented to a designer using the distributed software architecture 300. For example, development environment 400 may be a visual representation of the execution platform 308 in the design mode 302, preview mode 304, and/or run mode 306. To that end, execution platform 308 may include program logic and media files that facilitate the presentation of the development environment 400. Regardless, through the use of the development environment 400, the designer may be able to design, test, and execute a cloud-based application.

To enable these features, the development environment 400 may include a number of menus, palettes, toolbars, and/or workspaces. For instance, menus 402 include a set of drop-down menus, including a "File" drop-down menu, a "Mode" drop-down menu, a "Help" drop-down menu, and a "Widget" drop-down menu. More or fewer drop-down menus may be included in the development environment 400. Also, it should be understood that each of the drop-down menus in the menus 402 are shown in their non-dropped-down state. Thus, by hovering a cursor or pointer over a particular drop-down menu, or by selecting a drop-down menu, among other possibilities, the respective drop-down menu's items may be displayed.

For example, selecting the "File" drop-down menu may result in options being displayed for creating a new cloud-based application, loading a cloud-based application from storage, saving a currently-loaded cloud-based application, and/or printing the development environment GUI, database schema, or scripts of a currently-loaded cloud-based application. In another example, selecting the "Mode" drop-down menu may result in options being displayed for switching between the design mode 302, preview mode 304, and run mode 306. In yet another example, selecting the "Help" drop-down menu may result in options being displayed for assisting the designer in using the development environment 400. In still another example, selecting the "Widget" drop-down menu may result in options being displayed for manipulating widgets that are including in the cloud-based application, or that are being considered for inclusion in the cloud-based application.

The development environment 400 may also include a stack toolbar 404, a page toolbar 406, and a database toolbar 408. The stack toolbar 404 may allow the designer to switch between different stacks, where each stack represents a series of related pages that are part of a cloud-based application. The page toolbar 406 may allow the designer to select for display one or more pages that are part of a stack in the cloud-based application. The page toolbar 406 may include a menu or a substantially equivalent mechanism to allow the designer to switch between these pages.

In combination, the stack toolbar 404 and page toolbar 406 may allow a designer to select a specific page of a specific cloud-based application, and this selected page may be displayed in the development environment 400. For example, as shown in FIG. 4, the designer has selected "test5" on the stack toolbar 404, and "Page 1" on the page toolbar 406. Thus, the development environment 400 may display, in the application workspace 414, a representation of the selected page of the selected stack (e.g., Page 1 of the test5 stack).

The database toolbar 408 may allow the designer to name and/or control the database schema used to store the cloud-based application's data model. For example, in FIG. 4, schema "test5*db*" is being used. In some embodiments, the database toolbar 408 may allow this schema to be changed or renamed. In other embodiments, the development environment 400 may hide this detail from the designer, so that the database and its schema are named, created, and updated automatically.

A page of the cloud-based application may include zero or more widgets that are displayed representatively in the application workspace 414. Development environment 400 may allow a designer to drag and drop widgets from the widget palette 410 into the application workspace 414. The designer may then position and/or further configure these widgets. The act of placing a widget in the application workspace 414 may result in the widget being added to the page being displayed in the application workspace 414, and the execution platform 308 updating the database model to reflect the addition of this widget.

The widget palette 410 includes several examples of widgets that may be used on a page. The widgets in the widget palette 410 may include a field widget, an image widget, a button widget, a test widget, a menu widget, a color widget, a list widget, and a select widget. However, it should be understood that more or fewer widgets may be included in the widget palette 410, and other types of widgets may be included in the widget palette 410, or otherwise provided to the designer.

The field widget may allow the designer to add a field for data entry, for instance a text box (e.g., a graphical display sub-component) and an associated label (e.g., another graphical display sub-component), to a page. The media widget and the button widget may respectively allow the designer to select and add an image or other type of media, or to place a button on the page. The text widget may allow the designer add text to the page. The menu widget may allow the designer to add a menu to the page, and to specify the items in the menu. The color widget may allow the designer to add a particular color to a section of the page. The list widget may allow the designer to add a list to the page, and to specify the entries in the list. The select widget may allow the designer to add a check-box to the page. Other widgets may provide additional functionality.

For purposes of illustration, an example of widget selection and placement is shown in a dialog box 416. The dialog box 416 combines three widgets: a text widget 418, a button widget 420, and a button widget 422. The text widget 418 includes the text string "Press OK to continue", while the button widgets 420 and 422 include the names "OK" and "Cancel" respectively. Individual widgets from the widget palette 410 may also be combined to form a compound widget, as set forth in more detail in Section 8.

Each widget on a page may be further configured. For example, the configuration palette 412 as shown in FIG. 4 indicates the configuration of the, perhaps currently selected, button widget 420. As shown in the dialog box 416, the button widget 420 includes the name "OK", and this name is selected to be displayed. The configuration palette 412 also specifies the location of the button widget 420 in terms of x and y coordinates on the page, as well as the width and height of the button widget 420. These x and y coordinates, as well as width and height specifications may be in pixels, inches, centimeters, or some other unit of measure. Automatic layout tools may simplify the process of determining layout relationships between widgets and perhaps between widgets and edges of the client web browser or device display, as set forth in more detail in Section 9.

Further, the configuration palette 412 enables assigning an action to the button widget 420. An action for a button may be specified using the "When", "Do", and "Page" menus that appear toward the bottom of the configuration palette 412. For example, FIG. 4 shows that the configuration palette 412 indicates that, when the button widget 420 is clicked, the cloud-based application can switch to a different page, "Page 2". Other button options could also be provided.

It should be understood that different sets of widgets can be placed on various pages. These widgets may, alone or in combination with one another, exhibit different characteristics and functionality than shown in the configuration palette 412. It should also be understood that FIG. 4 is intended to depict an illustrative example of one or more embodiments of a development environment. Thus, FIG. 4 and the accompanying description of FIG. 4 should not be viewed as limiting.

An advantage of the development environment 400 is that it allows individuals with little or no computer programming, web development, or database experience to design and deploy cloud-based applications. For instance, these individuals need only drag and drop widgets on to the application workspace 414 in order to create a cloud-based application. Any database used by this cloud-based application may be automatically and transparently created, without requiring input from the individual. However, more experienced computer programmers, web developers, and/or database designers can find the development environment 400 useful, as the development environment 400 provides a simple interface to a rich set of features, facilitating rapid prototyping and development of cloud-based applications.

4.4 Information Flow Examples

Figure 5:
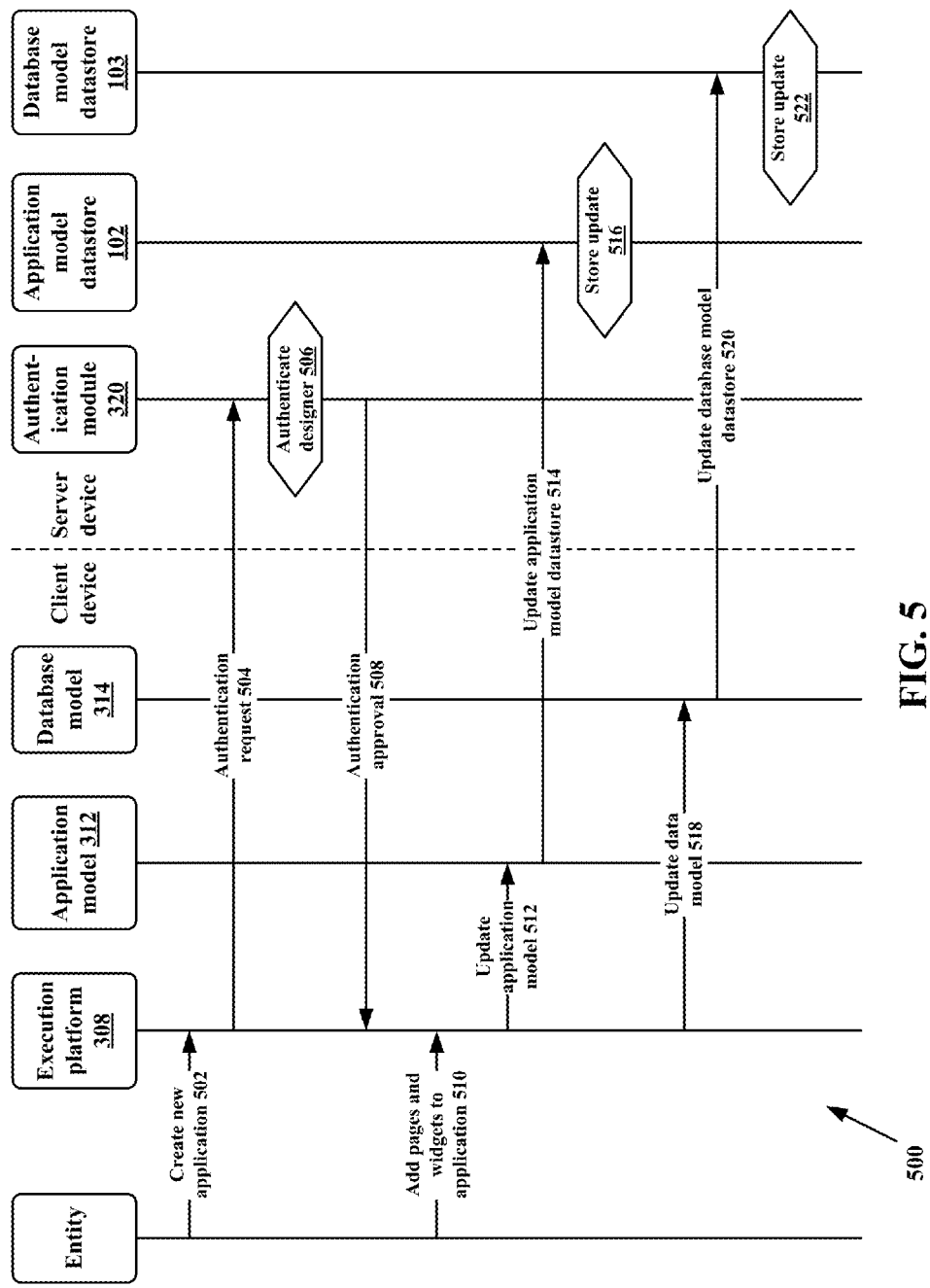
FIG. 5 is a ladder diagram in accordance with an example embodiment.
Figure 6:
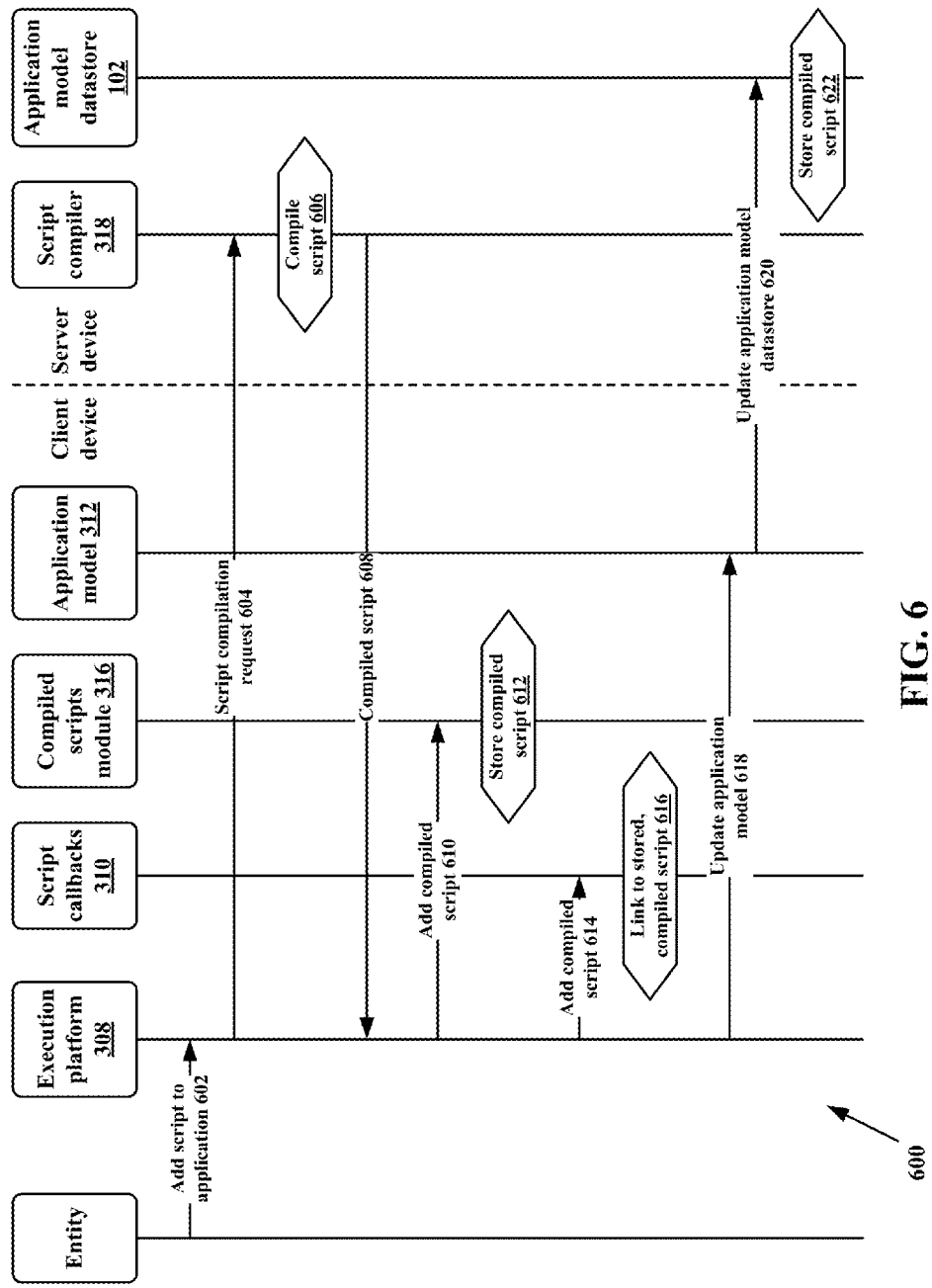
FIG. 6 is a ladder diagram in accordance with another example embodiment.

FIGS. 5 and 6 depict examples, in the form of ladder diagrams 500 and 600, of how information could flow through the distributed software architecture 300 in order to facilitate the development of cloud based applications. At a block 502, an entity, (e.g., a designer, remote computer, etc.) uses the software architecture 300 to create a cloud-based application. This block may involve the entity providing at least some information regarding the cloud-based application to the execution platform 308. At a block 504, in response to this information, the execution platform 308 may transmit an authentication request to the authentication module 320. The authentication request may include, for example, a representation of the entity's account or credentials (e.g., a userid and/or password).

At a block 506, after receiving the authentication request, the authentication module 320 may determine that the entity is authorized to create a cloud-based application via the software architecture 300. This authorization may involve, for example, the authentication module 320 looking up the entity's credentials in a credential repository. Based on information associated with the credentials, the authentication module 320 may determine that the entity has been granted the ability to create the cloud-based application. Accordingly, at a block 508, the authentication module 320 may transmit an authentication approval to the execution platform 308.

In response to the authentication approval, the execution platform 308 may allow the entity to begin building the cloud-based application. For example, the entity may add one or more pages to the cloud-based application, and may also add one or more widgets to at least some of these pages. At a block 510, the execution platform 308 may receive a representation of these pages, widgets, and any other information (e.g., names, identifiers, metadata, and/or scripts) related to the design of the cloud-based application.

At a block 512, in response to receiving the representation, the execution platform 308 may transmit an update to the application model 312. This update may include specifications of the pages, widgets, and/or other information. At a block 514, the application model 312 may transmit the update (and/or information derived from information in the update) to the application model datastore 102. At a block 516, the application model datastore 102 may store the information in the update. The application model 312 may also maintain a copy of the representation.

At a block 518, also in response to receiving the representation, the execution platform 308 may transmit an update to the database model 314. This update may include data representing a database schema, and/or data associated with the pages, widgets, and other information that was transmitted to the application model 312. At a block 520, the database model 314 may transmit the update (and/or information derived from information in the update) to the database model datastore 103. At a block 522, the database model datastore 103 may store the data in the update. The database model 314 may also maintain a copy of the data. By this use of substantially simultaneous updates, application model updates and data model updates can be coordinated.

In addition to the updates shown in FIG. 5, the execution platform 308 may continue to make updates to the application model 312 and database model 314 as the entity modifies the cloud-based application. The application model 312 and database model 314 may, in turn, continue to update the application model datastore 102 and database model datastore 103.

FIG. 6 is another ladder diagram in accordance with a further example embodiment. At a block 602, an entity, (e.g., a designer, remote computer, etc.) uses the software architecture 300 to add a script to a cloud-based application. This block may involve the designer providing the script to the execution platform 308. Additional details about adding and creating scripts using various editing tools are set forth in more detail in Section 7.

At a block 604, in response to this representation, the execution platform 308 may transmit a script compilation request, along with a copy of the script, to the script compiler 318. At a block 606, in response to the script compilation request, the script compiler 318 may compile the script. Then, at a block 608, the script compiler 318 may transmit the compiled script to the execution platform 308.

At a block 610, in response to receiving the compiled script, the execution platform 308 may transmit a request to add the compiled script, along with a copy of the compiled script, to the compiled scripts module 316. At a block 612, the compiled scripts module 316 may store the compiled script.

At a block 614, also in response to receiving the compiled script, the execution platform 308 may transmit a request to add a reference to the compiled script to the script callbacks 310. At a block 616, the script callbacks 310 may use this reference to link to the compiled script as stored in the compiled scripts module 316. After loading the linked, compiled script, the execution environment may be able to execute the linked, compiled script during the execution of the cloud-based application.

At a block 618, also in response to receiving the compiled script, the execution platform 308 may transmit an update to the application model 312. This update may include a copy of the compiled script. At a block 620, the application model 312 may transmit the copy of the script to the application model datastore 102. At a block 622, the application model datastore 102 may store the script. The application model 312 may also maintain a copy of the script. Additional details about script compilation are set forth in more detail in Section 6.

4.5 Methods for Cloud-Based Application Development

Figure 7:
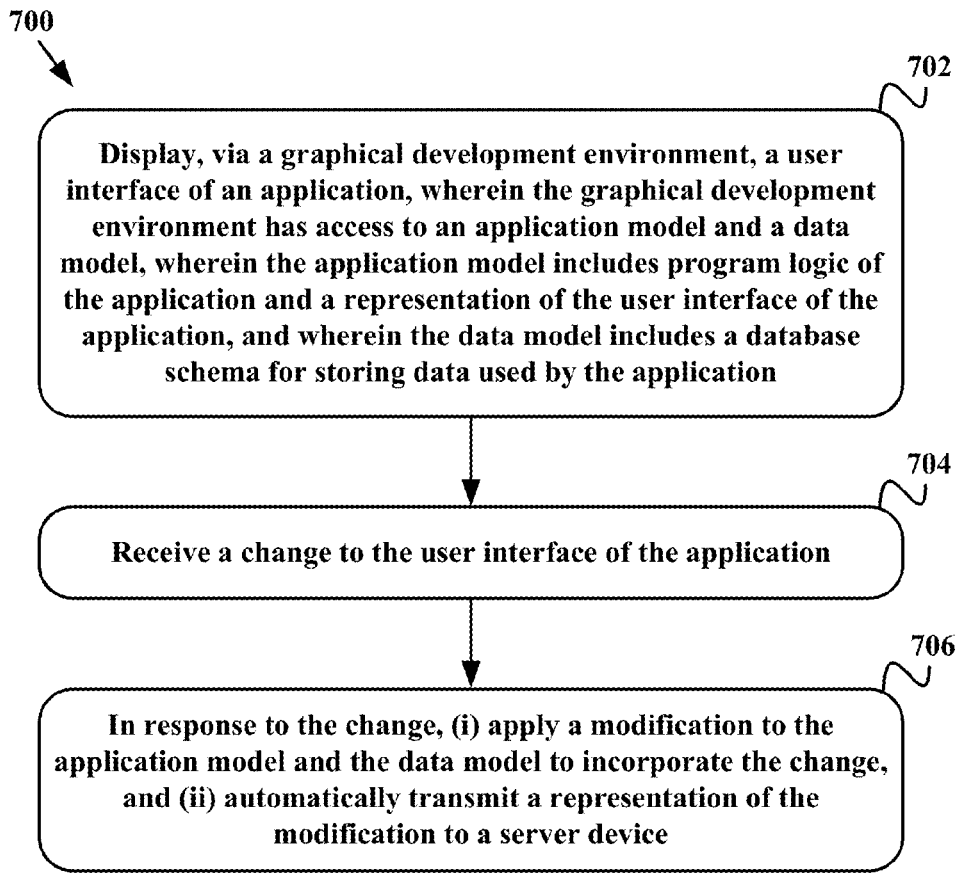
FIG. 7 is a flow chart in accordance with an example embodiment.

FIG. 7 is a flow chart in accordance with an example embodiment. The flow chart illustrates a possible method 700 through which the application model 312 and the database model 314 can be created and populated based on a cloud-based application developed in development environment 400.

At a block 702, a computing device may display, via a graphical development environment (e.g., the development environment 400), a user interface of an application (e.g., a cloud based application). The graphical development environment may have access to an application model (e.g., the application model 312) and a data model (e.g., database model 314) of the application. The application model may include program logic of the application and a representation of the user interface of the application, while the data model may include a database schema for storing data used by the application. The representation of the user interface, in turn, may include a representation of a page, and the representation of the page may include a representation of a widget. The widget may contain text and graphical content, and use of the widget may trigger execution of a script. In some embodiments, the graphical development environment may be controlled by a script-based execution platform operating on the computing device.

At a block 704, the computing device may receive a change to the application. This change may be, for example, an edit to the application user interface or program logic made by a designer of the application. Some possible changes include adding a new widget to the application, removing a widget from the application, associating a widget with data, adding a new script to the application, removing a script from the application, associating a script with a widget and/or data, and changing the attributes of a widget.

Receiving the change to the application may occur while the graphical development environment is in a design mode. Further, the change may be received while the application is executing in a preview mode or a run mode. Responsive to receiving the change to the application in the design mode, the computing device may automatically update an instance of the application executing in the preview mode or run mode. Alternatively, the computing device may refrain from updating the instance of the application executing in the run mode.

At a block 706, in response to the change, the computing device may (i) apply a modification to the application model and the data model (or, modifications may be applied to only the application model or only the data model) to incorporate the change, and transmit a representation of the modification to a server device. The server device may store copies of the application model and the data model.

The transmission may occur automatically in response to applying the modification. Additionally, the representation of the modification may include a representation of the difference between the application model and/or the data model without the changes incorporated and the application model and/or the data model with the changes incorporated. Alternatively, the representation of the modification may include a representation of the application model and/or the data model with the changes incorporated.

In some embodiments, the change to the application may involve adding a script to the application. Thus, the computing device may receive the script, and in response to receiving the script, transmit the script to the server device for compilation. The computing device may receive a compiled version of the script from the server device, and then add the compiled version of the script to the program logic of the application. For instance, the computing device may store a copy of the compiled script in a compiled scripts module (e.g., compiled scripts module 316) and link the program logic of the application to the compiled script via a script callbacks module (e.g., script callbacks 310). The script may contain logic that interacts with a widget, or acts independently from widgets, to control values of at least one unit of data stored in the database schema.

5. AUTOMATIC CREATION OF A DATABASE SCHEMA BASED ON APPLICATION GUI CHARACTERISTICS

In an additional example embodiment, a database schema can be automatically created and populated based on the layout and content of the application GUI created by the designer. For example, when the designer adds an application GUI element to a page, the execution platform 308 may instruct the database model 314 to create a database schema based on the application GUI. Then, the database model 314 may in turn instruct the database model datastore 103 to create the database schema. One way in which the database schema may be based on the application GUI is to create a database table in the database schema for each page in the application GUI. Then, when a widget is added to a given page, a field is added to the database table to represent the widget.

Accordingly, as the designer adds widgets to a page, the execution platform 308 may update the database model 314, and in turn the database model may update the database model datastore 103 to add a field for the widget. Further, as the designer defines the name, position, size, shape, and/or actions associated with the widget, this information may also be stored in the database.

Moreover, if the designer removes widgets from a page, or pages from the application GUI, the database model 314 and the database model datastore 103 may be updated to incorporate these changes. In particular, when a widget is removed from a page, the field associated with the widget may be removed from the database table associated with the page. Further, when a page is removed from the application GUI, the database table associated with the page may be removed from the database schema. On the other hand, if the field associated with a removed widget or the database table associated with the removed page contains user data, one of the following actions may occur: (i) the field/table is removed from the database along with all data associated with that field/table, (ii) the application designer is notified that the field/table contains data, and is asked to confirm that they want to remove the field/table from the database, or (iii) the widget/page is removed from the application model but the field/table and any associated data are not removed from the database. In some embodiments, option (ii) or (iii) may be preferable, because it is generally desirable to preserve user data, and scripts associated with the application may refer to the field/table.

It should be understood that the relationship between pages and database tables, as well as the relationship between widgets and fields in a database table, need not be one-to-one. Therefore, a given page may be associated with more than one database table, or a given database table may be associated with more than one page. Further, a given widget may be associated with more than one given field in a given database table, or a given field in a database table may be associated with more than one widget.

Figure 8:
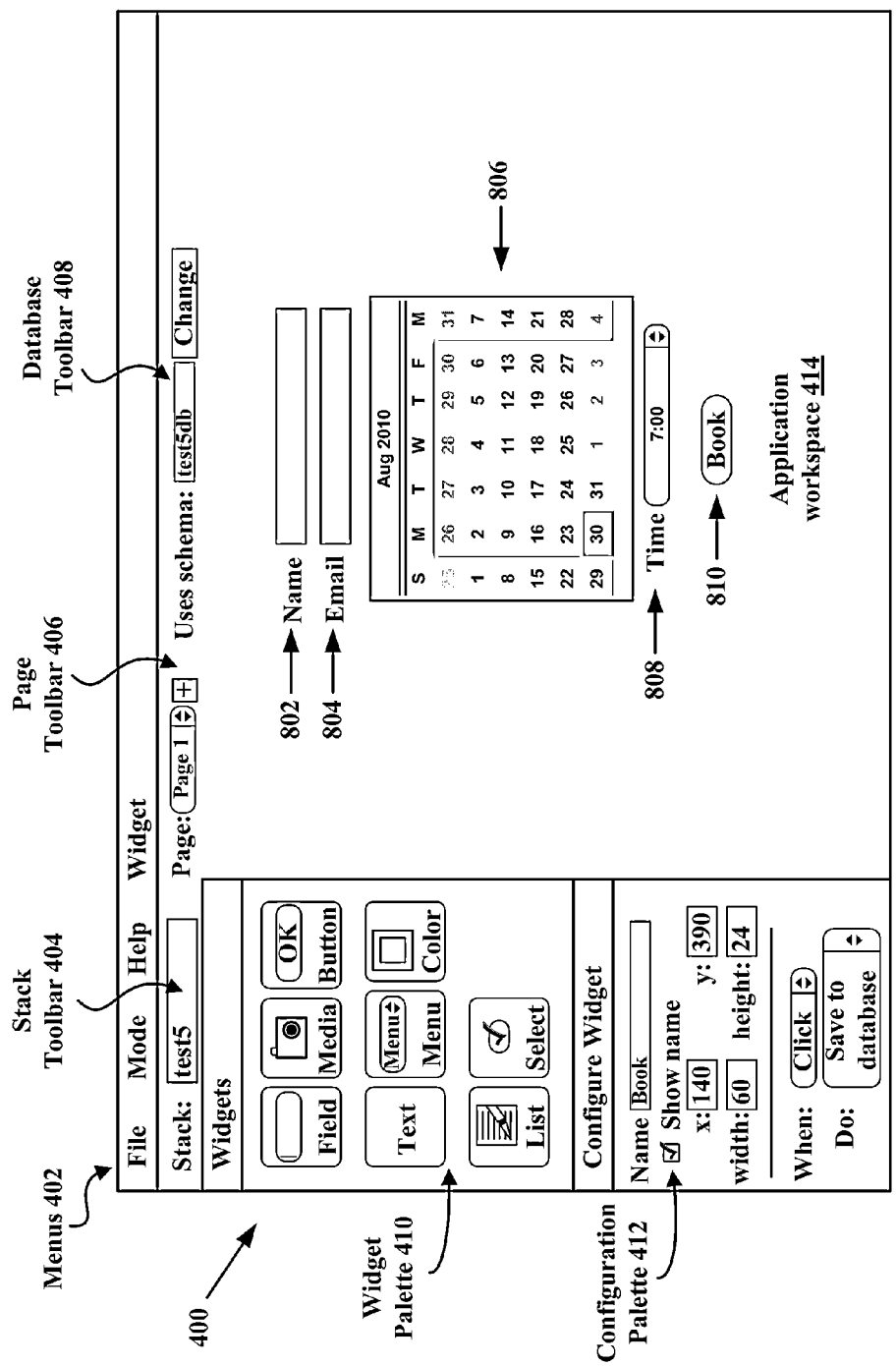
FIG. 8 depicts a development environment in accordance with an example embodiment.

FIG. 8 depicts the development environment 400 in accordance with an example embodiment. While the overall development environment GUI depicted in FIG. 8 is substantially similar to that of FIG. 4, FIG. 8 also includes a set of widgets configured on a page. These widgets may combine, for example, to form page that facilitates calendar scheduling.

Particularly, and as illustrated in FIG. 8, application workspace 414 includes a field widget "Name" 802, a field widget "Email" 804, a calendar widget 806, a menu widget "Time" 808, and a button widget 810. The calendar widget 806 is not shown in the widget palette 410, and is representative of the many possible widgets not appearing in the widget palette 410 that could be defined by a designer.

In some embodiments, the page represented in the application workspace 414 may allow a user to enter their name in the field widget "Name" 802, their email address in the field widget "Email" 804, specify a date in the calendar widget 806, and specify a time on the menu widget "Time" 808. Then, the user may click (e.g., activate) the button widget 810 to "book" or schedule an event at the specified date and time for an individual with the specified name and email address. In particular, given the values of the calendar widget 806 and the menu widget "Time" 808, the event would be set at the specified time and date of 7:00 on Aug. 30, 2010.

The configuration palette 412 shows the configuration of the button widget 816, including this widget's x and y coordinates, with and height. The configuration palette 412 also shows an action specified for the button widget 810. When the button widget 810 is clicked, the execution platform 308 may be instructed to save the values entered into widgets on the page to the database. Thus, when a user enters data into this page (e.g., a name, an email address, a date and a time) from the run mode 306 and clicks on the button widget 816, the entered data may be stored in the database.

Based on the application GUI, execution platform 308 may create a database schema to store information about the page and widgets included on the page. An example database schema, expressed in a pseudo-SQL format, for the page and widgets in FIG. 8 is shown below.

```
CREATE TABLE page1 (
    Name VARCHAR,
    Email VARCHAR,
    Date DATE,
    Time TIME
)
```

The example database schema includes a database table, page1, containing information related to the data-driven widgets included on the associated page. It should be understood that a data-driven widget is a widget that is associated with a particular unit of data. For example, each of the field widget "Name" 802, the field widget "Email" 804, the calendar widget 806, and the menu widget "Time" 808 may be data-driven widgets. Thus, the respective units of data associated with each of these widgets may be expressed as a field in the database table. Each of these fields may be considered variables that can take on different values.

Further, the label of each widget may be used to automatically name the associated database field. Thus, the database field associated with the field widget "Name" 802 may be labeled "Name", the database field associated with the field widget "Email" 804 may be labeled "Email", and so on. For the calendar widget 806 a default database field label of "Date" may be used. Nonetheless, the designer may be able to override these automatic naming conventions.

It should be understood that the term "field" may be used herein to refer to a type of widget (e.g., the field widget "Name" 802 and the field widget "Email" 804) or to a field in a database table. For example, there may be a field in a database table that stores the data associated with a field widget. By considering the context of any instance of the term "field", the appropriate interpretation of this term can be made. Alternatively, a widget added to a cloud-based application may have both a name and a widget identification number (ID). The widget ID may be automatically generated and may also be unique for the cloud-based application (e.g., IDs may be generated by using an automatic scheme to generate monotonically increasing (or decreasing) IDs). The fields in the database may be referenced by widget ID instead of by name. A separate database may be automatically maintained to provide mappings from widget IDs to widget names. An advantage of using IDs is that if the designer changes the name of a widget, the database does not have to change. This allows, for example, scripts that reference the database to remain unchanged when widget names change. It also facilitates uniqueness of database field references while allowing widgets of the same name to appear on different pages of the cloud-based application.

The execution platform 308 may determine the data format of each field in a database table based on a data type of the field's associated widget. Thus, for example, the execution platform 308 may determine the data format for database table fields associated with the field widget "Name" 802 and the field widget "Email" 804 to be VARCHARs (e.g., variable length character strings). The execution platform 308 may also determine the data format for the database fields associated with the calendar widget 806 to be DATE (e.g., a calendar date expressed in YYYY-MM-DD format).

By default, the execution platform 308 may determine the data format of the database fields associated with menu widgets to be VARCHARs. However, in the example database schema shown above, the data format of the database field associated with the menu widget "Time" 808 is TIME (e.g., a time or time offset represented in HH:MM:SS format). There may be several ways to override this default behavior of the execution platform 308.

In some embodiments, the designer may, via configuration palette 412, specify the data type of the menu widget "Time" 808 to be TIME (note that this option is not shown in FIG. 8). Then the execution platform 308 may define the data format of the database field associated with the menu widget "Time" 808 to be the same as this user-specified data type. In other embodiments, the designer may use the compound widget feature (see Section 8) of the development environment 400 to define a new type of widget that include a menu widget but exhibits a data type of TIME.

Alternatively, the data type of the menu widget "Time" 808 may be VARCHAR, but the designer may provide custom program logic (e.g., in the form of a script) that limits values that the data associated with the menu widget "Time" 808 can take on. For example, the custom program logic may only accept VARCHAR values representing a time between that of 09:00 and 17:00 (9 AM to 5 PM). Custom program logic can be used in a similar fashion to control values of data associated with any widget in a cloud-based application.

Regardless of whether the data format of the database field associated with the menu widget "Time" 808 is determined by default, with input from the designer, or via custom program logic, the execution platform 308 may create a database schema based on a page and widgets in application workspace 414. However, it should be understood that database creation based on the application GUI of a cloud-based application can occur in ways different than that set forth above. For instance, a given page may be associated with more than one database table, and/or a given widget may be associated with more than one field in a database table.

Figure 9:
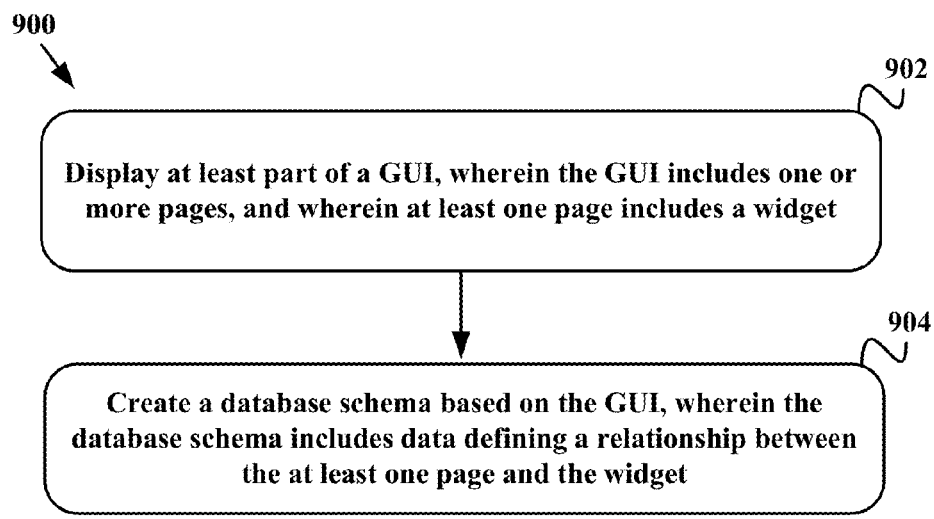
FIG. 9 is flow chart in accordance with an example embodiment.

FIG. 9 is flow chart 900 in accordance with an example embodiment. At a block 902, a computing device may display at least part of an application GUI. The application GUI may include a page, and the page may include a widget. At a block 904, the computing device may create a database schema based on the application GUI. The database schema may include data defining a relationship between the page and the widget.

For instance, the database schema may include a database table for the page, and the database table may include a field for the widget. The database table may define the page and the field may define the widget. Thus, creating the database schema may include creating the database table, and adding the field to the database table. For cloud-based applications that include multiple pages, the database schema may have one table per page. Similarly, for a page that includes multiple widgets, the page's table may include a field for each widget.

Additionally, a widget may have a data type and a field associated with the widget may have a data format. Accordingly, when creating the database schema, the computing device may set the data format of the field based on the data type of the widget. Further, the widget may be associated with a text string, and the field may have a name. Consequently, when creating the database schema the computing device may set the name of the field based on the text string.

In some embodiments, the values that a field may take on can be limited to a particular range or set of values, and this limitation may be enforced through scripts. These scripts may include program logic that operates on a widget, or in conjunction with the widget, to store only particular values in the field.

As the designer specifies the cloud-based application, the application GUI may change. Therefore, in response to determining that the application GUI has changed, the computing device may update the database schema to incorporate the change. For example, in response to determining that a new widget has been added to the application GUI, the computing device may update the database schema to incorporate the change. Additionally, in response to determining that an existing widget has been removed from the application GUI, the computing device may remove an existing field from the database table.

The database schema may reside on a server device. Therefore, when creating the database schema, the computing device may transmit a representation of the database schema to the server device. Also, when updating the database schema to incorporate changes, the computing device may transmit a representation of the change to the server device.

6. USING SCRIPTS WITH CLOUD-BASED APPLICATIONS

As mentioned above, cloud-based applications can include one or more scripts. Each script in turn can contain one or more scripting language instructions. The scripting language instructions may be instructions in a scripting language, such as JAVASCRIPT®, PHP, PERL®, JAVA®, AWK, Tcl/Tk, Python, and/or various shell scripting languages.

Each script may be associated with a computational item of the cloud-based application, such as a page, widget, or non-user-interface (non-UI) item. These computational items may include, for example, data and/or executable instructions.

A page script may be associated with a page, and may execute when the page loads (e.g., is displayed) and/or unloads (e.g., is no longer displayed). For example, a page script associated with a given page could set up a background image for use on the given page when the given page loads. Additionally, the page script could save a copy of the background image when the page unloads.

Page scripts may use a page model to represent pages of the application model 312. The page model may include information about base attributes that affect the page as a whole. These base attributes may include page identifiers, related application identifiers, page size information, background/foreground color information, storage allocation information, and/or page title(s) or name(s).

The page model may also include various widget-specific attributes for each widget associated with the page. These widget-specific attributes may include a name, an identifier, a color, a size, text, a font, and/or storage allocation information. Other base and/or widget-specific attributes are possible as well. As such, the page script may interact with the page model by accessing and/or modifying base and/or widget-specific attributes of the page model.

A widget script may be associated with a given widget, and may execute when the given widget receives an event from the cloud-based application. Example events for a given widget include: activating the given widget, selecting the given widget, entering data via the given widget, an exception or other type of error for the given widget, and deactivating the given widget. The widget script may interact with the widget by accessing and/or modifying widget-specific attributes for the widget. For example, a widget script can be used to change a given widget's font, size, text, foreground, and/or background colors. Other events and widget-specific attributes may be manipulated by widget scripts as well.

A non-UI computational item script may be associated with a non-UI computational item of the application, and may similarly execute upon creation and/or instantiation of the computational item, when the computational item is loaded (e.g., is displayed) and/or unloaded (e.g., is no longer displayed), and/or when the computational item receives an event (e.g., an exception or another type of event). The non-UI computational item script may interact with the computational item by accessing and/or modifying computational-item-specific attributes for the computational item. For example, a script attached to a stack, or group of related pages, may be executed when at least part of the stack is first loaded, perhaps before the first page of the stack is loaded. Non-UI computational item scripts could be attached to the database model 314 as well. For example, a script could update and/or initialize a database of a cloud-based application when the cloud-based application is loaded and/or unloaded.

A script may include one or more script extensions. Such script extensions may permit a script to access and/or modify a computational model, such as the application model 312 or the database model 314. Script extensions may follow a standard syntax. By following the standard syntax, the script extensions can be readily identified by a script compiler. In an example syntax for script extensions, each script extension may begin with a key character (e.g., a dollar sign) followed by an identifier of the computational model. For examples, the script extension "$Database" may be used to access the database model and the script extension "$Name" may be used to access the Name variable of the application model. By accessing the application model 312 and/or database model 314 via script extensions, the script may be permitted to use data and/or program logic maintained by the respective model.

A script may access a specific program logic method of the computational model via a method extension. For example, suppose the database model 314 can be accessed via a script extension and that the database model 314 includes a program logic method called "initialize( )" to set up the database model 314. Then, the "initialize( )" program logic method can be accessed via a statement such as "$Database.initialize( )" which includes both a script extension of "$Database" to access the database model 314, and a method extension of ".initialize( )" to access the "initialize( )" program logic method of the database model 314. Many other examples of script extensions and/or method extensions are possible as well.

In the example script below, a dollar sign is used as the delimiting character for script extensions:

```
var Name = $Name.getText( );
var Age = $Age.getText( );
if ($Database.contains("Name, Age", Name+","+Age)) {
    var FoundName = Name;
}
```

In this example script, the first scripting language instruction "var Name=$Name.getText( );" can retrieve text from a computational item of the application model, such as a widget, identified by use of the "$Name" script extension and the corresponding ".getText( )" method extension for text retrieval. The retrieved text may be stored in a variable called "Name". The second scripting language instruction "var Age=$Age.getText( );" can retrieve text from a widget identified by use of the "$Age" script extension and the ".getText( )" method extension. The retrieved text may be stored in a variable called "Age". The third scripting language instruction is a compound conditional statement: "if ($Database.contains("Name, Age", Name+","+Age)) {var FoundName=Name;}". This conditional statement determines whether data stored in the database model 314 contains specified Name and Age data as indicated by the "$Database.contains("Name, Age", Name+","+Age)" script and method extensions. In this scripting language, the "contains" method takes two parameters: a string indicating a comma-separated list of fields to be searched (e.g., the "Name,Age" sub-statement) and a comma-separated list of data items to search for. This comma-separated list of data items is generated by the 'Name+","Age' sub-statement, which takes the value of the Name variable, appends (using the first "+" operator) a comma (the ",") to the Name value, and then appends (using the second "+" operator) the value of an Age variable. If the comma-separated list of data items is found in the database model 314, the variable "FoundName" is set to the value of the previously defined "Name" variable.

Scripts may include features of an underlying scripting language, such as JAVASCRIPT®, PHP, PERL®, JAVA®, AWK, Tcl/Tk, Python, and/or various shell scripting languages. In the example script shown above, the second scripting language instruction incorporates features of a scripting language (JAVASCRIPT®) in the second method name to assemble a valid method name. Many other scripts using one or more underlying scripting languages with script extensions and/or method extensions are possible as well.

6.1 Script Compilation

The script compiler mentioned above may include an extension compiler. The extension compiler can receive a script with one or more scripting language instructions, possibly containing script extensions and/or method extensions, and generate corresponding scripting language instructions without the script extensions and/or method extensions. The use of the extension compiler enables free use of script language instructions, script extensions, and/or method extensions. The extension compiler may use one or more identifiers for use translating script extensions and/or method extensions into corresponding scripting language instructions.

Figure 10:
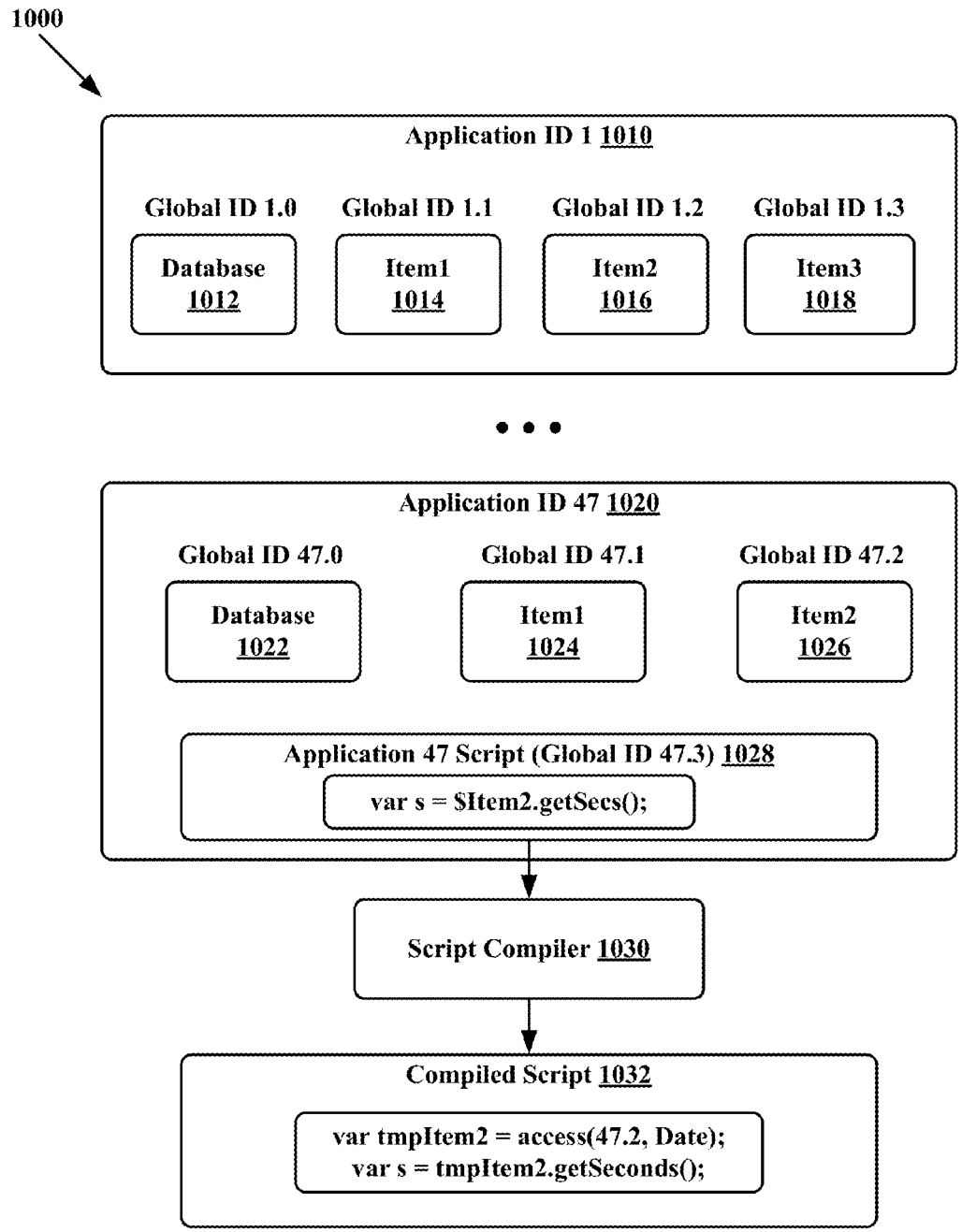
FIG. 10 depicts a script compilation in accordance with an example embodiment.

FIG. 10 depicts an example script compilation for an example cloud-based application 1020 in an example set of cloud-based applications 1000. Each cloud-based application may be associated with different application models and database models, and may be assigned or otherwise associated with an application identifier (ID) to identify the respective cloud-based application in a plurality of applications. As shown in FIG. 10, a cloud-based application 1010 has an application ID of 1 and the cloud-based application 1020 has an application ID of 47. In other embodiments, application IDs may have other formats than the numeric formats shown in FIG. 1. For example, application IDs may alternatively or additionally be alphabetic, alphanumeric, or binary, or may use some other way of specifying cloud-based applications in a plurality of applications.

Each computational item within a cloud-based application may also be assigned a computational item ID. The computational item ID can specifically identify the computational item within a computational model and can be combined with the application ID for the computational item to form a global ID. For example, as shown in FIG. 1, the database 1012 for the cloud-based application 1010 has a computational item ID of "0" and can be combined with the application ID of "1" to form a corresponding global ID of "1.0". Similarly, the computational items 1014, 1016, and 1018 have respective computational item IDs of "1", "2", and "3" with corresponding respective global IDs of "1.1", "1.2", and "1.3."

Scripts associated with a cloud-based application can be assigned respective global IDs as well. For example, FIG. 10 shows a script 1028 associated with the cloud-based application 1020 having an application ID of 47. The script 1028 has a computational item ID of "3", and therefore a global ID of "47.3". Other formats for computational item IDs and global IDs may be used as well, such as those discussed above for application IDs.

The global IDs and other attributes of a computational item can be stored in one or more computational item descriptions. A computational item description may include a table, database, and/or another type of data structure. Searches for global IDs, application IDs, computational item names, computational item addresses, and/or by other criteria of the computational item descriptions may be enabled to track the various attributes of the computational item. For example, a computational item description for a computational item may include one or more identifiers for the computational item, perhaps including a computational item name, one or more types for the computational item, a storage location of the computational item, and/or a list of zero or more methods defined for the computational item.

TABLE 1

| Application ID | Computational Item ID | Computational Item Name | Computational Item Type | Storage Location | Functions | Script ID | Item ID |
|---|---|---|---|---|---|---|---|
| 1 | 0 | Database | Database | 0xc000 | <list of database functions> | −1 | −1 |
| 1 | 1 | Item1 | Integer | 0xd000 | <list of numerical functions> | −1 | −1 |
| 1 | 2 | Item2 | Text | 0xe000 | <list of text functions> | −1 | −1 |
| 1 | 3 | Item3 | Text | 0xf000 | <list of text functions> | −1 | −1 |
| 47 | 0 | Database | Database | 0x10000 | <list of database functions> | −1 | −1 |
| 47 | 1 | Item1 | Text | 0x11000 | <list of text functions> | −1 | −1 |
| 47 | 2 | Item2 | Date | 0x12000 | <list of date functions> | 3 | −1 |
| 47 | 3 | Script | Script | 0x13000 | <list of script functions> | −1 | 2 |

Table 1 shows an example set of computational item descriptions for the computational items shown in FIG. 10. In Table 1, a computational item Item1 1014 of the application 1020 has an application ID of 1, and a computational item ID of 1. This application ID and computational item ID may combine to form a global ID of 1.1, as shown in FIG. 10. Computational item Item1 1014 also has a name of "Item1", is of type integer, is stored in location 0xd000, and can be used with a given list of numerical functions (e.g., addition, subtraction, multiplication, division, comparison operators, etc.).

Table 1 also includes additional aspects of computational items, in particular a script ID and an item ID. The script ID may store an identifier of a script associated with the computational item. For example, "Item1" (computational ID 1) of application ID 1 does not have an associated script, and thus the corresponding script ID is set to "−1" (which indicates that there is no associated script). However, "Item2" (computational ID 2) of application ID 47 does have an associated script, and this script has a computational item ID of "3", and thus the corresponding script ID for "Item2" is set to "3".

The item ID may store an identifier of another item associated with a computational item. For example, "Item1" of application ID 1 is not associated with another computational item, and thus the corresponding item ID is set to −1 (which indicates that there is no additional associated computational item). However, "Script" (computational ID 3) of application 47 does have an associated computational item, and thus the corresponding item ID is set to "2", which is the computational ID of the computational item associated with the script. In this fashion, a script ID may indicate an association from a computational item to a script and an item ID may indicate an association between one computational item (such as a script) and another computation item. In some embodiments, multiple script IDs and/or item IDs may be associated with a computational item.

Other attributes of computational items can be part of a computational item identifier as well. Any of the identifiers in Table 1 (e.g., application ID, computational item ID, computational item name, etc.) may be used to search for a particular computational item or computational items.

In order to translate script extensions and method extensions from the development environment 400 into scripting language instructions (e.g., JAVASCRIPT® instructions), the extension compiler may use a one or more method descriptions. Each method description may represent a method extension. Each method description may also include a method name, a set of applicable computational item types, a list of zero or more parameters used by an associated computational item, a type of a return value, and a function name corresponding to the method name.

As an example, method descriptions that relate to the database model 314 could specify method extensions and corresponding function names to: (i) read the database schema of the database model 314, (ii) add a table (e.g., layout of a database record) to the database schema, (iii) add a field to a table in the database schema, (iv) delete a table from the database schema, (v) list all records stored using a specified table of the database schema, (vi) add a database record to the database schema, (vii) read data from a database record of the database schema, (viii) write data to a database record of the database schema, (ix) delete a database record of the database schema, and/or (x) search the records of the database schema. Other method extensions and corresponding function names are possible as well, including but not limited to database-related method extensions and corresponding function names.

TABLE 2

| Method Descriptions | Computational Item Type | Parameter(s) | Return Value | Function Name |
|---|---|---|---|---|
| Hours | Date | None | Integer | getHours |
| Minutes | Date | None | Integer | getMinutes |
| Secs | Date | None | Integer | getSeconds |

As another example, Table 2 shows three example time-related method descriptions. The following example script, based on the example method descriptions of Table 2, uses method extensions to set three variables h, m, and s from an application model computational item called "TheDate". The example script utilizes JAVASCRIPT® as an underlying scripting language to which scripting language of the development environment 400 is translated. Of course, in other embodiments, scripting languages other than JAVASCRIPT® could be used.

var h=$TheDate.Hours( );
 var m=$TheDate.Minutes( );
 var s=$TheDate.Secs( );

The method descriptions may be part of the application model 312 and/or the database model 314. Thus, the method descriptions can be used by a cloud-based application in any of design mode 302, preview mode 304, and/or run mode 306.

A script compiler can use the identifiers, computational item descriptors, and method descriptors discussed above to translate script extensions and method extensions into scripting language instructions. For example, FIG. 10 shows the application 1020 with a script 1028 having a scripting language instruction of "var s=$Item2.getSecs( )".

When script 1028 is sent to a script compiler 1030 for compilation, the script compiler 1030 can parse the scripting language instruction quoted above to determine that a script extension of "$Item2" is used based on the presence of the above-mentioned "$" delimiting character and a "." preceding a method extension "getSecs( )." The script compiler 1030 can determine a global ID corresponding to the computational item specified in the script extension for the cloud-based application. In this example, the computational item is "$Item2" (whose corresponding computational item ID is 2) of the cloud-based application with application ID 47. Thus, the global ID corresponding to "$Item2" is 47.2. The script compiler 1030 may query the example set of computational item IDs shown in Table 1, with the computational item name of "Item2" and the application ID of 47 to determine the corresponding computational item ID of 2.

The script compiler 1030 can generate part or all of a scripting language instruction that permits access to a computational item specified via a script extension. For example, as shown in compiled script 1032, the script compiler 1030 may generate a scripting language instruction "var tmpItem2=access(47.2, Date)" that creates a variable "tmpItem2", accesses a computational item based on a global ID of type "Date" via the "access(47.2, Date)" sub-instruction, and then sets the "tmpItem2" variable to the accessed computational item.

In particular, the access sub-instruction may receive a global ID (or other identifier) and/or a type. The access sub-instruction may query a set of computational item identifiers based on the identifier. For example, if a global ID is used, the query may involve using the application ID and computational item ID specified in the global ID to find a corresponding storage location for a computational item. If the query is successful, an interface to the computational item is returned. This interface may be the corresponding storage location (e.g., a pointer to the computational item), a handle to the computational item (e.g., a pointer to a pointer to the computational item), a copy of the computational item found at the corresponding storage location, and/or another interface to the computational item. In some scenarios, the access sub-instruction may return an error value and/or invoke an error handler (e.g., throw an exception) if the global ID does not refer to a computational item of a cloud-based application and/or if the type does not match the type of the computational item identified by the global ID.

The script compiler 1030 can generate part or all of a scripting language instruction that corresponds to a method extension. For example, to process the above-mentioned "getSecs( )" method extension, the script compiler 1030 can query the set of method extensions for a function name corresponding to the "getSecs( )" method extension. Using the example set of method extensions shown in Table 2, the script compiler 1030 can find a function name of "getSeconds" corresponding to the "getSecs( )" method extension and further determine that the "getSeconds" function has no parameters. In some scenarios, the script compiler 1030 can compare the returned function with a list of functions associated with the computational item and verify that the function is in the list, and is thus actually associated with the computational item.

As shown in the compiled script 1032, the script compiler 1030 may generate a scripting language instruction "var s=tmpItem2.getSeconds( )", which creates a variable "s" and assigns the variable "s" to the value of a result of an invocation of the "getSeconds( )" function on the "tmpItem2" computational item. Thus, the two example scripting language instructions shown in the compiled script 1032 correspond to the scripting language instruction shown in the application script 1028. Other application scripts and corresponding compiled scripts are possible as well.

In further embodiments, not shown in FIG. 10, the compiled script 1032 may be further improved. As one example improvement, the call to the "access" function may be combined with a call to a function corresponding to method extension, thereby eliminating use of the temporary variable "tmpItem2". The resulting improved scripting language instruction may include or be similar to the following example statement "var s=(access(47.2, Date)).getSeconds( )". Other improvements are possible as well.

6.2 Script Injection and Script Callbacks

One or more scripts may be installed or "injected" into the execution platform 308 in order to execute a cloud-based application associated with or including the one or more scripts. The one or more scripts may be injected using a live injection technique that installs the one or more scripts during execution of the associated cloud-based application. Live injection of scripts may ensure the WYSIWYG behavior of cloud-based applications containing scripts by automatically and/or dynamically modifying the behavior of the cloud-based applications to reflect changes made to the cloud-based application.

The execution platform 308 may use one or more script callbacks 310 to support live injection of compiled scripts. Several example script callbacks are described below. However, other script callbacks may be defined and used in addition to or in place of these examples.

A possible script callback may be an "add script" callback to install scripts. The "add script" callback may include functionality for locating a script (e.g., locating a script stored in application model 312, database model 314, application model datastore 102, or database model datastore 103) based on one or more identifiers. These identifiers may include global IDs and/or computational item IDs. Also, the add script callback may ensure that the script has been recently compiled. After locating and perhaps compiling a requested script, the add script callback can provide the requested compiled script to the execution platform 308. The add script call back may store a compiled script (e.g., in application model 312, database model 314, application model datastore 102, and/or database model datastore 103) after requesting compilation as well.

An "execute script" callback may execute a compiled script associated with a cloud-based application. When the execution platform 308 finds a script function name, as generated above, the execution platform 308 may call the execute script callback with the function name. The compiled JAVA-SCRIPT® associated with the function name may then be run.

A "remove script" callback may delete a previously installed compiled script from the execution platform 308. In some embodiments, the remove script callback may ensure the script is stored in the application model datastore 102 just prior to removal thus ensuring the stored script is the most recent copy of the script.

Figure 11:
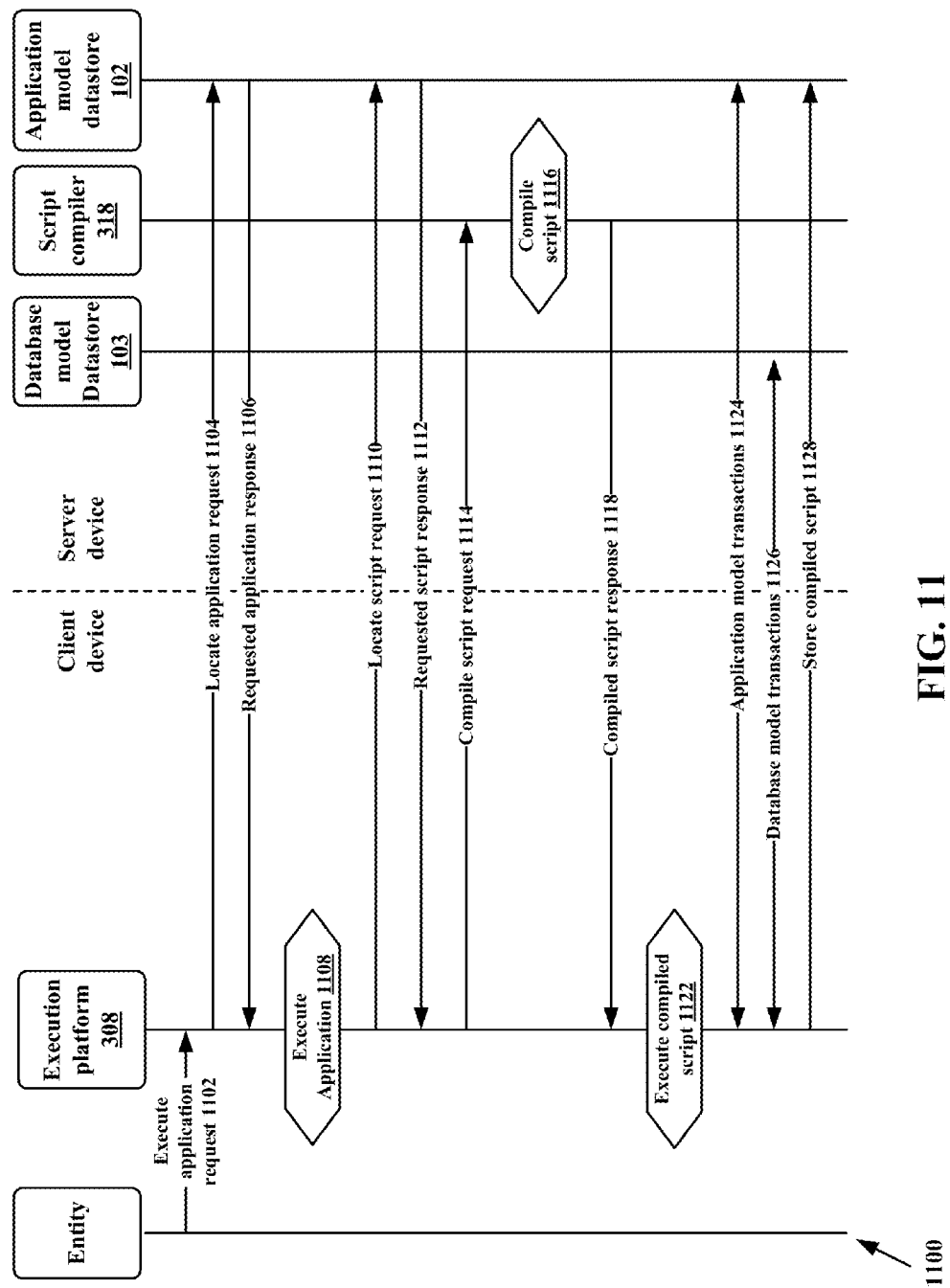
FIG. 11 is a ladder diagram in accordance with an example embodiment.

FIG. 11 is a ladder diagram illustrating an example scenario 1100 involving live script injection. At a block 1102, an entity (e.g., a user, remote computer, etc.) provides an execute application request to the execution platform 308. At a block 1104, the execution platform 308 may transmit a locate application request 1104 to the application model datastore 102 to retrieve the requested application. The locate application request 1104 may also traverse the application model 312, and may include a name and/or other identifier(s) of the requested application. In response to receiving the locate application request 1104, the application model datastore 102 may retrieve one or more computational items related to the requested application, and communicate the requested application to the execution platform 308 using a requested application response 1106.

At a block 1108, the execution platform 308 may execute the requested application. A script associated with the application may be invoked during execution of the requested application. Thus, the execution platform 308 may transmit a locate script request 1110 to the application model datastore 102 (possibly via the application model 312). The locate script request 1110 may include a name, a global ID, and/or other identifiers of the requested script. The requested script may include one or more scripting-language instructions. The application model datastore 102 may find and retrieve the requested script and transmit the requested script to the execution platform 308 using a requested script response 1112.

Upon receiving the requested script, the execution platform 308 may determine that the requested script is to be compiled. To compile the requested script, execution platform 308 may invoke the script compiler 318 via a compile script request 1114. The compile script request 1114 may include a copy of the script to be compiled, or a reference with which the script compiler 318 can locate the script to be compiled in the application model datastore 102.

At a block 1116, the script compiler 318 may generate a compiled script by compiling the requested script. The script compiler 318 may then transmit the compiled script to the execution platform 308 using a compile script response 1118. The execution platform 308 may then add the compiled script to compiled scripts module 316 (not shown) and add a link to the compiled script to the script callbacks 310 (not shown). These transactions are not shown in FIG. 11, but may be the same as or similar to the blocks 610-616 of FIG. 6. In this way, the execution platform 308 may perform a live injection of the compiled script into the execution platform 308. In an alternative embodiment, the execution platform 318 may not need to have the script compiled (e.g., the script may already be compiled), and the blocks 1114-1118 may be omitted.

Once the compiled script is arranged with respect to the script callbacks 310 and the compiled script module 316, at a block 1122, the execution platform 308 may execute the compiled script to perform one or more transactions of a computational model. As part of executing the compiled script at block 1122, the execution platform 308 may execute one or more application model transactions 1124 with the application model datastore 102 and/or database model transactions 1126 with the database model datastore 103. These application model and database model transactions 1124, 1126 may include one or more operations that read, write, insert, and/or delete data in the application model datastore 102 and/or database model datastore 103.

After execution of the compiled script, at a block 1128 the execution platform 308 may store the compiled script in application model database 102. A possible advantage of doing this is to avoid having to recompile the script again in the future. Additionally, and not shown in FIG. 11, the execution platform 308 may act to remove the compiled script from the compiled scripts module 316, and to remove the link to the compiled script from the script callbacks 310.

It should be understood that in various alternative embodiments, different modules may participate in the transactions shown FIG. 11. For example, either of the script callbacks 310 and the compiled script module 316 may interact with the execution platform 308 to facilitate and/or perform the techniques described above for one or more of the blocks/communications 1110, 1112, 1114, 1118, 1124, 1126, and 1128.

6.3 Example Methods for Script Compilation and Injection

Figure 12:
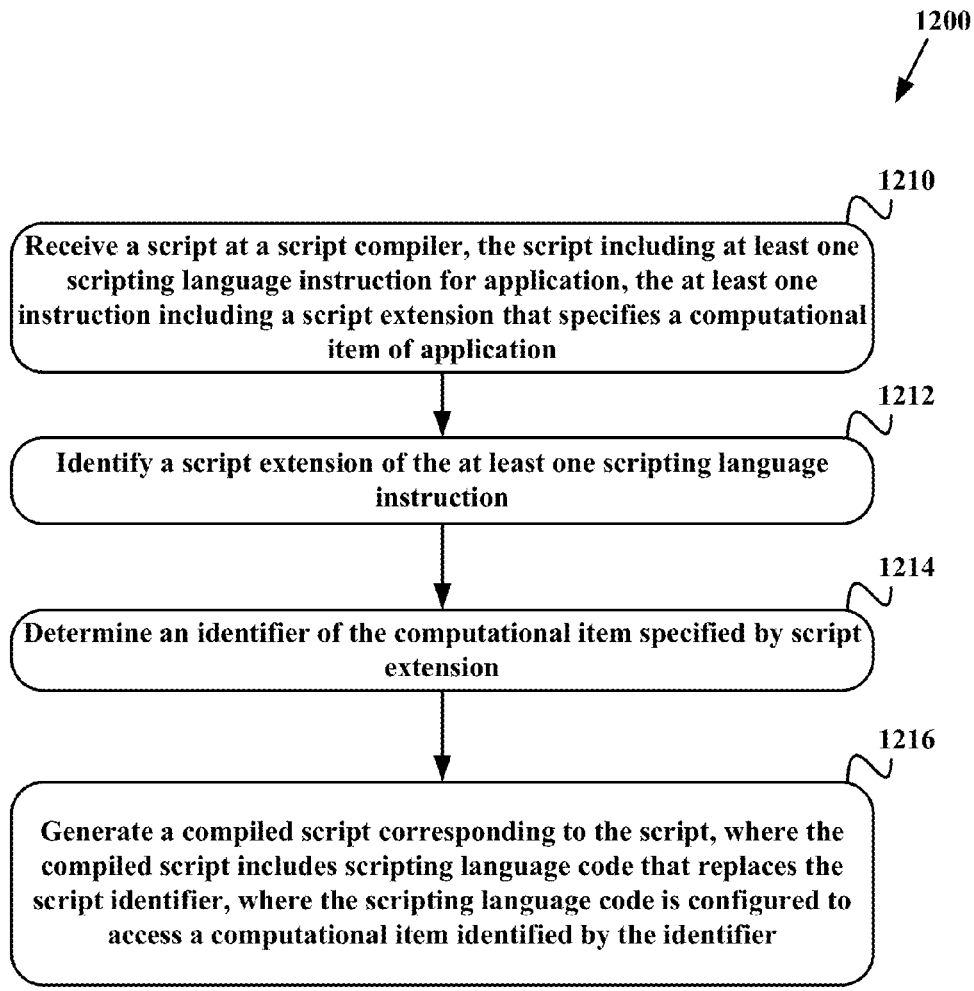
FIG. 12 is flow chart in accordance with an example embodiment.

FIG. 12 is a flow chart 1200 according to an example embodiment. At a block 1210, a script is received at a script compiler. The script may include at least one scripting language instruction for an application, such as a cloud-based application. The scripting language instruction(s) of the script may include a script extension, and the script extension may specify use of a computational model, which may be an application model or a database model. The script extension may include a character and an identifier of the computational model. The identifier of the computational model may specify a computational item. As discussed, example computational items of the application include databases, pages, widgets, and/or other computational items of the application.

At a block 1212, the script compiler may locate or identify the script extension of the at least one scripting language instruction of the script. As mentioned above, the script extension may include a key character, and as such, the script compiler may identify or locate the script extension within the script based on the key character; e.g., a beginning of the script extension can be located by finding the key character that begins the script extension.

At a block 1214, the script compiler may determine an identifier of the computational model specified by the script extension. The script compiler may query for a computational item among a set of computational item identifiers and receive an interface to the computational item specified by the script extension.

At block 1216, the script compiler may generate a compiled script corresponding to the script. The compiled script may include scripting language code that replaces the script extension where the scripting language code is configured to access the computational item identified by the identifier of the computational model. For example, the scripting language code may include a call to an access sub-instruction that permits access to the computational model (e.g., the database model) identified by the identifier associated with the access sub-instruction.

In some embodiments, the least one scripting language instruction includes a method extension that corresponds to an invocation of a function of the computational model. In these embodiments, the script compiler may be configured to generate additional scripting language code to replace the method extension with the invocation of the function of the computational model. For example, the script compiler may query a set of method descriptors to determine a function of either the database model or the application model that corresponding to the method extension. In some of these embodiments, a return value of the function can be determined based on the set of method descriptors.

Figure 13:
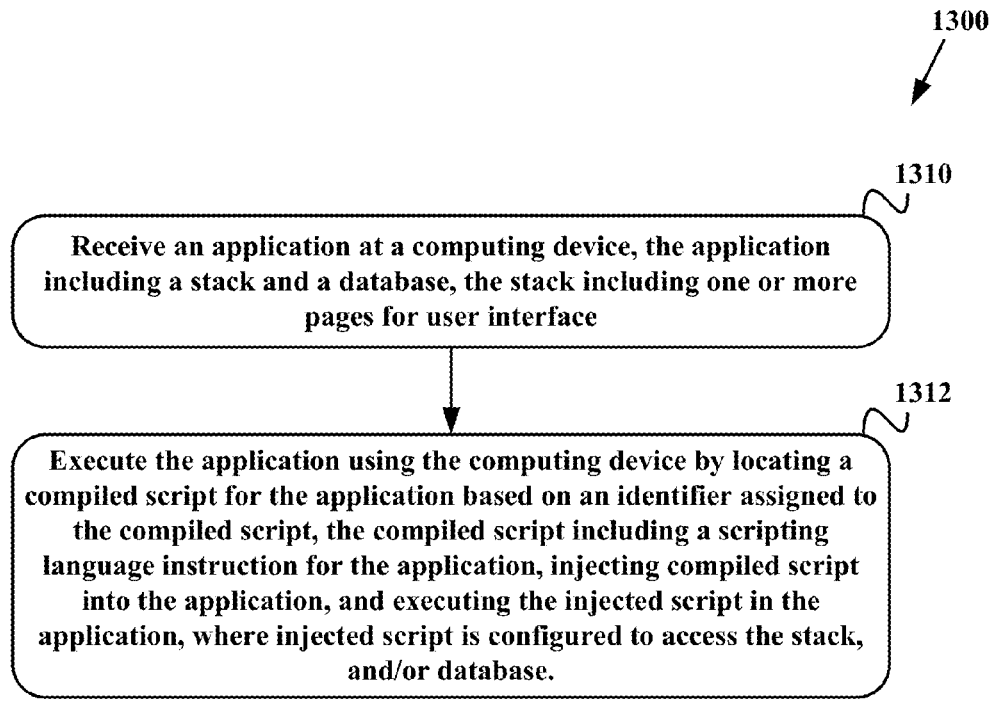
FIG. 13 is flow chart in accordance with another example embodiment.

FIG. 13 depicts a flow chart 1300 of an example embodiment. At a block 1310, an application may be received at a computing device. The application may include a stack and a database. The stack may include one or more pages for a user interface. For example, the application may be a cloud-based application.

At a block 1312, the application may be executed using the computing device. Executing the application may include locating a compiled script for the application, injecting the compiled script into the application, and executing the injected script in the application. The injected script may be configured to access the stack and/or the database. The compiled script may be located based on an identifier assigned to the compiled script, and may include a scripting language instruction for the application.

In some embodiments, locating the compiled script may include locating a script based on the identifier, determining that the script is to be compiled, requesting that the script be compiled, and receiving the compiled script, wherein the compiled script corresponds to the script. In particular of these embodiments, the functionality of flow chart 1200 can be invoked in requesting that the script be compiled. In other embodiments, executing the application may include removing the application script from the application. In still other embodiments, adding a script, compiling the script, injecting the compiled script, and/or removing the script may performed by use of one or more callbacks (e.g., use of an add-script callback to add a script). In even other embodiments, the identifier may include an application identifier and a computational-item identifier.

7. SCRIPT DEVELOPMENT ASSISTANCE

Figure 14:
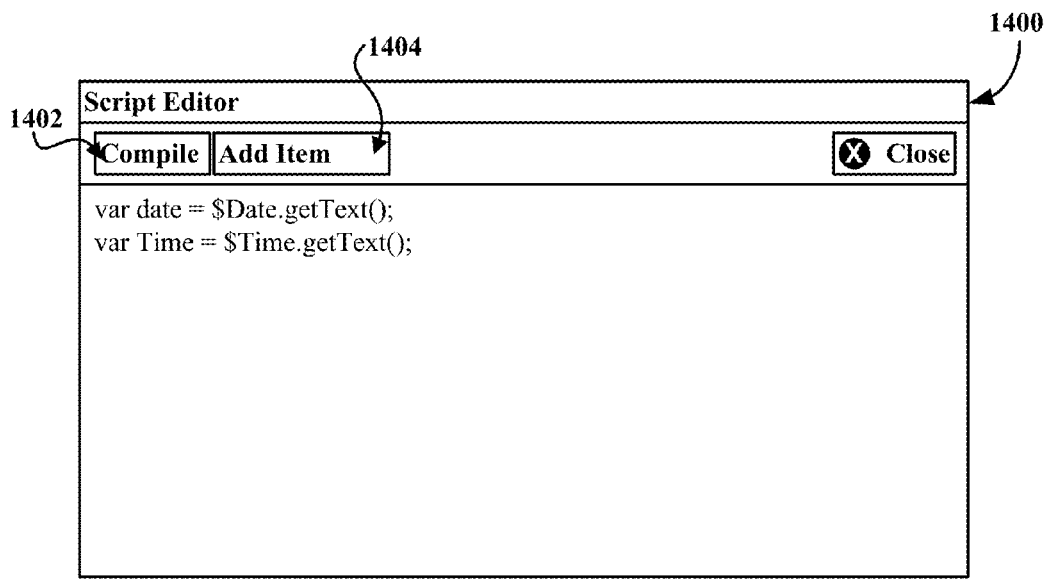
FIG. 14 depicts a window in accordance with an example embodiment.

A range of tools may be provided to assist with cloud-based-application script development. FIG. 14 shows an example window for a standard editor 1400 with a compile button 1402 and a script development assistance button 1404. The standard editor 1400 may be configured for editing of a script and, via the compile button 1402, compiling the edited script. The standard editor 1400 may be suitable for experienced software developers, who may have used similar editors for script and/or program logic development.

7.1 Assistance for Adding Computational Items with Standard Editors

Figure 15A:
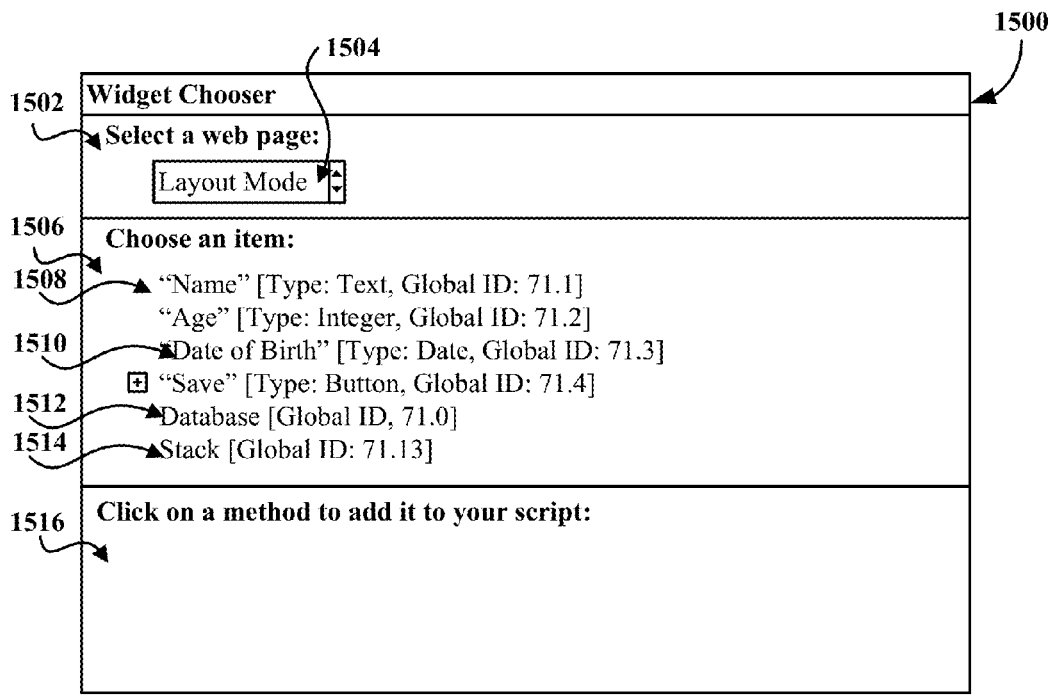
FIG. 15A depicts a dialog in accordance with an example embodiment.

Script development assistance can be provided by the "Add Item" button 1404 shown enhancing the standard editor window 1400 of FIG. 14. FIG. 15A depicts an example "Widget Chooser" dialog 1500. The "Widget Chooser" dialog 1500 may be displayed upon selection of the "Add Item" button 1404. The "Widget Chooser" dialog 1500 may display some or all computational items of a cloud-based application under development and/or enable assisted addition of script commands to perform operations on the computational items.

As shown in FIG. 15A, the Widget Chooser dialog 1500 includes three sections: a page selection section 1502, a computational item choice section 1506, and an instruction section 1516. The page selection section 1502 may allow selection of a page of the cloud-based application. By default, computational items for the current page of the cloud-based application are shown in the Widget Chooser dialog 1500 by default. A page selector 1504 provides for selection of a different (non-default) page of the cloud-based application for assistance, e.g., a page other than the current page.

The computational item choice section 1506 may include a list 1508 of the computational items on the selected page of the cloud-based application. As shown in FIG. 15A, the list 1508 can include a computational item name, computational item type, and one or more identifiers. For example, one computational item 1510 in the list 1508 has a computational item name of "Date of Birth," a computational item type of "Date," and a global ID of "71.3." Along with the computational items on the selected page, additional "pseudo-items" can be shown in the list 1508 to represent the database model 314 (e.g., the computational item "Database" 1512) and/or the application model 312 (e.g., the computational item "Stack" 1514).

An instruction section 1516 may instruct the designer about how to add a method to a script (e.g., "click on a method to add it to your script."). The instruction section 1516 section can list methods for a selected computational item of the list 1506 that are available for use an edited script. In response to selection of a page and a computational item via the "Widget Chooser" dialog 1500, the "Widget Chooser" dialog 1500 can populate the instruction section 1516 of the dialog with a list of methods applicable for the selected computational item.

Figure 15B:
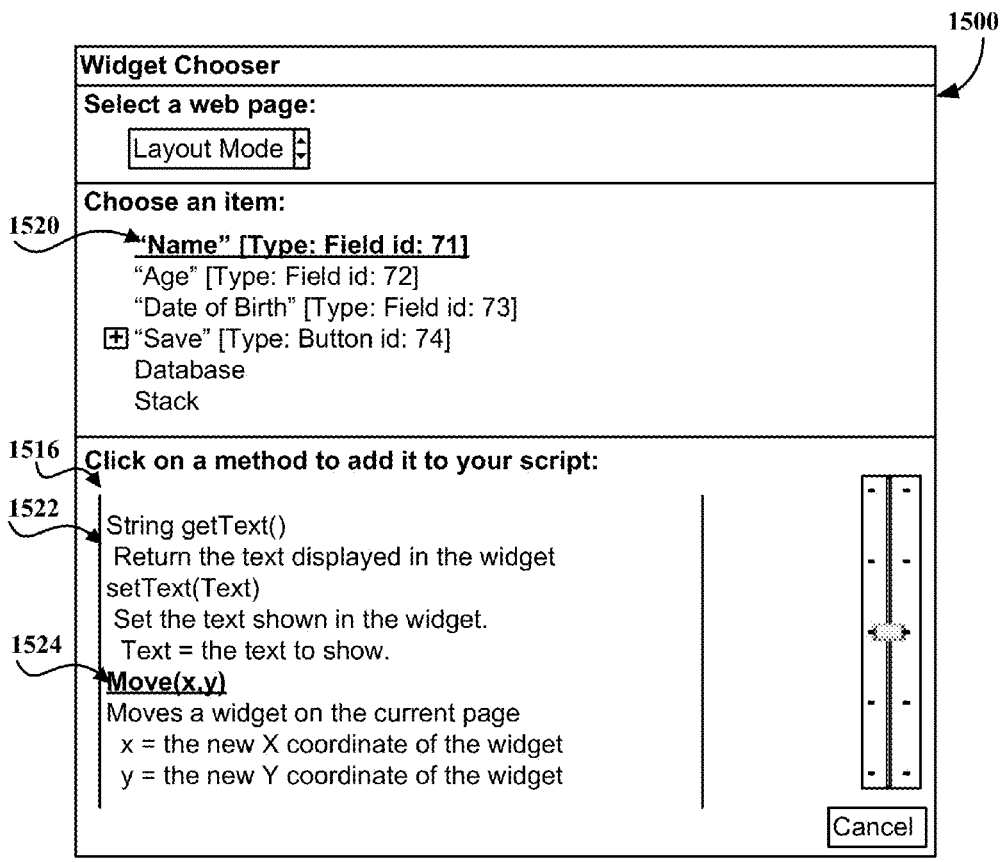
FIG. 15B depicts a dialog in accordance with another example embodiment.

FIG. 15B shows an example "Widget Chooser" dialog 1500 with the instruction section 1516 populated with methods for a selected computational item 1520. The selected computational item 1520 is a "Name" computational item, which is shown as selected in FIG. 15B using a bold and underlined font. FIG. 15B also shows the instruction section 1516 populated with a list of methods 1522 applicable to the selected Name object 1518. The list of methods 1522 may be a partial list of methods applicable to the selected computational item, as shown in FIG. 15B, or a complete list of methods.

As an example, suppose a "Move(x,y)" method 1524 is selected from the list of methods 1522. To indicate this selection, the Move(x,y) method 1524 is shown in a bold and underlined font in FIG. 15B. Upon selection of the Move(x,y) method 1524 in the Widget Chooser dialog 1500, a corresponding block of code may be inserted into the standard editor 1400.

Figure 15C:
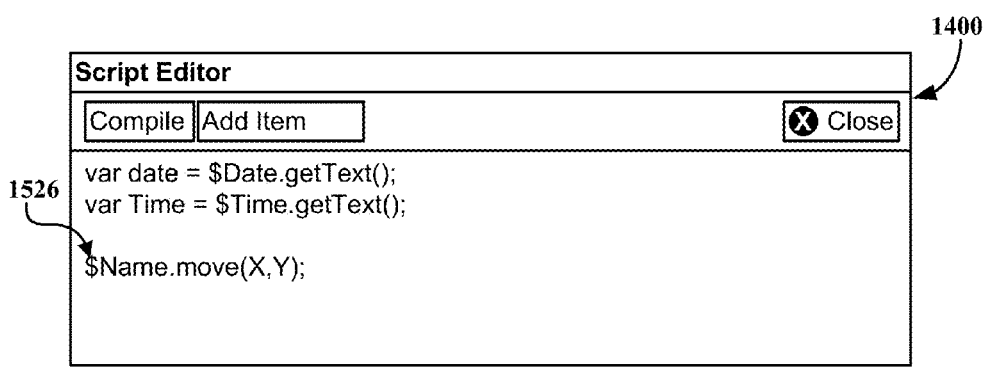
FIG. 15C depicts a window for an enhanced standard editor in accordance with another example embodiment.

To illustrate that point, FIG. 15C shows the editor window of standard editor 1400 with an inserted line of code 1526. FIG. 15C shows two lines of the existing script shown in FIG. 14 (e.g., the "var date= . . . " and "var Time= . . . " lines of code are shown in both FIGS. 14 and 15C).

The line of code 1526 shown in standard editor 1400 of FIG. 15C is a syntactically-correct new scripting language code of "$Name.move(X,Y);" that corresponds to the selected "Move(x,y)" method 1524. FIG. 15C also shows the line of code 1526 inserted into the existing script after the "Move(x,y)" computational item 1524 was selected as indicated in FIG. 15B and the corresponding line of code 1526 was appended to the script after the two lines of the existing script. Many other computational items, method, and inserted lines of code are possible as well. The script, including any inserted lines of code, can be stored, retrieved, and/or edited via the standard editor 1400 and/or via other types of editors.

7.2 Assistance for Adding Statements with Standard Editors

Figure 16A:
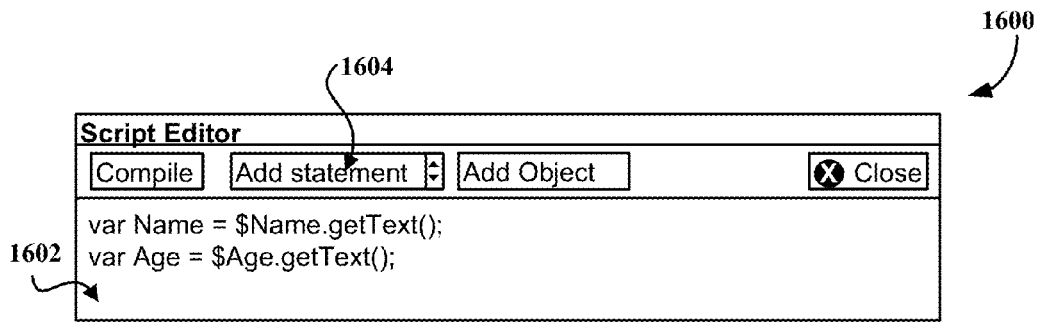
FIG. 16A depicts a window for an enhanced standard editor in accordance with another embodiment.
Figure 16B:
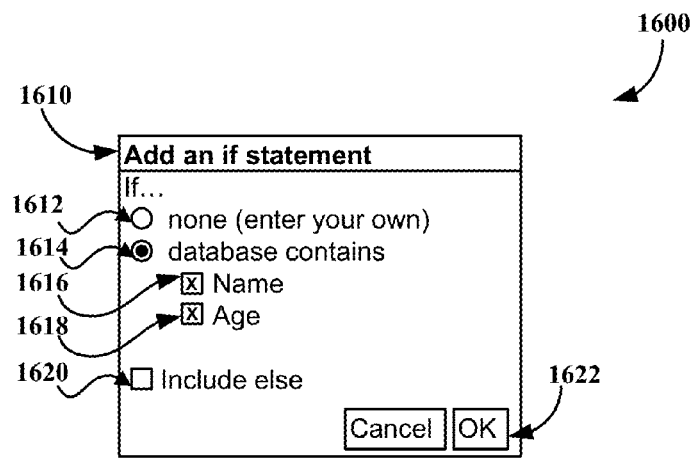
FIG. 16B depicts a dialog in accordance with another example embodiment.
Figure 16C:
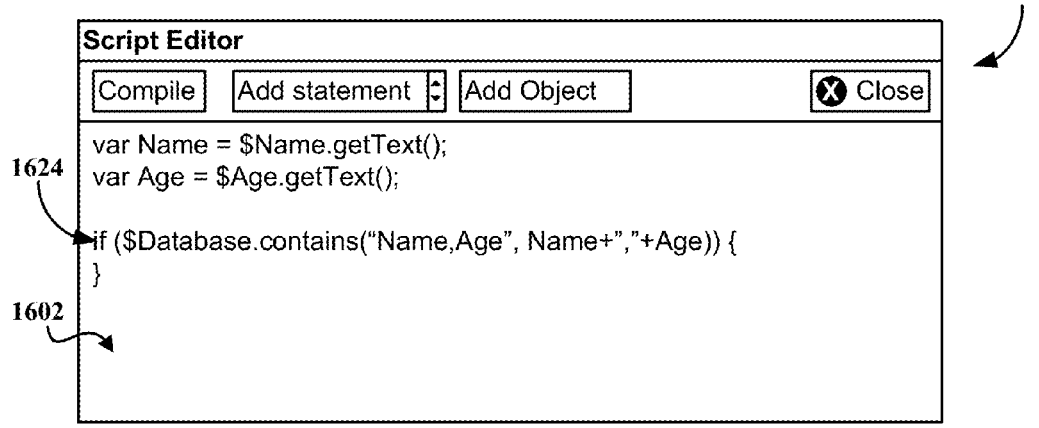
FIG. 16C depicts a window in accordance with another example embodiment.

FIGS. 16A through 16C show a scenario 1600 for providing another example level of assistance to aid with programming of JAVASCRIPT® syntax (e.g., "if . . . else" statements and "for" loops). This assistance technique is not restricted to helping with JAVASCRIPT® syntax and is applicable to any supported scripting language. FIG. 16A shows a standard editor 1602 enhanced with an "Add Statement" button 1604.

Once selected, the Add Statement button 1604 may cause a menu of statements to be displayed (not shown in FIG. 16A) for selection. This menu of statements may include if . . . else statements, loops, and/or other types of statements (e.g., a "switch" statement) used in the scripting language, perhaps along with statements used in other languages.

In the example scenario 1600, an "if . . . else" statement is selected from the menu of statements. FIG. 16B shows an example dialog 1610 for adding an "if . . . else" statement as part of scenario 1600. In other scenarios not shown in FIGS. 16A-C, dialogs for other types of statements may be displayed based on a corresponding selection in the menu of statements.

To aid discussion, a prototypical "if . . . else" statement is shown below to illustrate the roles of a "condition" and the optional "else" sub-statement.

```
if (condition)
{
    code to be executed when the condition is true;
}
else
{
    code to be executed when the condition is false;
}
```

The dialog 1610 may permit selections related to the "if . . . else" statement, such as radio buttons 1612 and 1614 related to conditions and check box 1620 related to the else sub-statement. Selection of the radio button 1612 may permit entry of a user-added condition, while selection of the radio button 1614 may permit entry of a pre-defined "database contains" condition related data stored in the database model 314.

In scenario 1600, the radio button 1614 is selected. Upon selection of the radio button 1614, possible fields used by the "database contains" condition may be displayed as part of dialog 1610. FIG. 16B shows the dialog 1610 displaying two example fields for the database contains statement, a "Name" field 1616 and an "Age" field 1618. In scenarios not shown in FIG. 16B, an "else" statement may be added to the "if" statement by selection of "else" selector 1620. In scenario 1600, both the "Name" field 1616 and "Age" field 1618 are selected from the dialog of FIG. 16B prior to selection of an "OK" button 1622.

FIG. 16C shows the example standard editor 1602 with a corresponding syntactically-correct new block of scripting language code 1624 for an "if . . . else" statement. The new block of scripting-language code 1624 may be inserted into a script in response to selection of the OK button 1622 of the dialog 1610. As shown in FIG. 16C, the new block of scripting-language code 1624 is:

```
if ($Database.contains("Name,Age", Name+","+Age)) {
}
```

The new block of scripting-language code 1624 may, upon execution, permit querying of the database model 314 of the cloud-based application for based on a combination of "Name" and "Age" data, which corresponds to the selections of the Name field 1616 and the Age field 1618 in dialog 1610 as shown in FIG. 16B. In scenarios other than scenario 1600, code to be executed when the database contains condition is true may be added as well via the dialog 1610 and/or the standard editor 1602.

In some embodiments, the inserted new block of scripting language code 1624 may include syntactically-correct definition of the Name and Age variables, such as shown above the "if" statement in the editor window 1602 of FIG. 16C. The script, including any new blocks of code, can be stored, retrieved, and/or edited via the standard editor 1400, the standard editor 1602 and/or the guided script editor 1702 described below.

7.3 The Guided Script Editor

FIGS. 17A through 17F show a scenario 1700 using a guided script editor 1702 that provides another level of assistance for guided scripting language programming. Programming of many other computer programming and scripting languages could be guided using the guided script editor 1702 as well.

Figure 17A:
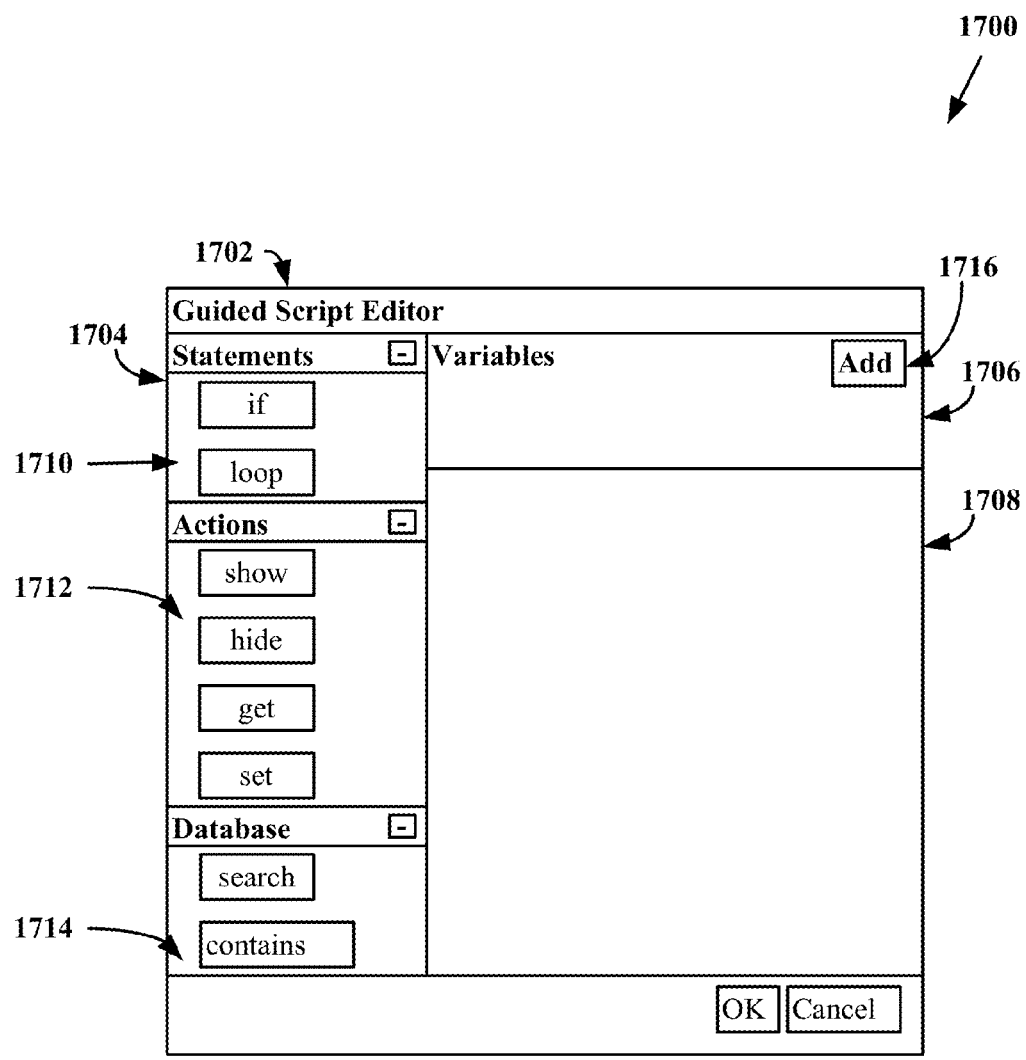
FIG. 17A depicts a guided script editor in accordance with an example embodiment.

FIG. 17A shows an example window for the guided script editor 1702. The guided script editor 1702 may be configured to define one or more scripts using a simplified, visually-enhanced syntax. For example, instead of using the standard JAVASCRIPT® "{ . . . }" notation for blocks of statements, the guided script editor 1702 can use defined screen areas to show control blocks. To aid comprehension, the guided script editor 1702 can use one or more conversational statements made in a non-programming language that are equivalent to one or more scripting-language statements. Some example non-programming languages include English, Spanish, French, German, Italian, Chinese, Japanese, Korean, Russian, Hindi, Urdu, and Greek; many other examples of non-programming languages are possible as well. For example, the guided script editor 1702 can display an English-language conversational statement of "set name to the value of Name" to represent an underlying scripting language statement, such as "var name=$Name.getText( )". In at least some cases, the conversational statement is simpler to read and understand, especially for a user without detailed knowledge of scripting languages. As such, a user of the guided script editor 1702 would not need detailed knowledge of scripting language syntax to write scripts.

The script generated by the guided script editor 1702 may be stored as a standard scripting language script. The generated script may be edited using the above-mentioned standard editor to enhance the capabilities of the script and/or learn how the underlying scripting language works. In some embodiments, some of the capabilities of the scripting language are not available via the guided script editor 1702. Rather, the guided script editor 1702 can provide a simplified version of a scripting language to support common scripting language operations without overwhelming a novice designer with options.

In some embodiments, the guided script editor 1702 may have two or more modes accounting for different levels of programming skill. For example, the two or more modes may include a "novice" mode that permits use of a very simplified version of a scripting language, a "moderate" mode that permits use of more functionality of the scripting language than the novice mode, and an "expert" mode that permits use of most (if not all) functionality of the scripting language. In other embodiments and scenarios, the guided script editor 1702 can provide conversational statements equivalent to statements in one or more non-scripting-language programming languages, such as but not limited to, C, C++, FORTRAN, Pascal, and other non-scripting-language programming languages.

FIG. 17A shows the example guided script editor window 1702 may be divided into areas. These areas may include a script element controls area 1704, a variables area 1706, and a script area 1708. The script elements controls area 1704 includes elements that can be assembled into a script. FIG. 17A shows the script element controls area 1704 divided into three sections corresponding to different elements of the script. These controls may include a "Statements" area 1710 for "if . . . else" statements and loop statements, an "Actions" area 1712 to show, hide, get, and set pages and/or widgets, and a "Database" area 1714 for database search and database contains statements. Each section of script elements area 1704 may be collapsible to allow hiding of unneeded sections. Other script element controls and/or sections of script element controls can be shown in the script elements controls area 1704 of guided script editor 1702 as well.

The variables area 1706 of the guided script editor permits addition of variables into the script by selecting an "Add" button 1716. In embodiments not shown in FIG. 17A, the variables area 1706 can have an additional button to delete a variable and/or other buttons for other variable operations (e.g., grouping variables into a computational item or data structure).

Additional help on an element-by-element basis can be provided by the guided script editor. For example, clicking on a control in the script element controls area can cause a dialog to be displayed with an explanation of what the control does in a script and any expected parameters for the control.

The script area 1708 is shown in FIG. 17A as a relatively-large blank box. To add a script element to a script, a user of the guided script editor 1702 can drag a button representing the corresponding script element from the script elements controls area 1704 into the script area 1708.

Figure 17B:
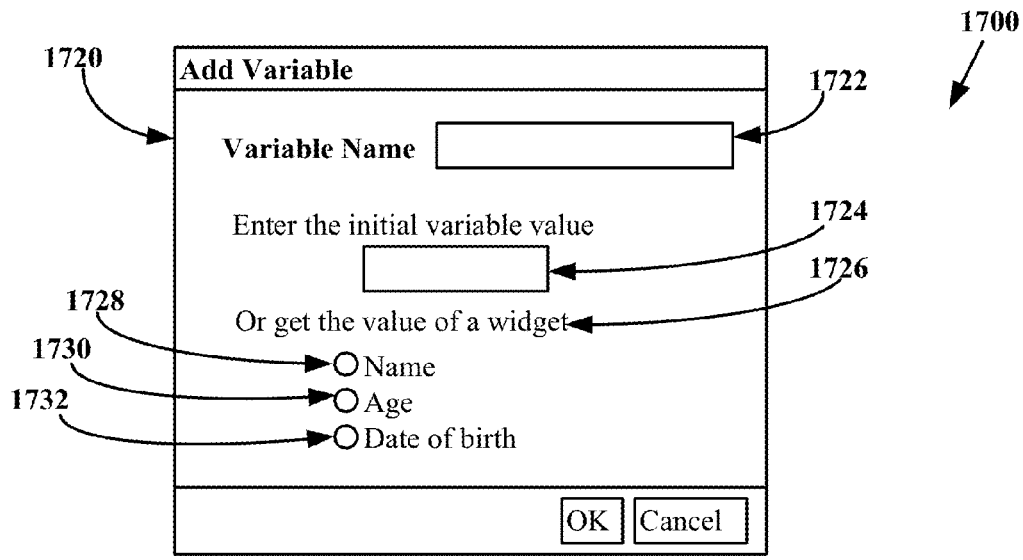
FIG. 17B depicts a dialog in accordance with another example embodiment.

Upon selection of the "Add" button 1716, a dialog to add variables can be generated and displayed by the guided script editor 1702. FIG. 17B shows an example "Add Variable" dialog 1720 for the guided script editor 1702 as part of the scenario 1700. The designer may use the "Add Variable" dialog 1720 to name a variable to be added to the script via a "Variable Name" text box 1722. For example, to add a variable named "Name", a user may type in "Name" into the "Variable Name" text box 1722.

The "Add Variable" dialog 1720 may permit initialization of the added variable in one of two fashions. The added variable can be explicitly initialized by entering an initial value for the variable using an initial-variable-value entry box 1724. For example, to initialize the newly-added variable to a value of 6, a user may type in a "6" into the initial-variable-value entry box 1724.

The "Add Variable" dialog 1720 may also permit initializing the newly-added variable to a value of a widget by choosing one of the widgets listed in a widget-value section of the "Add variable" dialog 1720. FIG. 17B shows that values of the "Name", "Age", or "Date of Birth" widgets can be selected for initialization via respective radio buttons 1728, 1730, and 1732. Upon selection of a respective radio button corresponding to a widget, the newly-added variable may be initialized to the corresponding widget's value at the time the script executes. For example, if the "Name" radio button 1728 is selected, the newly-added variable may be initialized to the value of a "Name" widget.

Figure 17C:
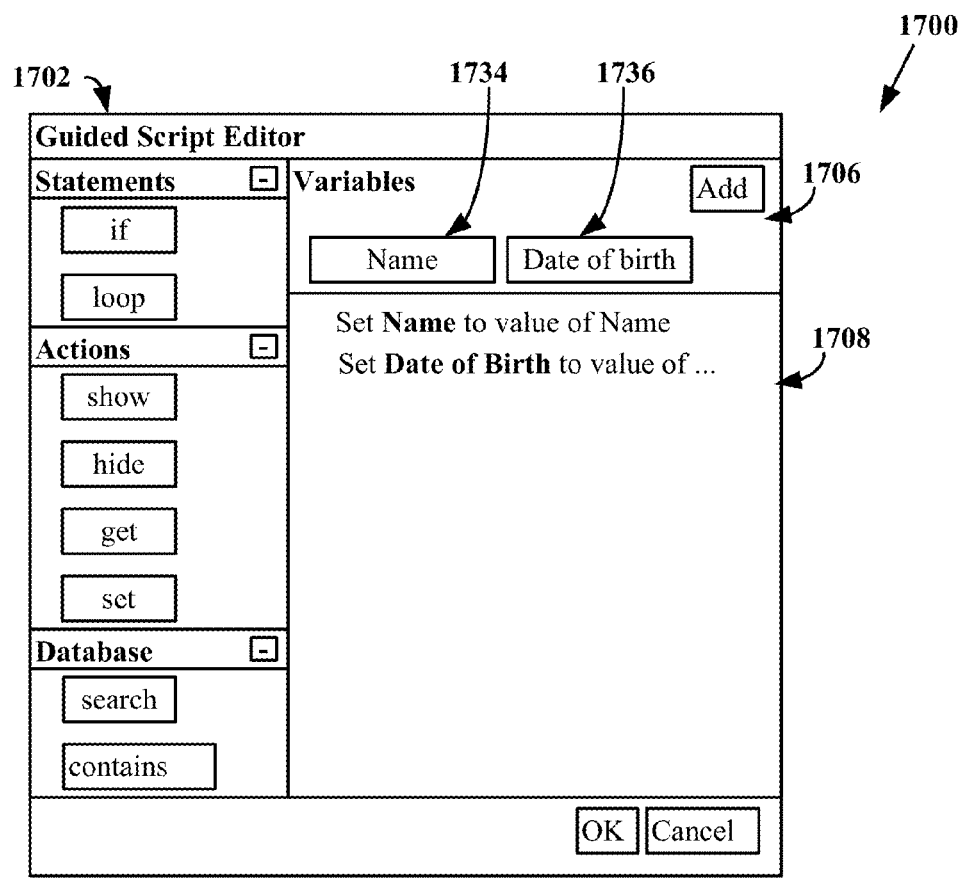
FIG. 17C depicts a guided script editor in accordance with another example embodiment.

FIG. 17C shows the example guided script editor window 1702 after addition of two variables as part of the scenario 1700. Once defined, each newly-added variable is included in the variables section 1706 of the guided script editor 1702 and the appropriate conversation statement is displayed in the script area 1708. In the scenario 1700, the variables "Name" and "Date of Birth" have been added. Correspondingly, FIG. 17C shows a button for "Name" variable 1734 and a button for the "Date of Birth" variable 1736 in the variables area 1706.

In some embodiments, clicking a variable button may cause the guided script editor 1702 to generate and display an "Update variable" dialog (not shown in FIGS. 17A-17F) similar to the "Add variable" dialog 1720. The update variable dialog may be configured to permit changing the name and/or initial value of a selected variable.

Figure 17D:
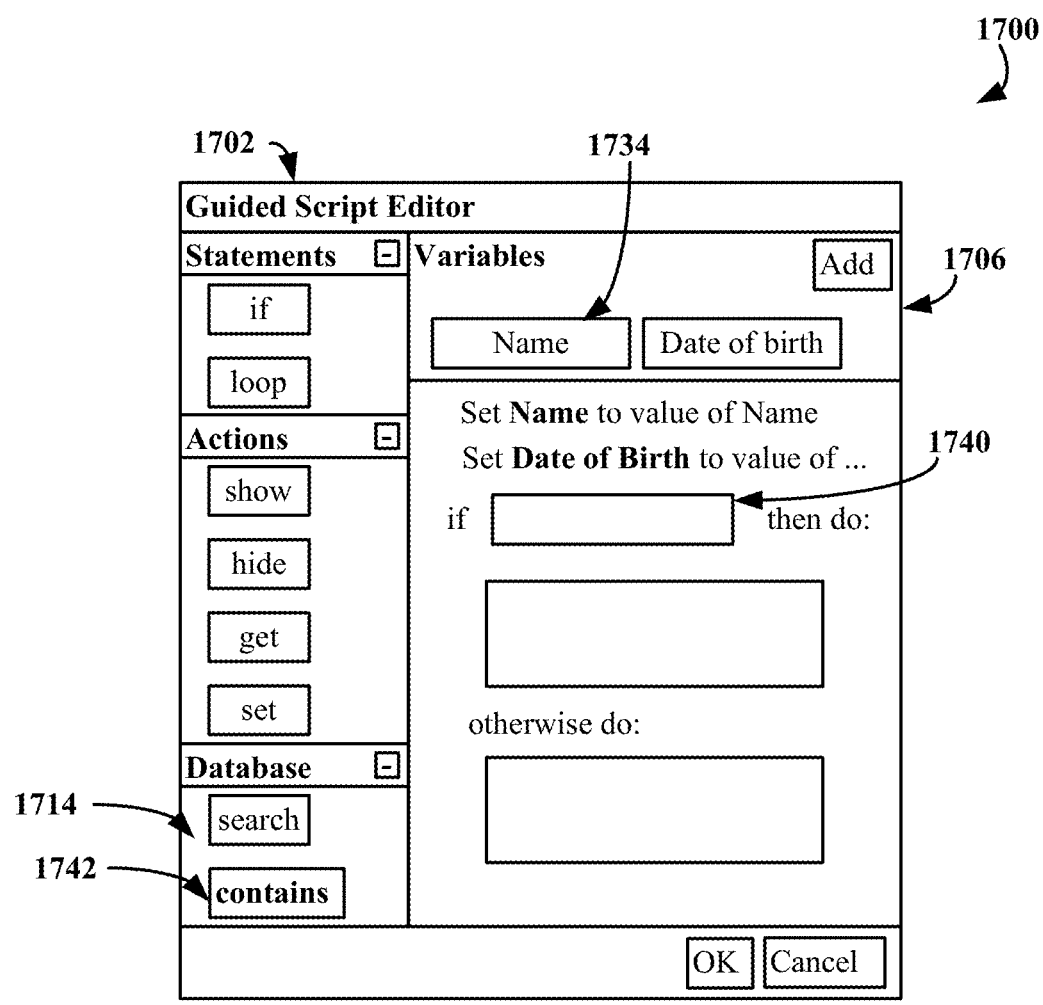
FIG. 17D depicts a guided script editor in accordance with another example embodiment.

Continuing the scenario 1700, elements of a script other than variables can be added to a script via the guided script editor 1702. FIG. 17D shows an example guided script editor window 1702 with a script area 1708 for adding an "if . . . else" statement to the script. The guided script editor 1702 includes a condition box 1740.

The condition box 1740 may be populated by dragging a condition element onto it. FIG. 17D shows the text of a "contains" condition 1742 of the database operations area 1714 in bold to represent selection of the "contains" condition 1742. As part of scenario 1700, the "contains" selection 1742 may be selected and then dragged into the condition subsection 1740.

Figure 17E:
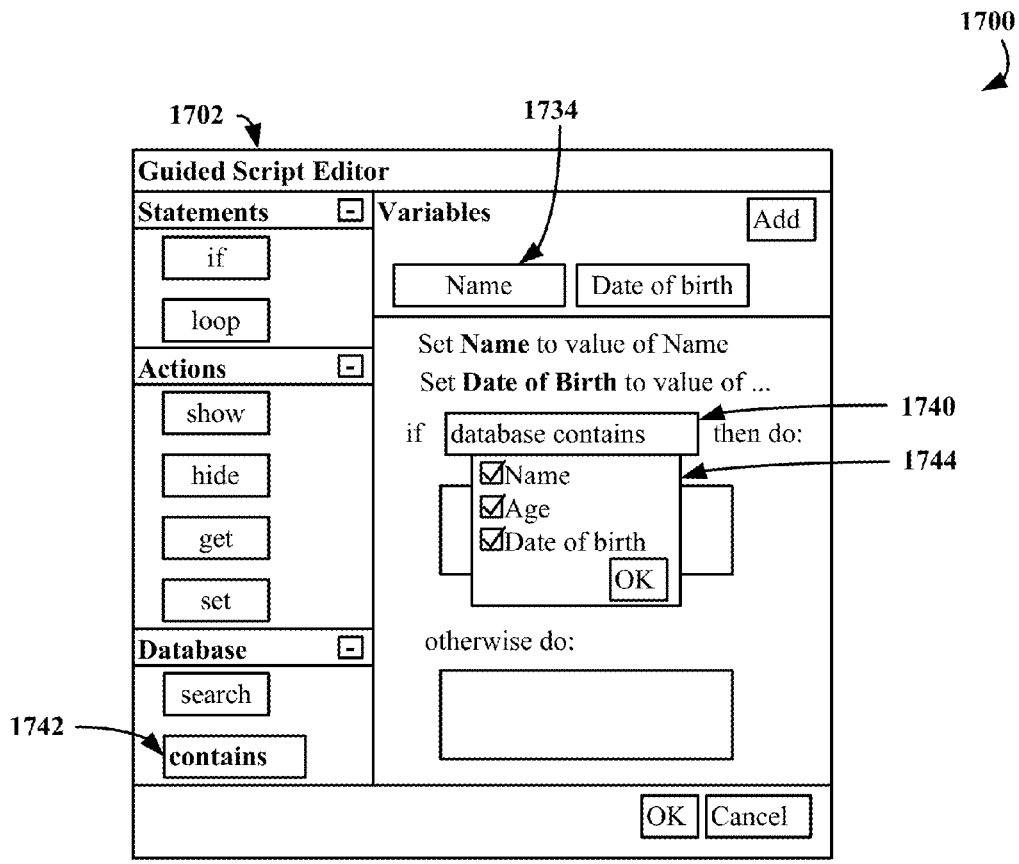
FIG. 17E depicts a guided script editor in accordance with another example embodiment.

FIG. 17E shows an example guided script editor window 1702 after the "contains" condition 1742 has been dragged into the condition box 1740. The condition box 1740 of FIG. 17E is populated with the database contains element. Additionally, in FIG. 17E, a pop-up 1744 is displayed that allows setting of parameters for testing with the database "contains" element. For scenario 1700, the parameters for testing can include widgets in the current application model page that can store data. FIG. 17E shows the selection of "Name", "Age" and "Date of Birth" widgets in pop-up 1744.

In another possible selection, a variable button, such as the "Name" button 1734 can be selected and dragged into the condition box 1740. In response to dragging a variable button into the condition box 1740, the guided script editor 1702 may display a dialog that allows a designer to add a condition.

Figure 17F:
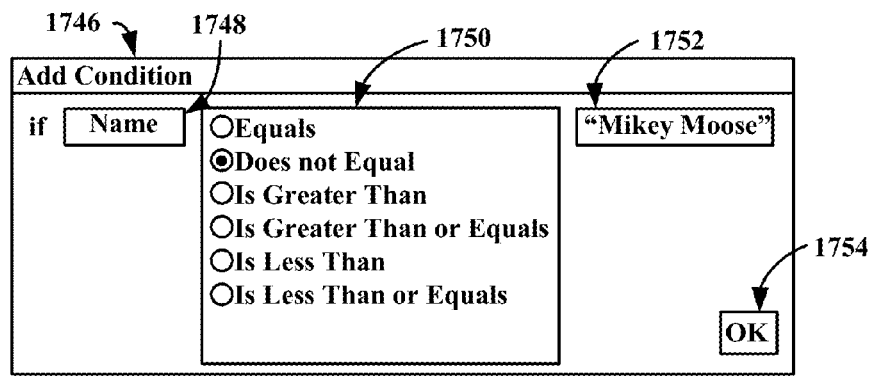
FIG. 17F depicts a dialog in accordance with another example embodiment.

FIG. 17F shows an example "Add Condition" dialog 1746. The "Add Condition" dialog 1746 may permit addition of a condition. As shown in FIG. 17F, the "Add Condition" dialog 1746 includes a left-hand-side entry box 1748, a comparison-operation menu 1750, and a right-hand-side entry box 1752. Each sub-section of the condition can be completed by dragging a script element control into an empty sub-section of the condition. As an example, suppose the desired condition is to test the "Name" variable as not being equal to the string "Mikey Moose." Then, a user could drag the "Name" variable button 1734 into the left-hand-side entry box 1748 to fill the left-hand-side entry box 1748 with "Name". In other scenarios, a user could type "Name" into the left-hand-side entry box 1748 instead of dragging the "Name" variable button 1734. To use the desired not equals comparison operator, the user may click on the "Does not Equal" radio button of comparison-selection menu 1750. To complete the comparison, the user may type "Mikey Moose" into right-hand-side entry box 1752 and then click "OK" button 1754. Many other comparisons can be entered as well are possible as well using the guided script editor 1702.

Once the condition statement and any code to be executed when the condition is true and/or false is completed, the guided script editor can generate a corresponding if . . . else statement to be added to the script. The script, including any added scripting language instructions, can be stored, retrieved, and/or edited using the guided script editor 1702 and/or using a standard editor (e.g., standard editor 1400 or standard editor 1600) or another type of editor.

7.4 Example Methods for Script Assistance

Figure 18:
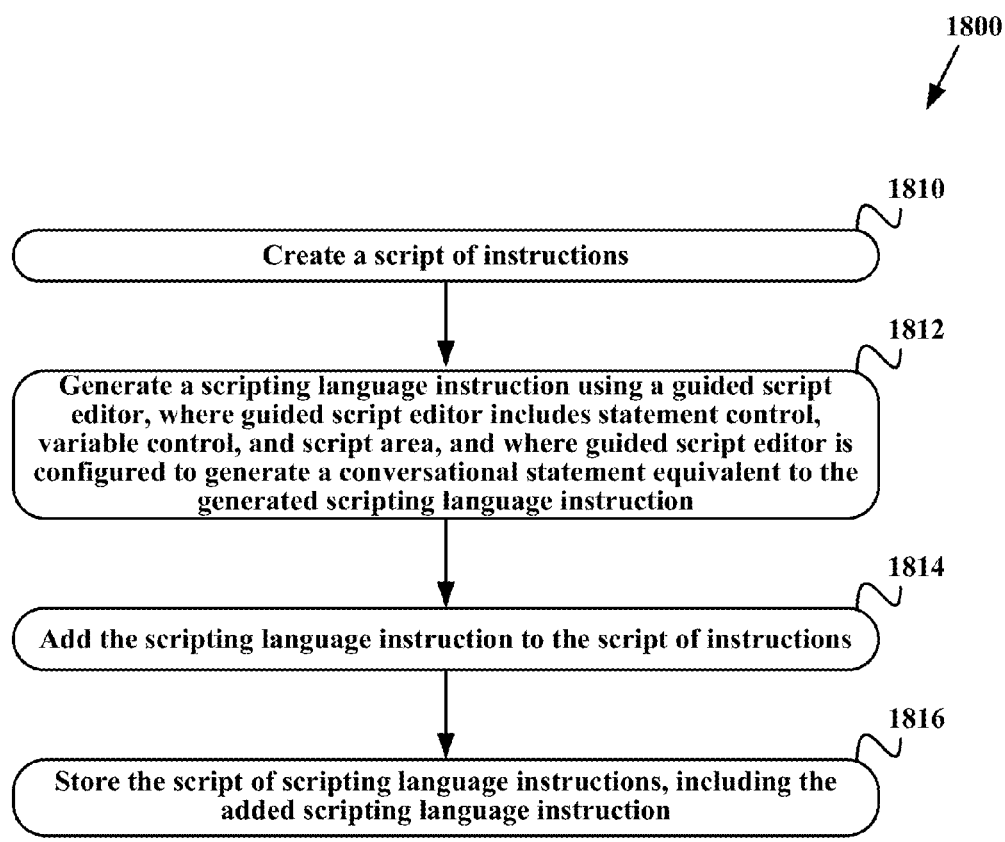
FIG. 18 is a flow chart in accordance with an example embodiment.

FIG. 18 shows a flow chart 1800 according to an example embodiment for adding a scripting language instruction to a script of scripting language instructions and storing the script.

At a block 1810, a script of scripting language instructions is created, possibly via a computing device. At a block 1812, a scripting language instruction is generated using a guided script editor of the computing device. The guided script editor may include a statement control, a variable control, and a script area. The guided script editor may be configured to generate a conversational statement equivalent to the generated scripting language instruction. The conversational statement may be made in a non-programming language, such as English, or in a non-scripting-language programming language, such as C++.

At block 1814, the scripting language instruction is added to the script of scripting language instructions. At block 1816, the script of scripting language instructions, including the added scripting language instruction, is stored via the computing device. In some embodiments, the statement control may include an if . . . else control. In particular, generating the scripting language instruction may include receiving a selection of the if . . . else control, receiving condition input to complete a condition sub-section of the if . . . else control, receiving parameter input to complete parameters of the if . . . else control, and generating an if . . . else statement based on the condition input and the parameter input.

In other embodiments, generating the scripting language instruction may include receiving a selection of the variable control and generating a variable statement based on the selection. Receiving the selection of the variable control can include receiving a name input and an initialization input for a variable. Generating the variable statement can include generating the variable statement based on the name input and the initialization input.

Figure 19:
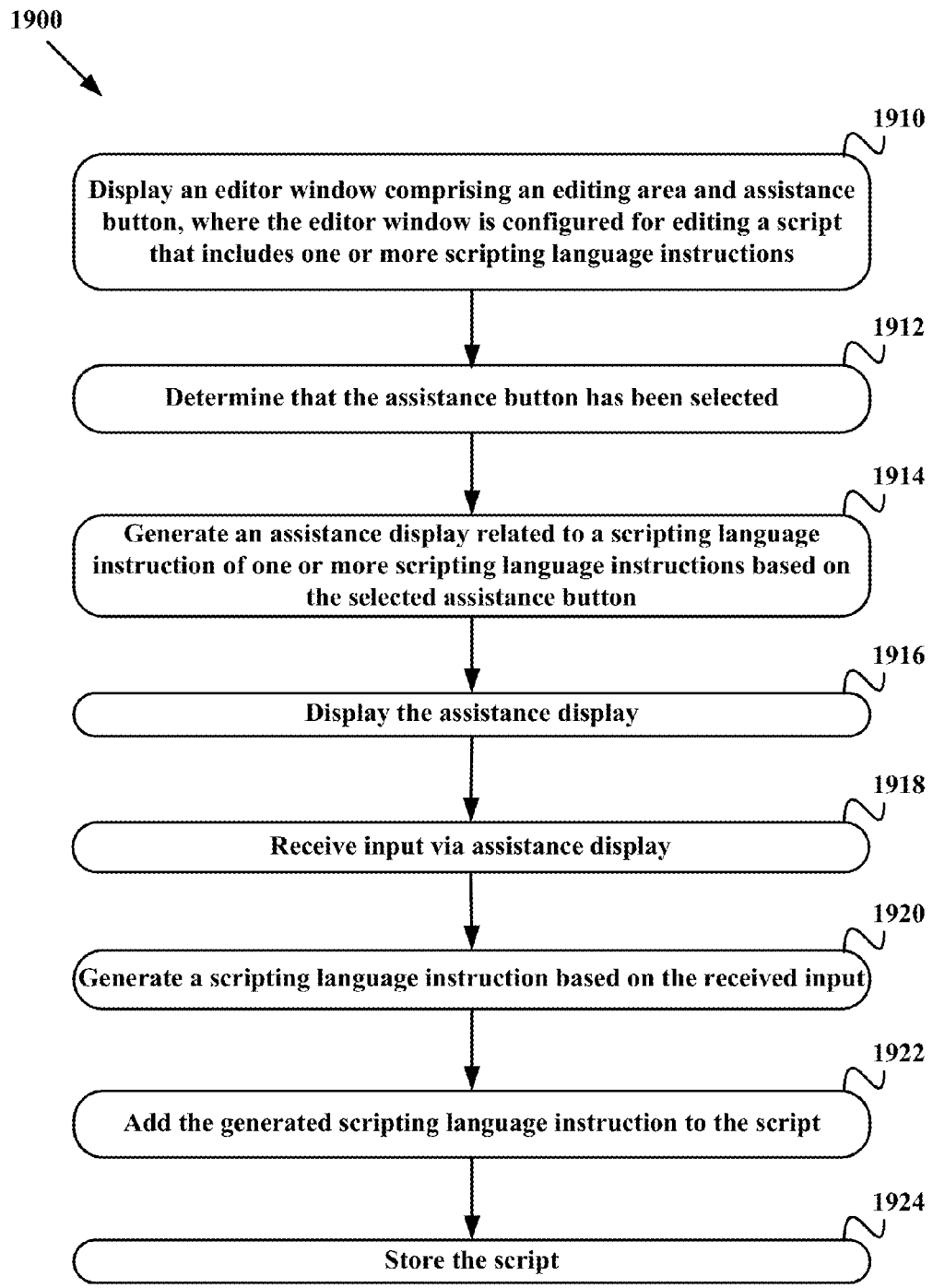
FIG. 19 is a flow chart in accordance with another example embodiment.

FIG. 19 shows a flow chart 1900 according to another method for adding a scripting language instruction to a script of scripting language instructions and storing the script. At a block 1910, an editor window is displayed, possibly via a computing device. The editor window may include an editing area and an assistance button. The editor window may be configured for editing a script that includes one or more scripting language instructions.

At a block 1912, the computing device may determine that the assistance button has been selected. The assistance button may be selected to request assistance with a particular scripting language instruction. At a block 1914, the computing device may generate an assistance display related to the particular scripting language instruction of the one or more scripting language instructions based on, and perhaps in response to selection of the selected assistance button. At a block 1916, the computing device may display the assistance display.

At a block 1918, the computing device may receive input via the assistance display. The input may specify a variable name, a variable value, a computational item, a scripting language method, part or all of a scripting language instruction, and/or other types of input.

At a block 1920, the computing device may generate the particular scripting language instruction based on, and perhaps in response to, the received input. The scripting language instruction may include a variable assignment statement, an "if . . . else" statement, a looping statement (e.g., for loop, repeat loop, while loop), an invocation of a scripting-language method, and/or other types of statements.

At a block 1922, the computing device may add the particular scripting language instruction to the script. At a block 1924, the script is stored via the computing device. The script may be stored on the computing device and/or communicated to another computing device for storage.

In some embodiments of flow chart 1900, the assistance button includes an add-statement button and the assistance display includes an add-statement display. In these embodiments, receiving input via the assistance display may include receiving a statement-selection input via the add-statement display to select a statement, and receiving a parameter-selection input via the add-statement display to select a parameter related to the statement. In these embodiments, generating the scripting language instruction based on the received input may include generating the scripting language instruction based on the statement-selection input and the parameter-selection input.

In other embodiments of flow chart 1900, the assistance button includes an add-computational-item button and the assistance display includes an add-computational-item display. In these other embodiments, receiving input via the assistance display may include receiving a computational-item-selection input via the add-statement display to select a computational item, and receiving a method-selection input via the add-statement display to select a method related to the computational item. In these other embodiments, generating the scripting language instruction based on the received input may include generating the scripting language instruction based on the computational-item-selection input and the method-selection input.

8. CREATION AND CONFIGURATION OF COMPOUND WIDGETS

As briefly described in Section 4.3, individual widgets from the widget palette 410 of development environment 400 may be combined to form a compound widget. The ability to quickly and easily create compound, re-usable widgets may reduce the time and complexity required to develop and maintain cloud-based applications. For example, there are many instances where it may be beneficial for a particular set of widgets, with shared and/or custom behavior, to appear more than once on a particular page, stack, or application.

Through the use of compound widgets, this shared and/or custom behavior need only be defined once. Additionally, any changes to one instantiated compound widget may be automatically propagated to the other instantiations of the compound widget. Furthermore, the compound widget may be promoted to a first class widget (e.g., available in the widget palette 410 for further instantiation of a same or similar set), making it easier to re-create, share, manipulate, and maintain particularly defined sets of widgets.

Returning to FIG. 4 and as shown in the widget palette 410, a plurality of first-class widgets may be loaded by the development environment 400 and made available for a designer to drag and drop into the application workspace 414 to form a part of a cloud-based application. As mentioned above and as illustrated in FIG. 4, first-class widgets may include, for example, a field widget, a media widget, a button widget, a test widget, a menu widget, a color widget, a list widget, and a select widget. As mentioned above, an advantage of compound widgets is that, once created, they can be added to the widget palette 410 as a first-class widget that can be similarly instantiated in the future by simply dragging the compound widget from the widget palette 410 to the application workspace 414.

Additionally, the compound widget may be accessible via either (or both) of the development environment 400 and/or the application model datastore 102. Thus, the compound widget may be loaded by the development environment 400 and made available for a designer to drag and drop into the application workspace 414 on different pages of the current stack or in a new stack of a new cloud-based application. The created compound widget may also be made available to other designers, perhaps in accordance with an access control list, and in a similar manner to that set forth above with respect to application models and database models.

Figure 20:
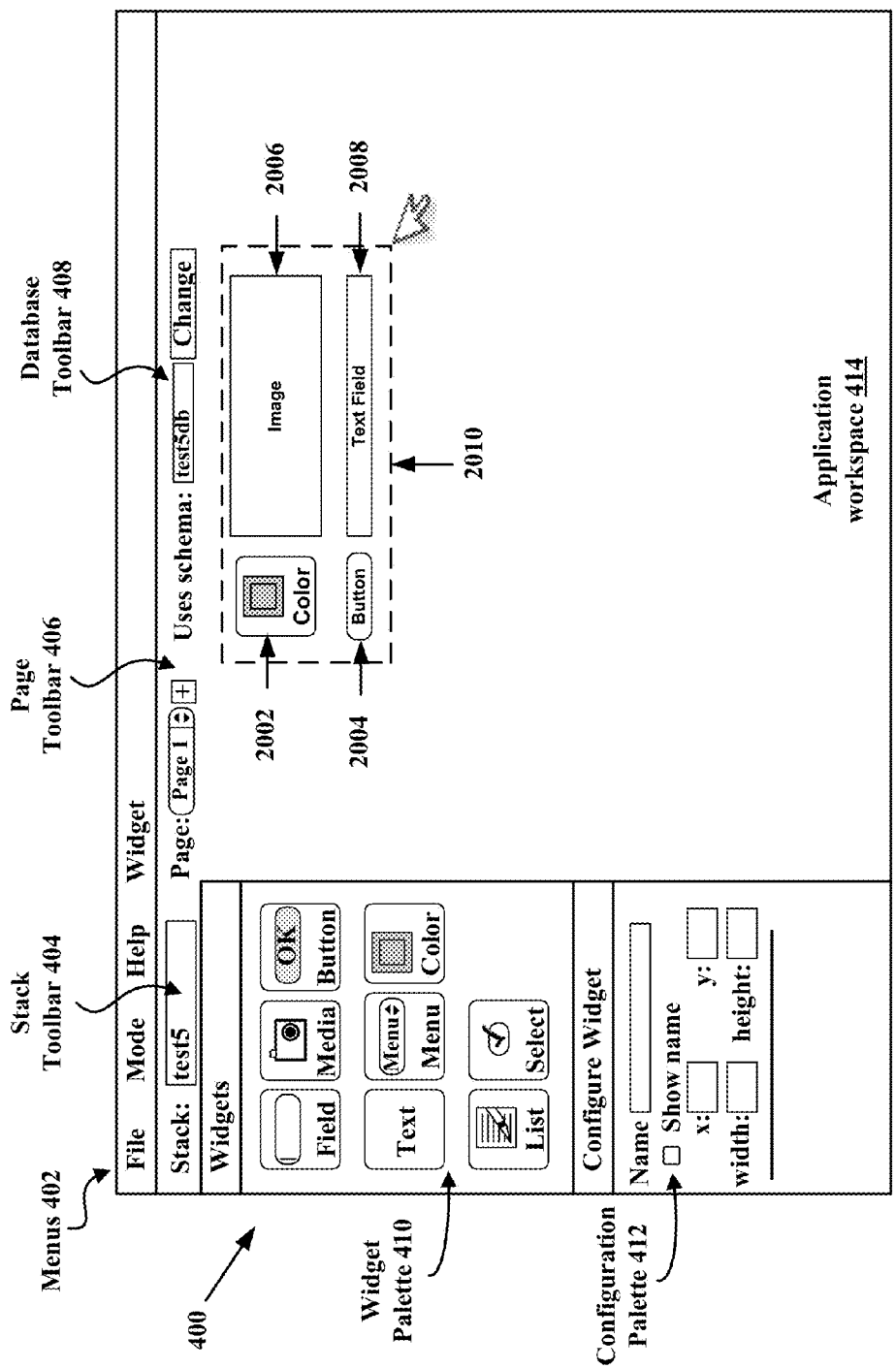
FIG. 20 depicts a development environment in accordance with an example embodiment.

FIGS. 20-23 illustrate examples of creating a compound widget in the development environment 400. A compound widget may be created from a set of already-existing first-class widgets. As illustrated in FIG. 20, a user may drag and drop a plurality of first-class widgets, including, for example, a color widget 2002, a button widget 2004, a media widget 2006, and a text widget 2008, from the widget palette 410 to the application workspace 414. While this example uses a particular set and arrangement of first-class widgets as illustrated in FIG. 20, any other types of widgets, and any other arrangement of the widgets, could additionally or alternatively be used.

After placing the first-class widgets that form the compound widget in the application workspace 414 and arranging them in a desired relationship relative to one another, the widgets may be selected via an input selection process, illustrated in FIG. 20 as a dashed selection line box 2010. The dashed selection line box 2010 may be created by a designer dragging a cursor across the selection of first-class widgets 2002-2008. The selection of the first-class widgets may result in a crosshatch, highlight, change in color, or other mechanism applied to the first-class widgets 2002-2008 to provide visual feedback to the designer of the selected first-class widgets that will form a part of the compound widget.

Once the designer arranges and selects the desired first-class widgets, the designer may generate an instruction to create a compound widget from the selected first-class widgets. The instruction may be provided in any number of ways. For example, a "click" on an input device having input buttons, such as a mouse, may display a menu from which the designer may select a menu item entitled "Create Compound Widget." Alternatively or additionally, the designer may access the "Widget" drop-down menu in the menus 402 toolbar, and similarly select a menu item entitled "Create Compound Widget" from the list of menu items in the resulting drop-down menu. Other methods could be used as well.

Figure 21:
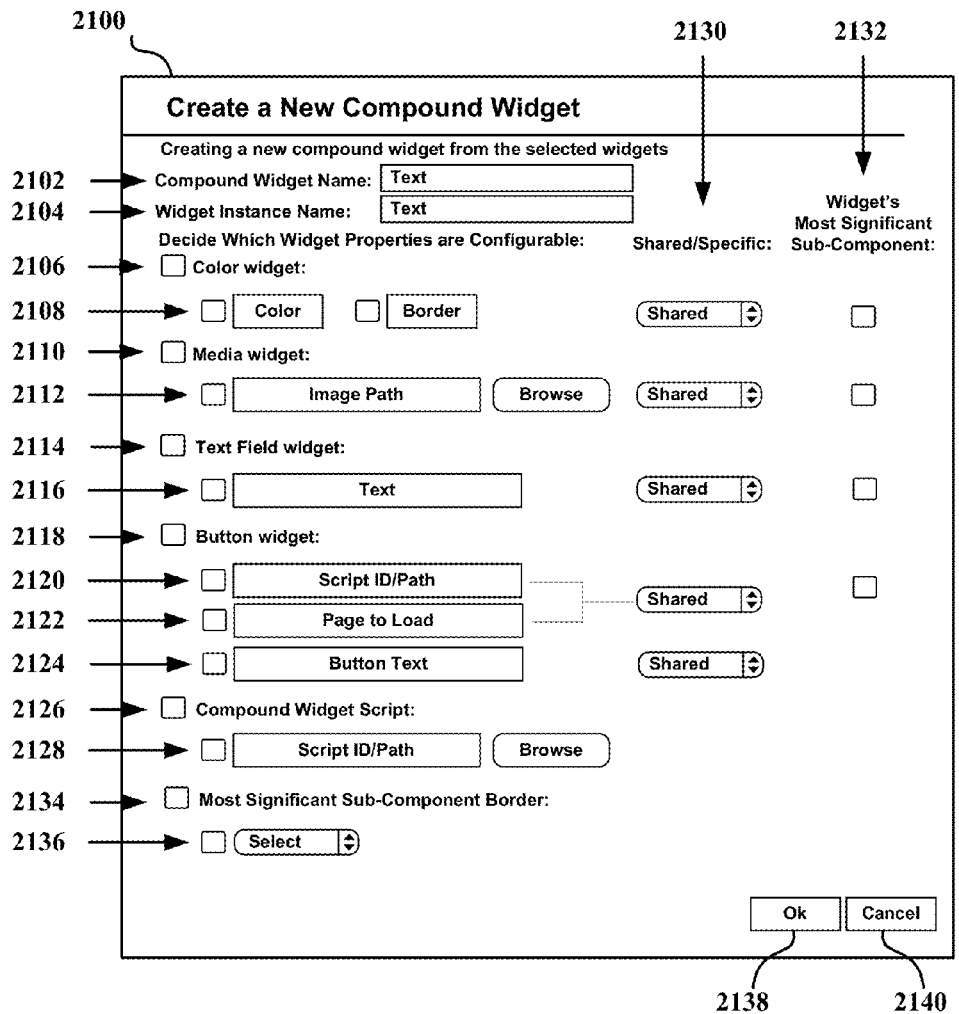
FIG. 21 depicts an example option dialog box in accordance with an example embodiment.

FIG. 21 depicts an example option dialog box 2100 for use in creating a compound widget that may appear responsive to the designer selecting the "Create Compound Widget" menu selection. As shown in FIG. 21, the option dialog box 2100 allows a user to set values for a compound widget name 2102, a current compound widget instance name 2104, color widget options 2106-2108, media widget options 2110-2112, text field widget options 2114-2116, button widget options 2118-2124, compound widget script options 2126-2128, shared/specific settings 2130, an identification of the most significant graphical display sub-component 2132, and most significant graphical display sub-component border options 2134-2136. Nonetheless, the option dialog box 2100 is just one example, and in other embodiments, more or fewer options may be provided to configure the compound widget. These options may change depending on the particular set of first class widgets selected to form member widgets of the compound widget.

The compound widget options 2102 and 2104 may allow the designer to set the compound widget name 2102 (which may identify the compound widget type and be shared across all instances of that compound widget), and the widget instance name 2104 (which may be the name of the current instance of the compound widget, and may be unique to each instance of that compound widget).

The color widget options 2106 and 2108 may allow the designer to set options for the color widget, which was selected as a member of the compound widget. In an embodiment in which the color widget was not selected, the color widget options 2106 and 2108 may, for example, not be displayed or may be grayed out. Additionally or alternatively, the color widget check box 2106 may be used to add or remove the color widget from the current compound widget. Checking the color widget check box 2106 may add the color widget to the current compound widget, while un-checking the color widget check box 2106 may remove the color widget from the current compound widget. The color widget options 2108 may include, for example, a color button that may be used to select a particular color for a corresponding color swatch of the color widget (such as red, blue, or white), and a border button that may be used to select a particular border (or lack thereof) to appear at outer edges of the corresponding color swatch of the color widget. The color selected for the color widget is one example of a graphical display sub-component of the color widget, which may be incorporated into the compound widget. Other options could also be provided, or a subset of the example options provided.

The media widget options 2110 and 2112 may allow the designer to set options for the media widget, which was selected as a member of the compound widget. In the event that the media widget was not selected, the media widget options 2110 and 2112 may, for example, not be displayed or may be grayed out. Additionally or alternatively, the media widget check box 2110 may be used to add or remove the media widget from the current compound widget. Checking the media widget check box 2110 may add the media widget to the current compound widget, while un-checking the media widget check box 2110 may remove the media widget from the current compound widget. The media widget options 2112 may include, for example, an image path text box and a browse button for interactively identifying an associated image via a graphical file-system display. Other options could also be provided, or a subset of the example options provided. For example, other types of media could be selected for the media widget, such as video, audio, flash animation, etc., and other respective types of options could be provided, such as volume for sound, and auto-start for video and animations. All of these media options may comprise another graphical display sub-component of the media widget, which may be incorporated into the compound widget.

The text field widget options 2114 and 2116 may allow the designer to set options for the text field widget, which was selected as a member of the compound widget. In the event that the text field widget was not selected, the text field widget options 2114 and 2116 may, for example, not be displayed or may be grayed out. Additionally or alternatively, the text field widget check box 2114 may be used to add or remove the text field widget from the current compound widget. Checking the text field widget check box 2114 may add the text field widget to the current compound widget, while un-checking the text field widget check box 2114 may remove the text field widget from the current compound widget. The text box widget options 2116 may include, for example, a text field for entering the text to appear in the corresponding text field of the text field widget. Other options could also be provided, or a subset of the example options provided. For example, options could be provided to determine whether a text-scroll box is provided in the corresponding text field, or perhaps whether the corresponding text field created by the widget is scaled to accommodate the amount of text entered into the corresponding text field. The text selected for the text field widget is one example of a graphical display sub-component of the text widget, which may be incorporated into the compound widget.

The button widget options 2118, 2120, 2122, and 2124 may allow the designer to set options for the button widget, which was selected as a member of the compound widget. In the event that the button widget was not selected, the button widget options 2118-2124 may, for example, not be displayed or may be grayed out. Additionally or alternatively, the button widget check box 2118 may be used to add or remove the button widget from the current compound widget. Checking the button widget check box 2118 may add the button widget to the current compound widget, while un-checking the button widget check box 2118 may remove the button widget from the current compound widget. The button widget options 2120 may include, for example, identifying a particular script to execute when the corresponding button is activated. A complied script identifier may be entered into the text box of button widget options 2120. Additionally or alternatively, the compiled script identifier may be automatically populated into the text box of button widget options 2120 when a corresponding script or scripts that reference the button widget are created and/or stored by the designer. The button widget options 2122 may specify, in addition to or alternative to executing a script, a new page in the current stack to switch to when the corresponding button is activated. The button widget options 2124 may specify a button text to include within the borders of the corresponding button. The text and color elements of the button widget are examples of graphical display sub-components of the button widget, which may be incorporated into the compound widget. The script associated with the button widget is an example of a functional characteristic of the button widget that may be incorporated into the compound widget. Other options could also be provided, or a subset of the example options provided.

The compound widget script options 2126 and 2128 may allow the designer to specify a compound widget script that may be associated with the compound widget. The compound widget script may control over-all interactions between member widgets, for example, or could be used to initialize or modify behavior of member widgets, among other possibilities. A complied script identifier may be entered into the text box of the compound widget script options 2128. Additionally or alternatively, the compiled script identifier may be automatically populated into the text box of the compound widget script options 2128 when a corresponding script or scripts that reference the compound widget are created and/or stored by the designer. Other options could also be provided, or a subset of the example options provided.

The shared/specific widget options 2130 may allow the designer to specify whether each of the widget options 2108, 2112, 2116, 2120/2122, and/or 2124 are to be shared across all instances of the compound widget, or are to be set specifically for each instance of the compound widget. Shared options (e.g., characteristics) may be automatically set and populated when a compound widget is instantiated (e.g., they may be incorporated from the individual widgets from which the compound widget is created). In some embodiments, additional shared options may be added to the compound widget. In contrast to the shared options, specific options (e.g., characteristics) may be required to be set to some value each time the compound widget is instantiated, although default values may be provided in one embodiment. Particular widgets and/or particular widget options may be set to always be one of a shared characteristic or a specific characteristic. In some embodiments, widgets and/or widget options may default to one or the other of the shared and specific characteristic, but then allow the designer to modify that default characteristic.

The most significant graphical display sub-component widget option 2132 may allow a designer to explicitly identify the most significant graphical display sub-component (e.g., member widget or member widget component) of the compound widget. This information may be used to determine how best to align the compound widget with other widgets on the current page of the stack, in the design mode 302, preview mode 304, or run mode 306. The most significant graphical display sub-component widget option 2132 may be used in combination with the most significant graphical display sub-component border widget options 2134 and 2136. Once a particular graphical display sub-component is identified as the most significant graphical display sub-component via most significant graphical display sub-component widget option 2132, the most significant graphical display sub-component border widget options 2134 and 2136 may be used to set what particular border of the identified most significant graphical display sub-component should be used in arranging the compound widget relative to other widgets on the current page of the stack. Selectable entries for the most significant graphical display sub-component border option 2136 may include, for example, top, left, right, bottom, and center, among other possibilities.

An "Ok" button 2138 may complete the creation of the compound widget with the widget options selected in dialog box 2100. Selecting the "Ok" button 2138 may also execute validation program logic to ensure that there are no errors in the widget option boxes set forth in the dialog box 2100. For example, such validation may include ensuring that only one most significant graphical display sub-component via most significant graphical display sub-component widget option 2132 box is selected out of the plurality of available boxes, and/or that the compound widget name 2102 and widget instance name 2104 are completed and are different from one another. Other validation procedures are possible as well. And other actions responsive to execution of the "Ok" button 2138 and/or other validation functions are possible as well. Selecting the "Cancel" button 2140 may allow the designer to refrain from creating the compound widget, and may remove the dialog box 2100 from the screen. Other actions responsive to execution of the "Cancel" button 2140 are possible as well.

Figure 22:
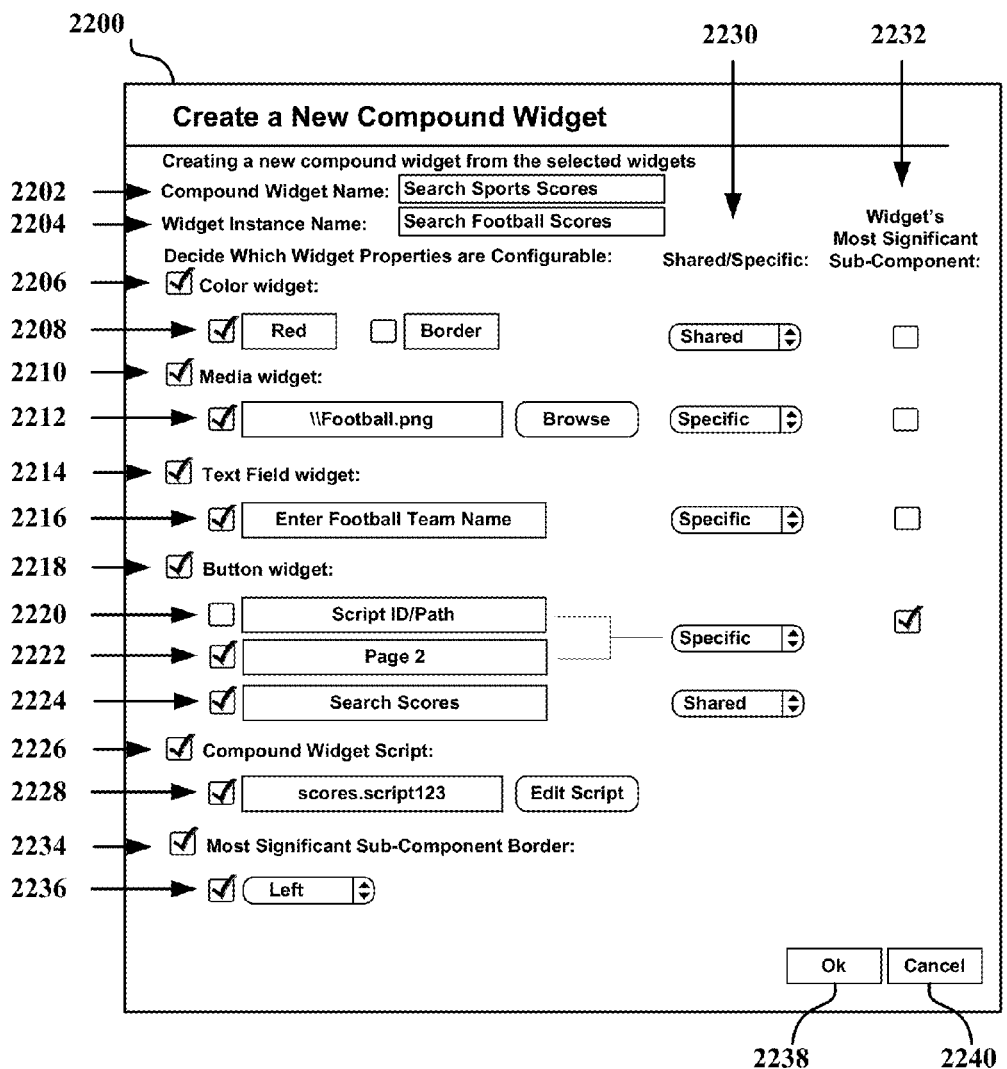
FIG. 22 depicts an example completed option dialog box in accordance with an example embodiment.

FIG. 22 sets forth an example of a completed compound widget dialog box 2200. While FIG. 22 illustrates particular options that have been completed and/or modified relative to FIG. 21, which may be discussed here, in other embodiments, more or fewer of the options 2102-2136 of FIG. 21 may be completed, and or a different selection, arrangement, or contents of options may be completed.

As set forth in FIG. 22, the compound widget name 2202 has been set to "Search Sports Scores." This name can be set to a general name and may be used to describe the overall functionality of the compound widget in general, instead of the particular function of an instantiated copy of the compound widget. The compound widget name 2202 may be associated with all instances of the compound widget. In contrast, the widget instance name 2204 has been set to a more specific title "Search Football Scores." This name may be used to describe the particular functionality of a particular instance of the compound widget, and should be unique across all instances of the same compound widget Because a color widget was included in the compound widget selection, the check box option 2206 is selected. Deselecting the check box option 2206 may remove the color widget from the compound widget (and perhaps any instances of the compound widget already created). Additionally, the color widget option 2208 "Color" has been set to the color "Red" in this example. The lack of a selection for the "Border" option may mean that no separate border is provided, or that a default border is provided.

Because a media widget was included in the compound widget selection, the check box option 2210 is selected. Deselecting the check box option 2210 may remove the media widget from the compound widget (and perhaps any instances of the compound widget already created). Additionally, the media widget option 2212 "Image Path" has been set to "\\Football.png" in this example to reference a stored image of a football at the indicated file system path.

Because a text field widget was included in the compound widget selection, the check box option 2214 is selected. Deselecting the check box option 2214 may remove the text field widget from the compound widget (and perhaps any instances of the compound widget already created). Additionally, text field widget option 2216 "Text" has been set to the text string "Enter Football Team Name."

Because a button widget was included in the compound widget selection, the check box option 2218 is selected. Deselecting the check box option 2218 may remove the button widget from the compound widget (and perhaps any instances of the compound widget already created). Additionally, the button widget option 2222 "Page to Load" has been set to reference the page "Page 2" in the application stack. Accordingly, activation of the button may cause the application to proceed from the current page in the stack to page 2 of the stack. On page 2, for example, a text field may be disposed that is populated with the results of the football scores search. Alternatively or additionally, and although not illustrated in FIG. 22, the Script ID/Path option 2220 could identify a script that provides functionality similar to that of the option 2222, but may or may not require the loading of a new page in the stack. The button widget option 2224 "Button Text" is set to the text string "Search Scores."

The compound widget script option 2226 has been checked to indicate that a compound widget script exists and is associated with the current compound widget, and the option 2228 "Script ID/Path" has been set to "scores.script123" to identify a script that defines interactions between member widgets of the compound widget. The scores.script123 script may provide a link between, for example, the button widget and the text field widget members of the compound widget, such that when the corresponding button is activated, text in the text field is pulled and used to conduct a database search, and in one embodiment, place the results in a text field on page 2 of the stack. In one embodiment, the scores.script123 is stored with the compound widget in the application model datastore 102. The "Edit Script" button may open the script editor feature described above to allow the designer to create or edit the script.

The shared/specific compound widget options 2230 are set so that the color widget settings are set to shared (and thus may be the same across all instances of the compound widget), the media widget settings are set to specific (and thus may be specifically set for each instance of the compound widget), the text field widget settings are set to specific (and thus may be specifically set for each instance of the compound widget), the button widget "Page" setting is set to specific (and thus may be specifically set for each instance of the compound widget), and the button widget "Button Text" setting is set to shared (and thus may be the same across all instances of the compound widget).

The most significant graphical display sub-component option 2232 is identified to be the button widget in this compound widget. The specific part of the button widget that may be used as the most significant graphical display sub-component border is set in the most significant graphical display sub-component border option 2236 to be the "Left" edge of the button widget. Failure to select the enabling check-box 2234 may result in a default selection of the most significant graphical display sub-component border for the compound widget, which may be, for example, left, right, top, bottom, or center.

Selecting the "Cancel" button 2240 may erase all of the settings set forth in the dialog box 2200 and prevents the creation of a corresponding compound widget "Search Sports Scores." Selecting the "Ok" button 2238 completes the configuration of the compound widget "Search Sports Scores" and at the same time creates a first instance of the "Search Sports Scores" compound widget entitled "Search Football Scores." The "Search Sports Scores" compound widget may also then be placed in the widget palette 410 so that further instances of the "Search Sports Scores" compound widget may be placed on a page in the stack by simply dragging the "Search Sports Scores" compound widget from the widget palette 410 to the application workspace 414.

Figure 23:
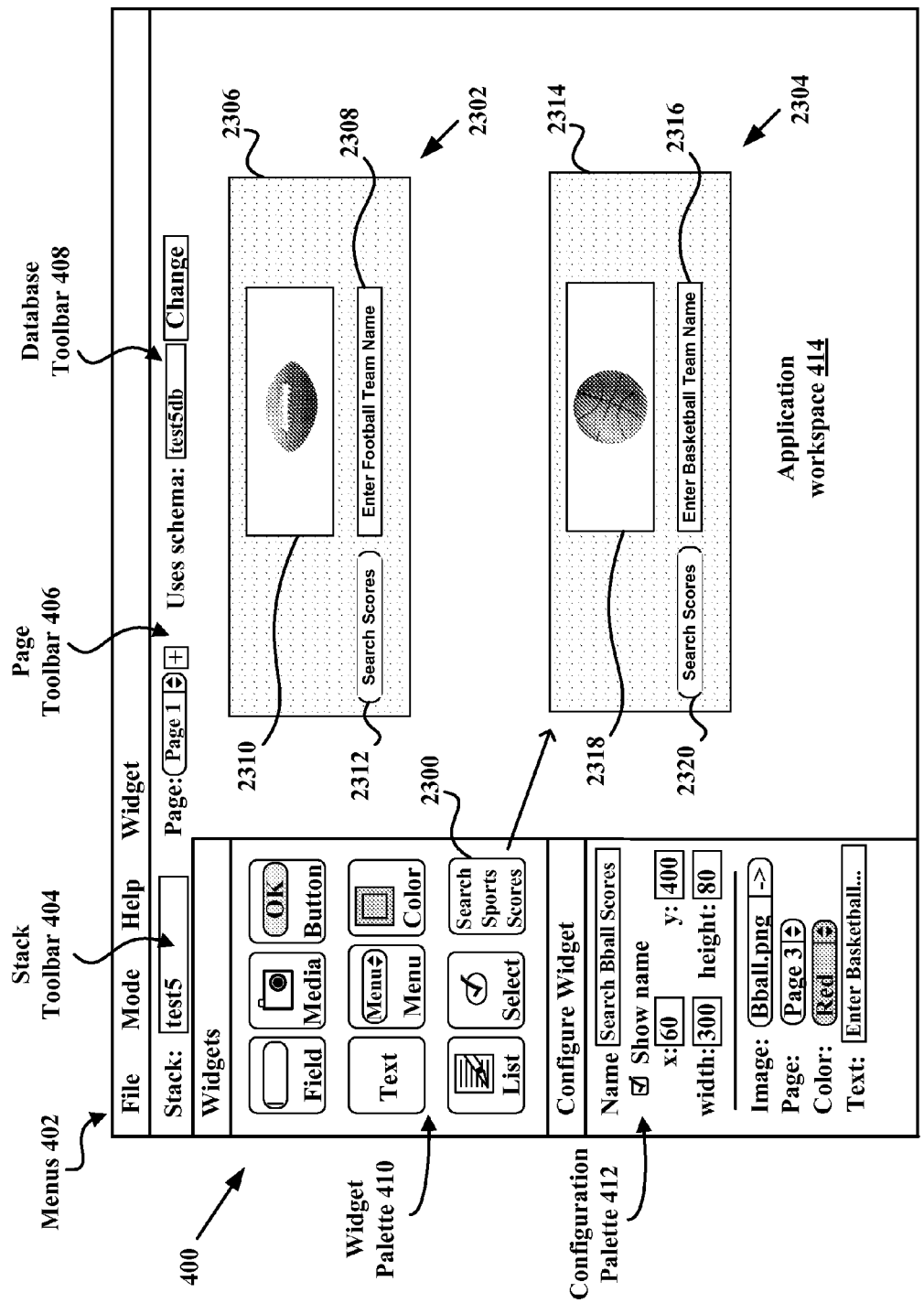
FIG. 23 depicts an example development environment in which a compound widget has been instantiated twice, in accordance with an example embodiment.

FIG. 23 illustrates a corresponding instantiation of the "Search Football Scores" compound widget 2302 in accordance with the settings set forth in the dialog box 2200 of FIG. 22. As illustrated in FIG. 23, the compound widget 2302 includes a "Red" background color swatch 2306 created commensurate with the color widget settings 2206, a text field 2308 created commensurate with the text field widget settings 2216, a football image 2310 created commensurate with the media widget settings 2212, and a search button 2312 created commensurate with the button widget settings 2222 and 2224. Additionally, a "Search Sports Scores" first-class widget 2300 is created in the widget palette 410 such that additional instances of the "Search Sports Scores" compound widget can be added to the pages in the stack by simply dragging and dropping the (now) first class widget 2300 to the application workspace 414.

An additionally-instantiated compound widget 2304 illustrates an example of dragging and dropping the newly created first-class compound widget 2300 to create a second instance of the "Search Sports Scores" compound widget. Once the first-class widget 2300 is dragged onto the application workspace 414, the configuration palette 412 is loaded with one or more of the "Search Sports Scores" compound widget options 2104, 2108, 2112, and 2122 to allow configuration of the second instance. Fewer or additional compound widget options than those shown in FIG. 23 could be displayed in the configuration palette 412.

In some embodiments, only those compound widget options set as specific characteristics via options 2230 are displayed in the configuration palette 412. The shared characteristics, in contrast, may be automatically set and updateable only via a separate menu option. For example, as shown in FIG. 23, the compound widget name option 2202 is not shown in the configuration palette 412 as it is a shared characteristic. In contrast, the widget instance name option 2204 is displayed in the configuration palette 412 as this value is individually set for each instance of the "Search Sports Scores" compound widget.

In another embodiment, all compound widget options may be displayed in the configuration palette 412, but may be displayed in such a manner that shared options, such as the color widget option "Red" 2208, are displayed in a "grayed out" or other visual manner to demonstrate that they are shared characteristics and any change to them may be propagated to all other instances of the compound widget. In one embodiment, an additional confirmation dialog box may be displayed requesting confirmation whenever a designer attempts to make a change to a shared characteristic, in order to prevent accidental side-effects of the change to other instances of the compound widget.

As shown in FIG. 23, the compound widget 2304 includes a "Red" background color swatch 2314 created commensurate with the shared color widget settings 2206, a text field 2316 created commensurate with the specific text field widget settings entered into the configuration palette 412, a basketball image 2318 created commensurate with the specific media widget settings entered into the configuration palette 412, and a search button 2320 created commensurate with the shared button widget settings 2224 and the specific search button widget settings entered into the configuration palette 412 (e.g., "Page 3").

Additional instances of the "Search Sports Scores" compound widget could be made on the page illustrated in FIG. 23, on a separate page in the stack (not shown), or in a separate application (not shown) by sharing the "Search Sports Scores" compound widget with other designers or with other applications by the same designer.

Figure 24:
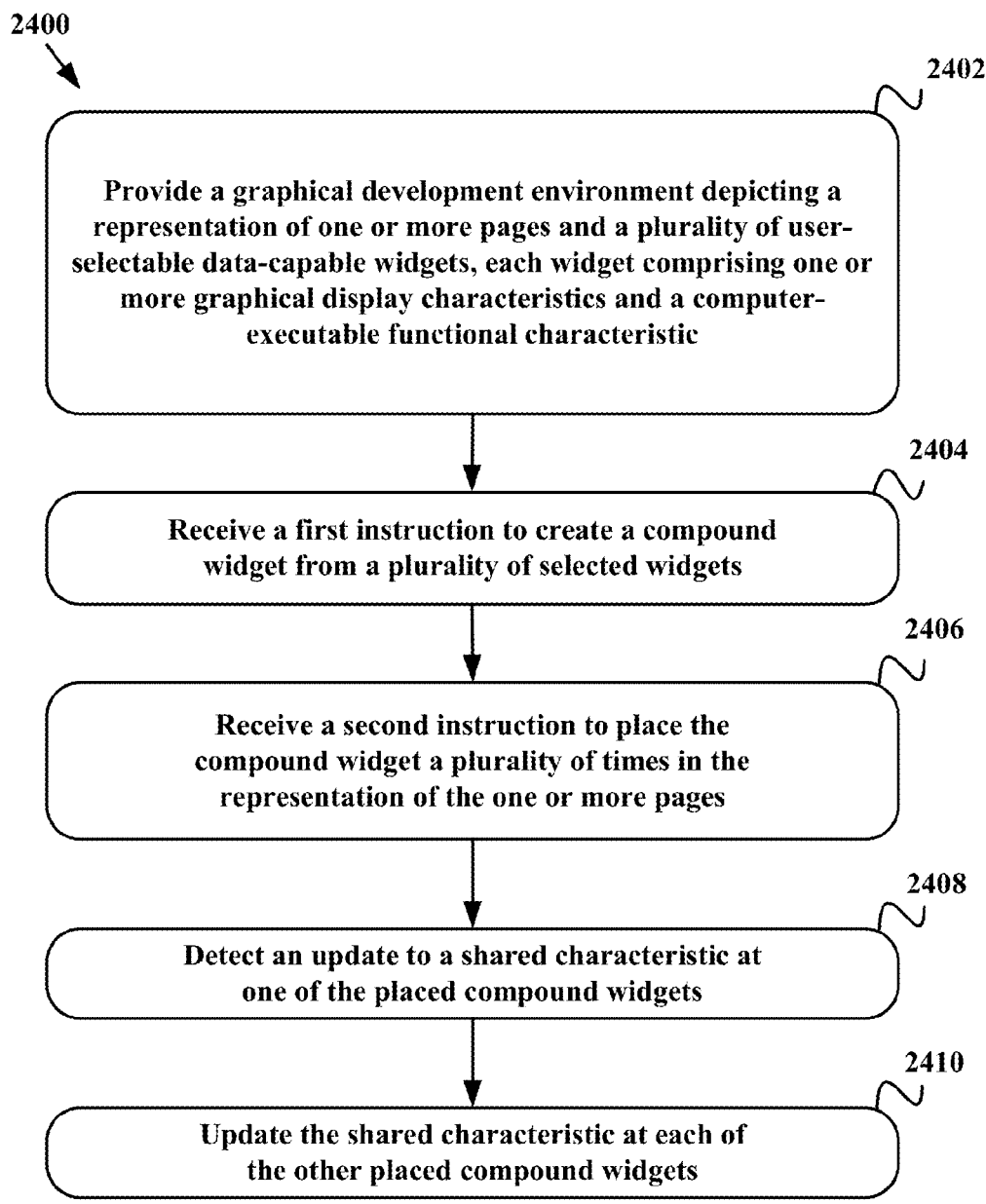
FIG. 24 is a flow chart in accordance with an example embodiment.

FIG. 24 is a flow chart 2400 of an example embodiment for creating and maintaining a compound widget. At a block 2402, a graphical development environment 400 is provided depicting a representation of one or more pages and a plurality of user-selectable data-capable widgets, each widget including one or more graphical display characteristics (e.g., sub-components) and a computer-executable functional characteristic.

At a block 2404, a first instruction is received to create a compound widget from a plurality of selected widgets. As set forth in FIG. 20, the selection could be effected by dragging an input device such as a mouse across the desired widgets to create a selection group 2010. Other methods of selecting widgets for inclusion in a compound widget could be used as well. The instruction to create the compound widget may be provided in any number of ways. For example, a "click" on an input device having input buttons, such as a mouse, may display a menu from which the designer may select a menu item entitled "Create Compound Widget." Alternatively or additionally, the designer may access the "Widget" drop-down menu in the menus 402 toolbar, and similarly select a menu item entitled "Create Compound Widget" from the list of menu items in the drop-down menu. Other methods could be used as well.

At a block 2406, a second instruction is received to place (e.g., instantiate) the compound widget a plurality of times in the representation of the one or more pages in the stack. As set forth with respect to FIGS. 22 and 23, the creation of the compound widget may also create the first instance of the compound widget in the stack. In one embodiment, the creation of the compound widget may only add a corresponding first-class widget in the widget palette 410, and not create an instance of the compound widget in the stack, such as compound widget 2302 in FIG. 23, perhaps requiring further instances to be created by placing a compound widget from the widget palette 410 to the application workspace 414. Other methods of creating multiple instances of the compound widget are possible as well.

At a block 2408, an update is detected to one of the shared characteristics of one of the placed compound widgets. For example, with respect to FIGS. 22 and 23, the update may be a change of the color of the shared color widget option 2208 of the "Search Sports Scores" compound widget from "Red" to "Blue." At a block 2410, the update to the shared characteristic is propagated to each of the other instances of the compound widget. For example, this update is propagated to each of the other instantiated "Search Sports Scores" compound widgets, such as the second instantiated "Search Sports Scores" compound widget 2304. In addition, the block 2408 may entail storing the change to the compound widget at the application model datastore 102, which may cause instantiated copies of the "Search Sports Scores" compound widget to also be changed in other applications that reference the application model and/or compound widget that at the application model datastore 102.

Additionally, versioning can be applied so that other designers can subscribe to a particular version of the application model and/or compound widget stored in the application model datastore 102, such that updates to shared characteristics in one instance of the compound widget do not cause problems in other instances of the compound widget. The designer making the change to the shared characteristic may have control over whether to apply the update to the current version of the compound widget, or increment the version of the compound widget prior to applying the change. Designers subscribed to a particular version of the compound widget may be notified, or may be able to determine, that an updated version is available. The subscribed designers could then, perhaps after reviewing notes regarding the changes made to the compound widget, determine whether to update their own instances of the compound widget to the newest version.

In some embodiments, the development environment may provide one or more ways of sharing compound widgets between designers of a cloud-based application. In one embodiment, compound widget definitions may be exported via the "Widget" drop-down menu in the menus 402 toolbar, and transmitted to another designer by, for example, e-mail, instant message, or some other mechanism. Additionally or alternatively, a menu option may provide the designer with access to a central repository of compound widgets, perhaps stored at server 101, or at some other remote computing device. Similarly, the designer may access the remote repository and select compound widgets to download and add to the widget palette 410, which may then be stored within the development environment 400 and/or application model datastore 102 for use in designing current or future applications.

In further embodiments, a common database of shared widgets may be maintained to which all instances of the cloud-based application have access, and to which designers can "subscribe" to receive notifications of updates and/or modifications to particular shared widgets. When a widget is added, deleted, or updated in the common widget database, subscribed designers may be notified within their version of the design environment. These in-application notification methods may be combined with or substituted by other methods, such as email, instance messaging, and so on.

9. LAYOUT MANAGEMENT

As mentioned above, automatic layout tools may be used to simplify the process of determining layout relationships between widgets, groups of widgets, and/or edges of the screen. Traditional tools use explicit layout managers to specify how the components of the user-interface (UI) align with one other and to the application window in which they are currently displayed. Layout managers, however, are a complex abstraction that can be difficult to learn and hard to combine to achieve a desired layout. They typically require a designer to draft textual descriptions of relationships between different elements of the UI components in view of unknown and/or changing window sizes. Creating such rules places a significant burden on the designer.

The disclosed automatic layout tools, however, can be used to aid the designer in layout of elements of a cloud-based application as the designer places widgets, and can also be used to determine relationships between widgets that help an execution platform determine how to render a page of widgets when the screen is first drawn, and/or when it is re-sized. The first of these tools to be discussed is a smart alignment tool, and the second is an implicit layout specification tool.

9.1 Smart Alignment

The smart alignment tool aids the designer in aligning widgets during the design phase (e.g., in the design mode 302 of FIG. 3). By default, the development environment 400 may align widgets dragged and dropped into the application workspace 414 to a visible or invisible grid. The (x,y) coordinates of the widget may be set to a nearest point on the grid (for example, a 100×100 grid relative to where the widget is placed by the designer).

Figure 25:
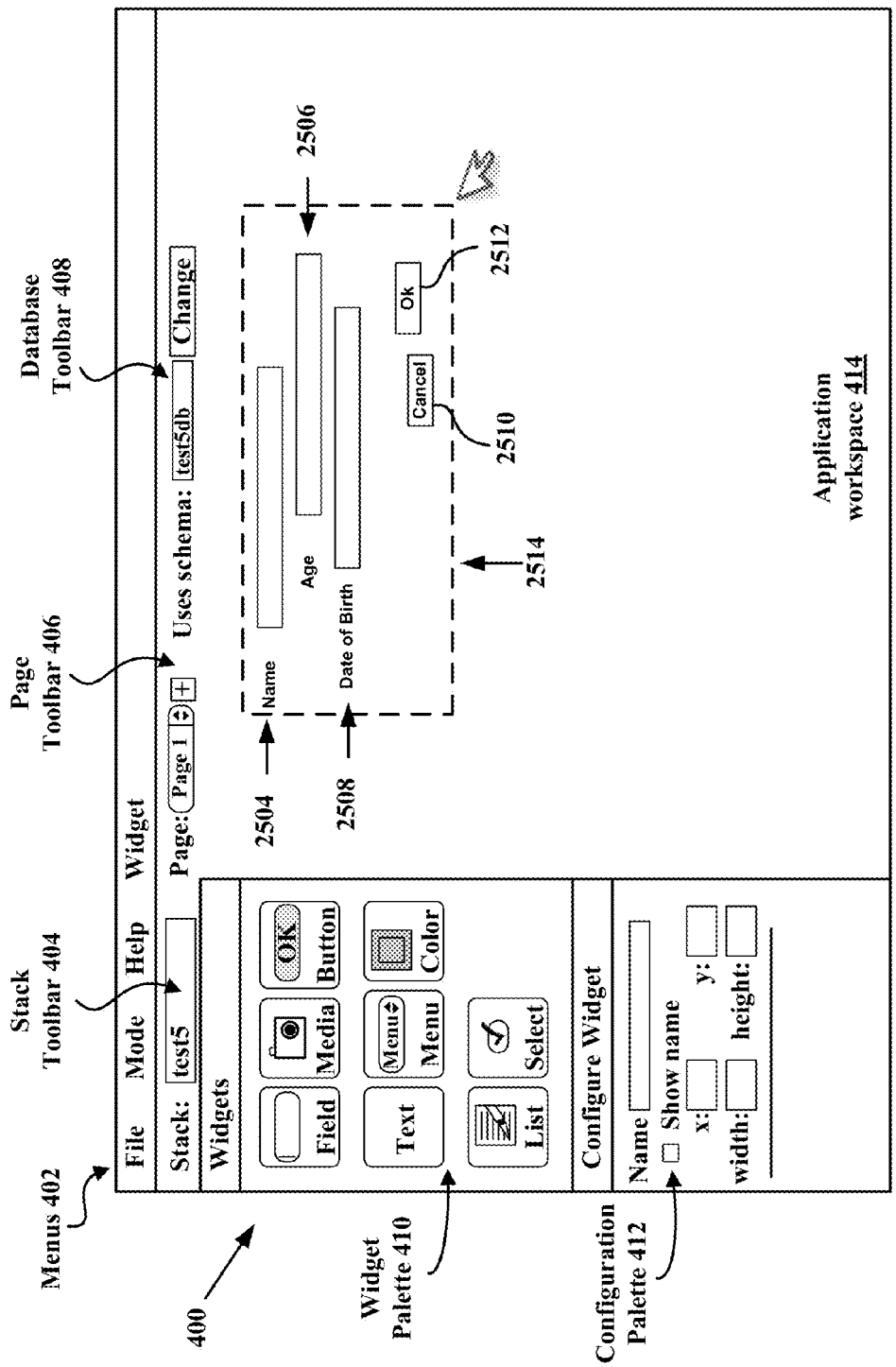
FIG. 25 depicts a development environment in accordance with an example embodiment.

FIG. 25 illustrates an example group of widgets that have been instantiated in the application workspace 414 by dragging and dropping three text field widgets (e.g., consisting of label and text field graphical display sub-components) and two button widgets (e.g., consisting of border and label graphical display sub-components) from the widget palette 410. Additionally, the settings of these widgets have been populated. For example, a widget 2504 is a text field widget populated with the label "Name," a widget 2506 is a text field widget populated with the label "Age," a widget 2508 is a text field widget populated with the label "Date of Birth," a widget 2510 is a button widget with a label name populated with the text string "Cancel," and a widget 2512 is a button widget with a label name populated with the text string "Ok."

Each of these widgets has been selected via an input selection process, illustrated in FIG. 25 as a dashed selection line box 2514 created, perhaps, by dragging a cursor across the selection of the first-class widgets 2504-2512. The selection of the first-class widgets 2504-2512 may result in a cross-hatch, highlight, change in color, or other mechanism applied to the first-class widgets 2504-2512 to provide visual feedback to the designer of the selected first-class widgets that will form a part of a "group of widgets."

A group of widgets may be a designer-defined group that indicates that the members (or sub-components) of the selected group are intended to have some relationship between them. Here, for example, the widgets 2504-2512 may form part of a "Personal Information Data Entry" tool that retrieves user information to use in a data lookup or, perhaps, as part of a method to determine whether a user is of a proper age to further access the designed application. Other uses are possible as well.

The grouping of the widgets 2504-2512 lets the development environment 400 know that it should pay particular attention to the selected widgets (and not widgets outside of the selection, which may exist but are not shown in FIG. 25) in determining an alignment between the selected widgets. Additionally, knowledge of widget groupings may be used by the implicit layout tool, discussed further below, in determining how to re-arrange widgets when the page screen or window, on which the application is being rendered, changes.

In this case, the designer may select the widgets 2504-2512, select the "Widget" menu option from the menu toolbar 402, and select "Group Selected Widgets" to specify that the selected widgets 2504-2512 should be stored as related widgets (in the development environment 400 or the application model datastore 102, for example). In at least one embodiment, selecting widgets 2504-2512 may automatically cause the development environment to group the selected widgets.

In another embodiment, the widgets 2504-2512 may not be automatically grouped until a subsequent "Align" operation is performed on the selected widgets.

After selecting the widgets to be grouped together, the designer may execute a smart-alignment process that will determine the type of widgets in the group, and align the widgets with respect to one another taking into account knowledge of the sub-components of each widget. An instruction to execute the smart-alignment process may be provided by the designer in any number of ways. For example, a "click" on an input device having input buttons, such as a mouse, may display a menu from which the designer may select a menu item entitled "Align Grouped Widgets." Alternatively or additionally, the designer may access the "Widget" drop-down menu in the Menus 402 toolbar, and similarly select a menu item entitled "Align Grouped Widgets" from the list of menu items in the drop-down menu. Other methods could be used as well.

Figure 26:
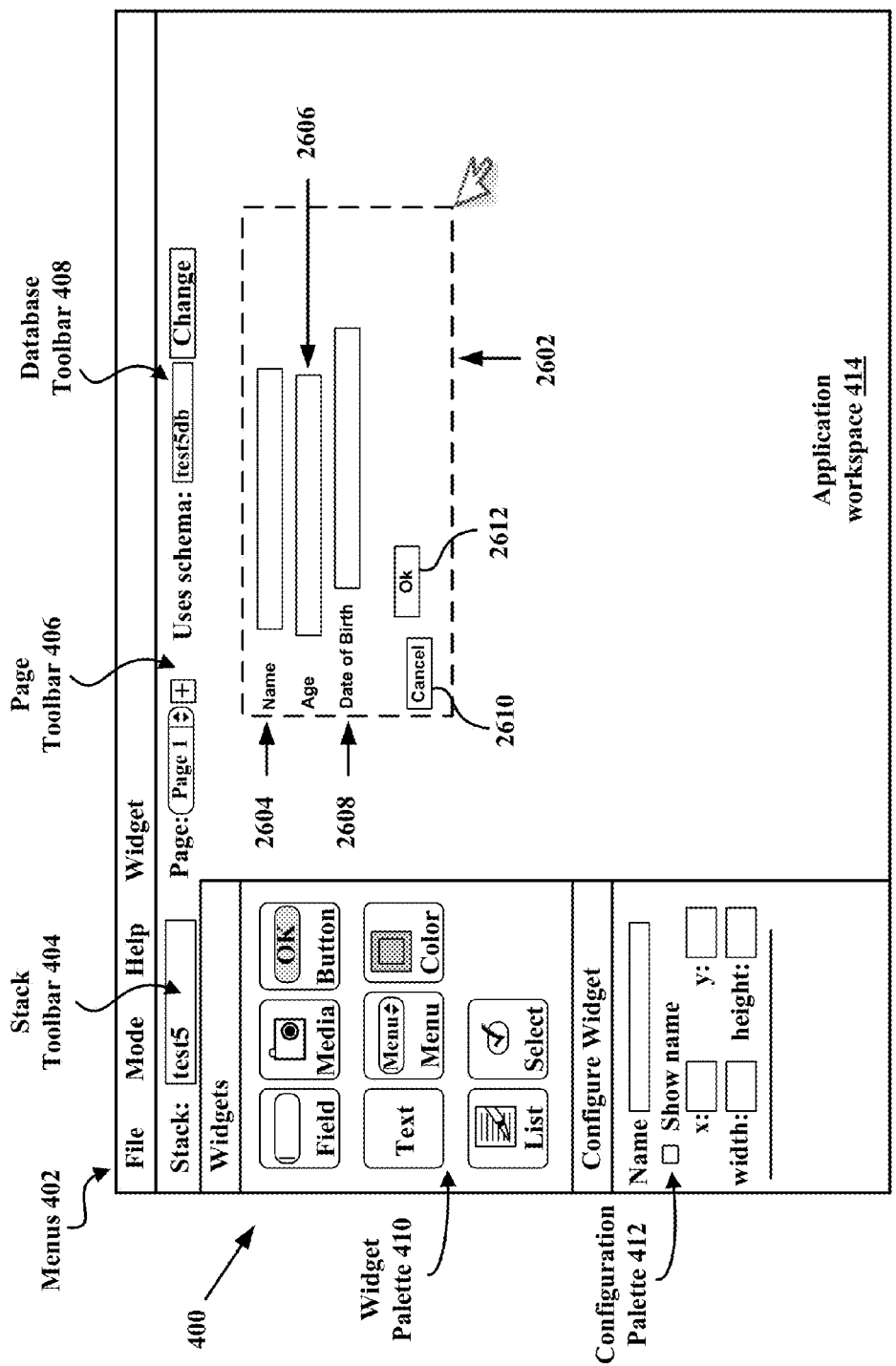
FIG. 26 depicts a development environment in accordance with another example embodiment.

FIG. 25 illustrates a rough positioning of the five widgets, meant to model the positioning of the widgets after a designer imprecisely drags the widgets into the application workspace 414 from the widget palette 410. For comparison purposes, FIG. 26 illustrates one aligning process, which may be executed by an automatic layout tool to align widgets on a screen. For example, the tool can use a "right, left, or center" alignment to left-align widgets along a vertical line on the left side of the screen, right-align widgets along a vertical line on the right side of the screen, or center-align widgets along a vertical line at the center of the screen. As shown in FIG. 26, when a left-align process is applied to selected widgets 2604-2612, without using knowledge of the most significant graphical display sub-components of the selected widgets 2604-2612, a visually undesirable arrangement of user interface elements results.

The smart-alignment tool, however, can obtain information about the first-class widgets dragged from the widget palette 410 that informs the tool of the most significant graphical display sub-component border in each widget, and use this information, perhaps along with information regarding the dimensions of a designer-provided selection 2614, to automatically and intelligently align the selected widgets. This information may already be set in widgets provided by the creator of the development environment 400, or, as disclosed above, may be set by a designer of additional widgets such as compound widgets. Such information may be stored in widget metadata, and made available to the development environment 400 upon loading or instantiation of each widget. In some embodiments, the information may be accessible via some other manner, such as a separate list or database of widget parameters available locally or at a remote computing device. Other possibilities exist as well.

In addition to identifying the most significant graphical display sub-component, information regarding the border of the most significant graphical display sub-component may also be defined within the first-class widget. For example, in the case of the text field widget 2604, which is includes a label "Name" and a text box disposed to the right of the label, the text box may be defined as the most significant graphical display sub-component of the text field widget, as detailed above with respect to the example set forth in FIG. 22. Furthermore, the left-side border of the text box may be defined as the most significant graphical display sub-component of the text field widget. The development environment 400 could then use this information, and similar information stored in the text field widgets 2606 and 2608, to automatically align the widgets relative to one another, with minimal input from the designer.

Other widgets may similarly contain most significant graphical display sub-component and most significant graphical display sub-component border information. For example, a checkbox widget may include a square check-box and a label (adjacent the check-box in the vertical or horizontal direction). In the event the label appears to the left of the check-box, the square check-box may be identified as the most significant graphical display sub-component, and the left-side border of the square check-box identified as the most significant graphical display sub-component border. Similar to the text-field widget, this would allow the square check-box sub-component of vertically-disposed checkbox widgets to all be aligned in a visually-pleasing manner, regardless of the length of the text label appearing to the left of each checkbox widget.

In some cases, each widget may contain more than one identified most significant graphical display sub-component border, to allow for alignment in both the horizontal and vertical direction. Taking the checkbox widgets for example, if instead the labels appeared below the checkboxes, and the checkboxes were all disposed to appear horizontally adjacent one another, the top-border of the square check-box may be additionally or alternatively indicated as a most significant graphical display sub-component border of the checkbox widget to allow automatic relative vertical alignment of the horizontally-disposed check-box widgets by the development environment 400.

In some embodiments, compound widgets created in accordance with the above may have most significant graphical display sub-component and most significant graphical display sub-component border information set by the designer, and available for the development environment 400 to use in aligning compound widgets with one another, with non-compound widgets, and with groups of widgets. Other possibilities exist as well.

Figure 27:
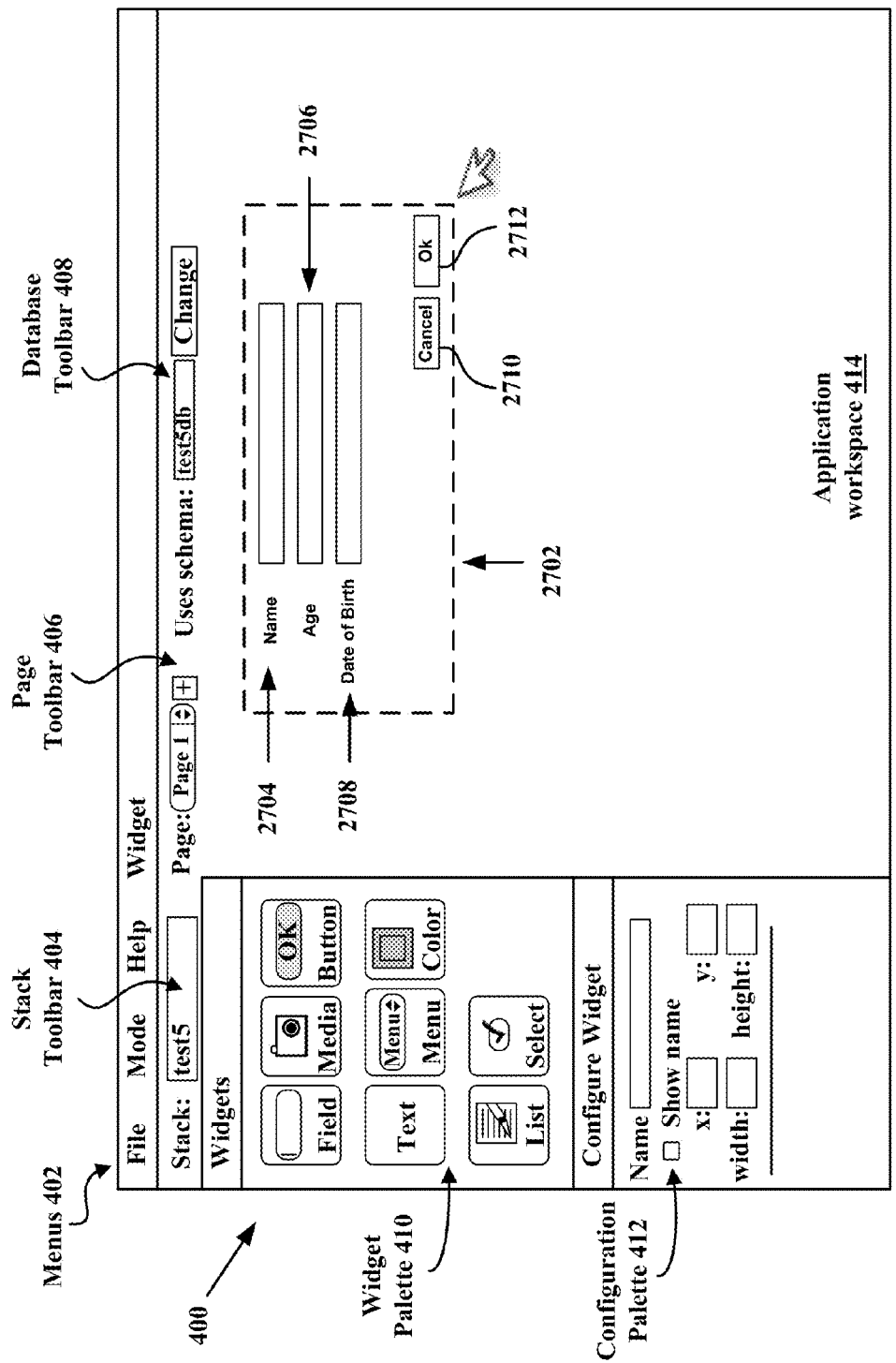
FIG. 27 depicts a development environment in accordance with another example embodiment.

FIG. 27 illustrates an example of an automatic alignment process executed by the smart-align process having access to most significant graphical display sub-component of widgets 2704-2712. In this example, it is assumed that the widgets 2704-2708 identify the text box as their most significant graphical display sub-component, and the left-side of the text box as their most significant graphical display sub-component. It is further assumed that the widgets 2710 and 2712 identify their most significant graphical display sub-component as the outer border, and their most significant graphical display sub-component border as the right side of the border (and perhaps the bottom-side of the border for vertical alignment). In some embodiments, however, such most significant graphical display sub-component may not be provided for buttons, but instead may be automatically inferred by the smart-align tool once the type of widget (button) is determined by the smart-align tool.

As shown in FIG. 27, by taking into consideration most significant graphical display sub-component information of the widgets 2704-2708, these widgets are automatically left-aligned with on another based on the left-side border of the text field sub-component of each widget. In addition, the smart-align tool may align the widgets 2704-2708 to ensure that an even amount of white-space is included between the widgets in the vertical direction. For example, the smart alignment tool may calculate a total amount of space between the top of the top-most widget 2704 and the bottom of the bottom-most widget 2708, and redistribute the total amount of free space evenly in the vertical direction. A similar white space redistribution process could be applied to horizontally-aligned widgets. In at least one embodiment, a variable set by a designer or the development environment 400 may determine a desired inter-widget white space, and the smart alignment tool may apply the white space requirement automatically between the selected widgets (all selected widgets, or just the selected widgets of the same type, among other possibilities).

In regard to the widgets 2710 and 2712, the smart align tool may utilize the most significant graphical display sub-component and most significant graphical display sub-component border information stored in the widgets 2710 and 2712, and right-align them to the right-most side of the selection 2702 dimensions. In at least one embodiment, instead of using the selection 2702 dimensions, the smart-align tool may determine a right-most position of the remaining widgets within the selection 2702 (e.g. the widgets 2704-2708), and align a right-most side of the widgets 2710 and 2712 with the right-most side of the widgets 2704-2708. In the example of FIG. 27, this rule would shift the widgets 2710 and 2712 slightly to the left.

In at least one embodiment, the smart alignment tool may be configured to locate all buttons in a grouped selection that are on approximately the same horizontal axis, automatically align them among one another by their middle points, and then right-align them to the right-most edge of the selection 2702 or the right-most edge of the right-most widget (besides the buttons) in the selection, without considering most significant graphical display sub-component or most significant graphical display sub-component border information that may be available with respect to the button widgets. Applying such a process to the buttons 2610 and 2612 in FIG. 26 would result in an arrangement of buttons similar to that shown by buttons 2710 and 2712 in FIG. 27.

The alignment information generated by the smart-align tool may be stored in the development environment 400 and/or stored in the application model datastore 102. Accordingly, alignment information and widget groupings can be preserved in future instances of the cloud-based application or application model 312, and available to the designer for use in future cloud-based applications.

Figure 28:
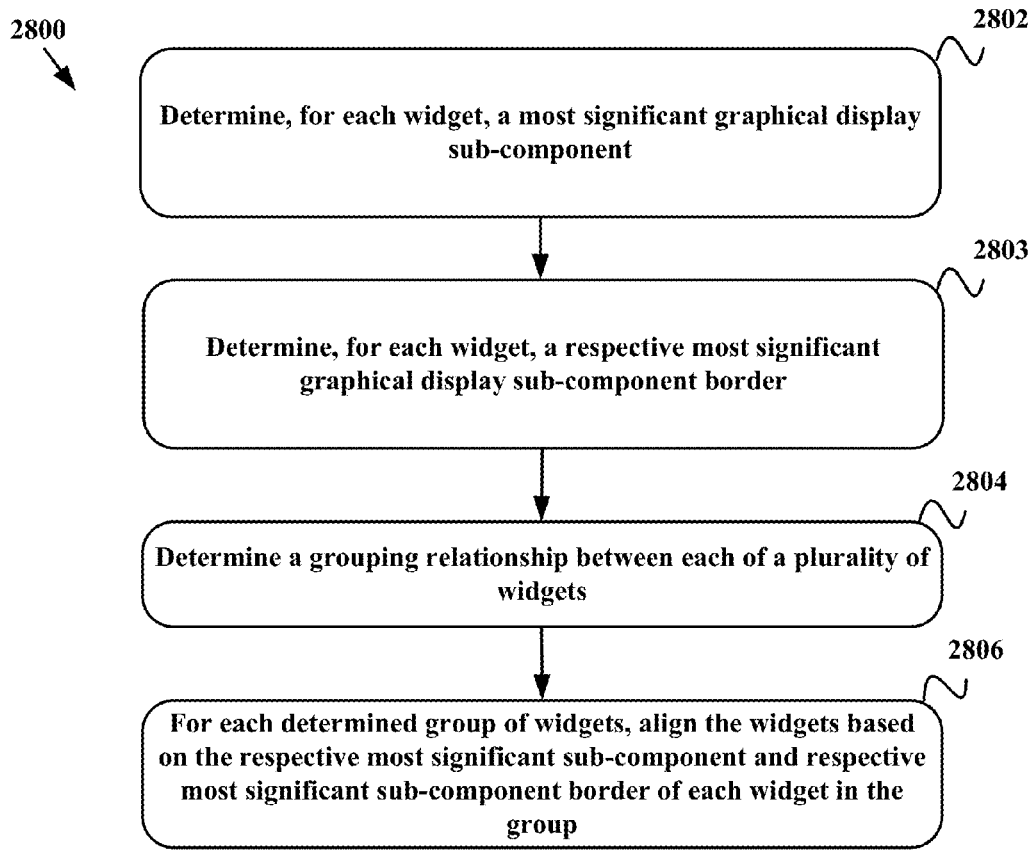
FIG. 28 is a flow chart in accordance with an example embodiment.

FIG. 28 is a flow chart according to an example method 2800 for aligning widgets within a grouping in accordance with the currently disclosed alignment method. At a block 2802, a most significant graphical display sub-component is determined for each widget in a selection or perhaps on a page in the stack. This information could be stored in the development environment 400, the application model datastore 102, or in widget or compound widget metadata. At a block 2803, a respective most significant graphical display sub-component border is determined for each widget in a selection or perhaps on a page in the stack. This information could be stored in the development environment 400, the application model datastore 102, or in widget or compound widget metadata. At a block 2804, a grouping relationship between each of the widgets is determined. The grouping relationship could be based on a selection of widgets by a designer, or the existence of the widgets on a same page of the application stack, among other possibilities. In some instances, the development environment 400 may create additional sub-groupings within a designer-selected group or within a page. For example, referring to FIG. 27, the development environment may create a sub-group of the widgets 2704-2708 as related widget types despite the fact that the selection 2702 also included widgets 2710 and 2712. In at least one embodiment, sub-groups may be selected based on similar most significant graphical display sub-component and/or most significant graphical display sub-component border information and aligned relative to one another based on such characteristics. Returning to FIG. 28, at a block 2806, the smart alignment tool may align the widgets in each group based on the most significant graphical display sub-component and most significant graphical display sub-component border information for each widget in the group.

9.2 Implicit Layout Specification

In contrast to the smart alignment tool, the implicit layout specification tool may aid the designer by automatically analyzing relationships between widgets, groups of widgets, and perhaps screen edges, and determine how the spacing between these elements should be modified during the preview mode 304 and/or run mode 306 to more intelligently display the designed application on an ever varying number of different screen and window sizes.

There are at least two types of relationships between widgets in the disclosed development environment that will determine how spacing between them will be modified due to differences in screen and window sizes: fixed and proportional. When two widgets (or groups of widgets) have a fixed relationship, these two widgets remain the same distance apart, regardless of the size of the screen (or window) that they are rendered on. On the other hand, when two widgets (or groups of widgets) have a proportional relationship, the distance between these two widgets is varied proportional with the size of the screen (or window) that they are rendered on. Traditionally, these relationships are manually specified one by one by designers using textual constructs consistent with a particular layout markup language. An automatic implicit layout tool that could automatically determine such constructs via inferred relationships between widgets (including compound widgets), groups of widgets, and/or edges of the screen or window would save designers significant time and reduce the complexity of user interface development.

Figure 29:
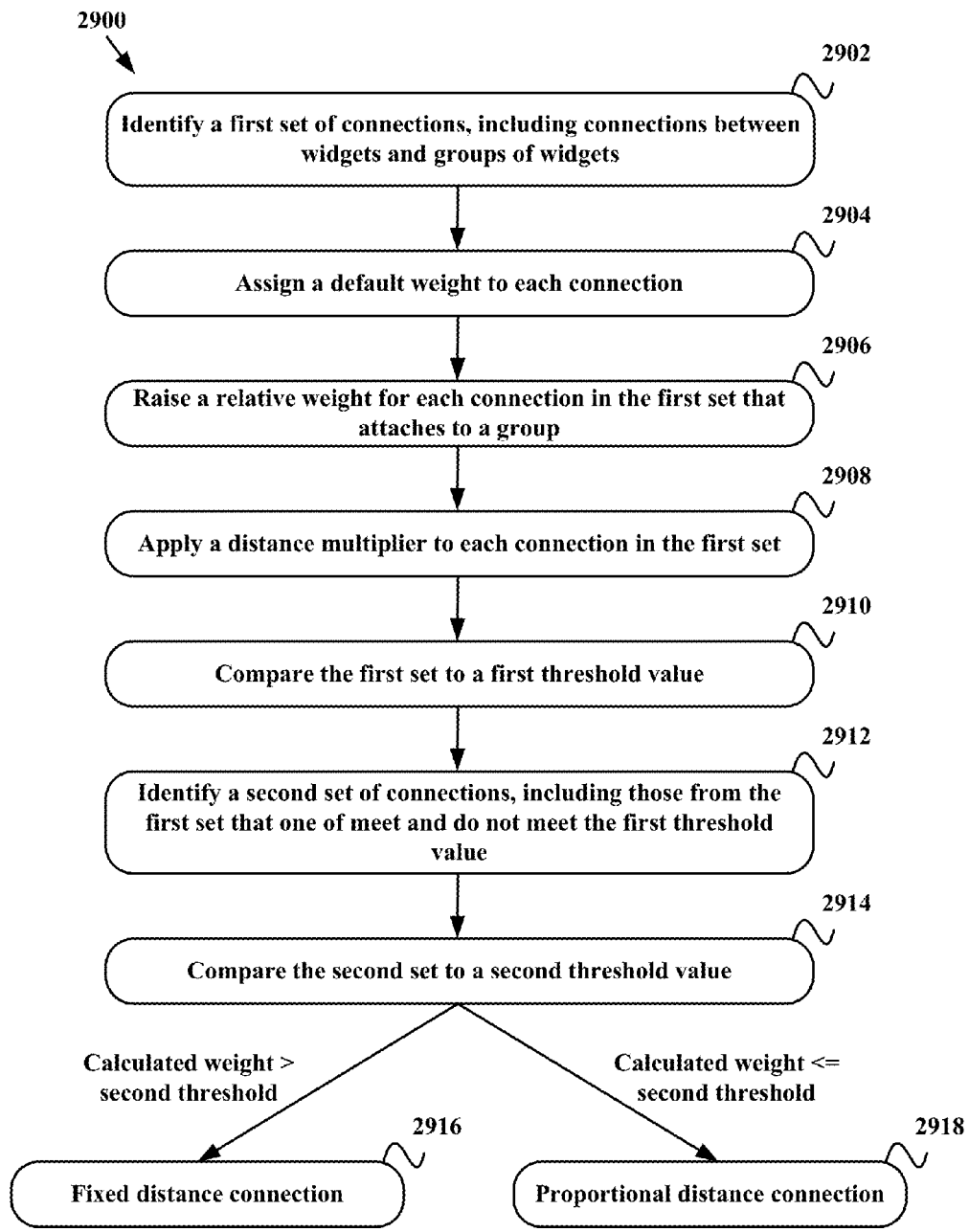
FIG. 29 is a flow chart in accordance with another example embodiment.

In one embodiment an implicit layout algorithm is applied to a page in the stack to automatically determine whether widgets, groups of widgets, and/or edges of the screen or window should have a proportional or a fixed relationship (if any) to one another. FIG. 29 is a flow chart describing one example of such a method 2900. At a block 2902 a first set of connections is identified including (i) each connection between each pair of widgets that do not belong to a group of widgets, (ii) each connection between each group of widgets and each widget that does not belong to a group of widgets, and (iii) each connection between groups of widgets. The first set may be stored as a comma separated value (CSV) list, a graph, or any other representation capable of identifying such links. In one embodiment, the block 2902 may also include identifying connections between widgets and first and second edges of the page, and between groups of widgets and first and second edges of the page.

At a block 2904, a default weight is assigned to each connection in the first set of connections identified in the block 2902. For example, in one embodiment, a default weight may be a rational number between 1 and 10, such as 3.0. In another embodiment, the default weight may be some other integer, decimal, fractional, real, or imaginary value.

At a block 2906, each default weight in the first set is raised or lowered dependent upon whether the widget in question is part of a group or is not part of a group. If the widget is part of a group, the default weight is raised, otherwise, it is lowered (or vice versa, depending on the implementation). For example, if the default weight is 3.0 and the widget is part of a group, the connection weight may be raised by 1.0 (approximately $1/3$ of the default weight). Otherwise, if the widget is not part of a group, the weight may be lowered by 0.6 (approximately $1/5$ of the default weight). Other weighting values could also be applied.

In one embodiment, the block 2906 may also include raising the default weight of each connection in the first set dependent upon whether one end of the connection is connected to the first or second edge of the page, assuming that such connections were identified in the block 2902. For example, if one of the connections is attached to a page edge, the connection weight may be raised by, for example, 0.8 (approximately $4/15$ of the default weight). Other weighting values could also be applied.

At a block 2908, a distance multiplier is applied to each connection in the first set relative to the lay-out distance between each endpoint in the connection. In one embodiment where a square root operation acts as the distance multiplier, the weight of each connection may be divided by the square root of the lay-out distance. In another embodiment, a cubed root may be used as the distance multiplier. Other possibilities exist as well.

At a block 2910, the calculated weight for each connection in the first set is compared to a threshold value to determine if there is a threshold minimum relationship between the endpoints of the connection. In one embodiment, the first threshold may be within the range of 0.7-0.9, such as 0.8. Other threshold values could alternatively be used, including other integer, decimal, fractional, real, or imaginary values. Connections in the first set that do not meet the first threshold value may be discarded and not considered any further (e.g., they will have neither a fixed nor proportional relationship). In one example, those connections having a calculated weight less than (or less than or equal to) the first threshold value may be discarded. Other relative relationships could be used as well. At a block 2912, a second set of connections is identified including those from the first set that meet (or, in another embodiment, do not meet) the first threshold value.

At a block 2914, the weights of a connection in the second set are compared to a second threshold value to determine whether the connection should be one of a fixed or proportional distance connection. The second threshold value may be, for example, within the range of 1.0-1.2, such as 1.1. Other threshold values could alternatively be used, including other integer, decimal, fractional, real, or imaginary values.

In some embodiments, if the second threshold is met, the connection is identified as a fixed-distance connection, and if the second threshold is not met, the connection is identified as a proportional-distance connection. In other embodiments, if the second threshold is met, the connection is identified as a proportional-distance connection, and if the second threshold is not met, the connection is identified as a fixed-distance connection. Connections that have a weight substantially equal to the threshold value could alternatively be identified as a proportional-distance connection or a fixed-distance connection.

As shown in FIG. 29, in one example, if the calculated weight is greater than the second threshold (e.g., 1.1), the connection may be identified as a fixed-distance connection at the block 2916. On the other hand, if the calculated weight is greater than (or equal to) the second threshold value, the connection may be identified as a proportional-distance connection at the block 2918.

In this manner, a development environment implicit layout tool can implicitly and automatically determine how widgets (and groups of widgets) on a page should be laid out relative to one another (on initial screen-layout or upon a resizing of the window by a user or designer), by taking into consideration the original layout by the designer, and the characteristics of the widgets with respect to one another, and/or the edges of the page. This process advantageously relieves the designer of explicitly specifying all such relationships and manually defining each relationship.

Figure 30:
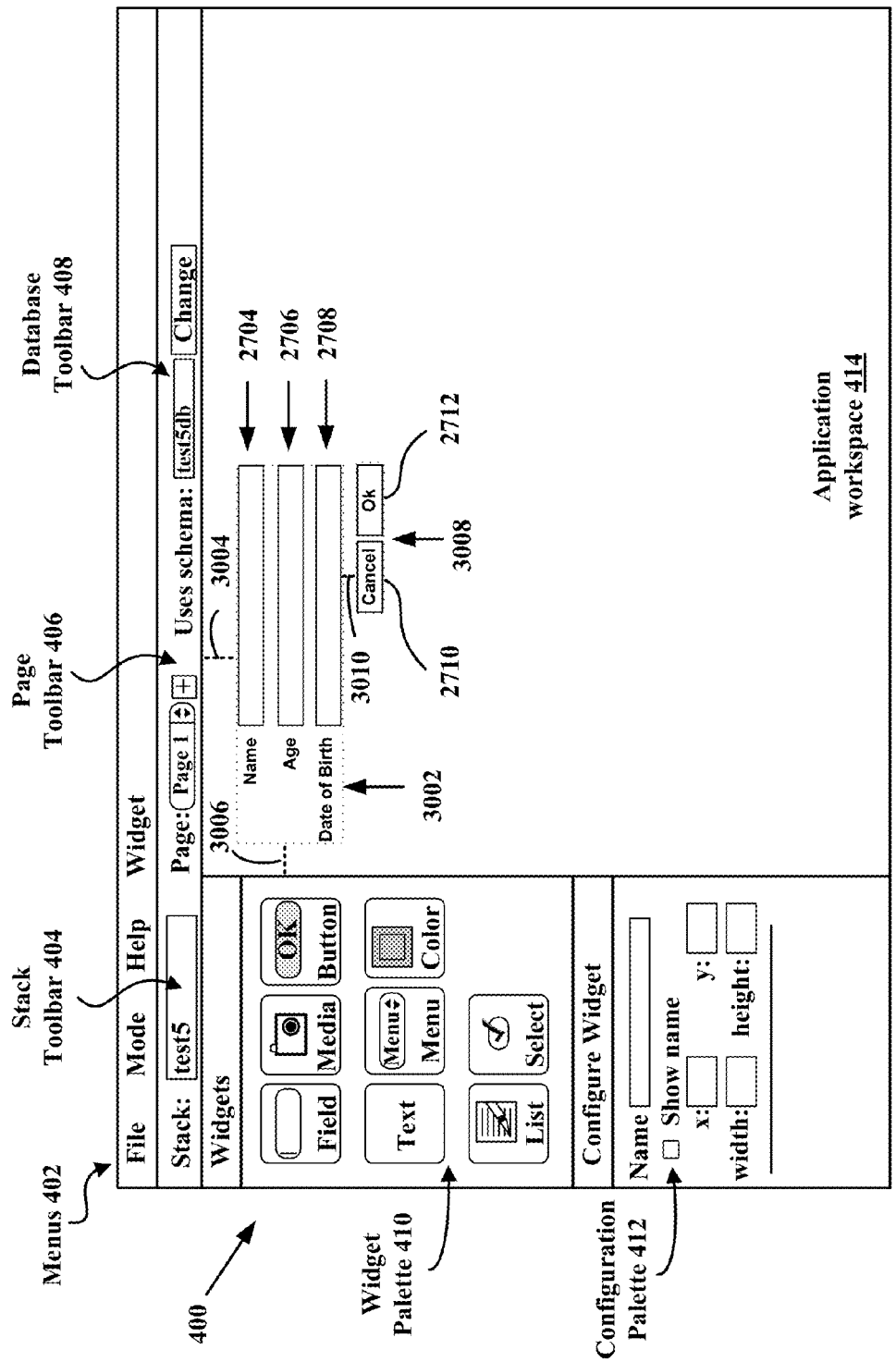
FIG. 30 depicts a development environment in accordance with an example embodiment.

In some embodiments, a visual representation of the implicit layout results of the flow chart 2900 may be provided to the designer. FIG. 30 illustrates an example of such a result in the development environment 400. The designer may use the visual representation to edit or fine-tune the constraints automatically determined during implicit layout generation. In this mode, connections between widgets (and groups of widget) are visualized. For example, a widget group 3002, including the widgets 2704, 2706, and 2708 from FIG. 27, and a widget group 3008, including the widgets 2710 and 2712 from FIG. 27, are illustrated. The widget group 3002 is shown connected to a first screen edge (the top edge) via a vertical constraint line 3004 and to a second screen edge (the left edge) via a horizontal constraint line 3006. The widget group 3002 is further connected to the widget group 3008 via a vertical constraint line 3010. The visual style of the constraint lines may be used to illustrate the type of line. For example, the dashed vertical constraint line 3004 and horizontal constraint line 3006 may represent a proportional-distance connection, while the separately-styled vertical constraint line 3010 may represent a fixed-distance connection. Other possibilities exist as well. In this mode, the designer could also add new layout relationships between widgets and remove existing (or implicitly created) relationships between widgets.

10. CONCLUSION

With respect to any or all of the ladder diagrams, message flows, and flow charts in the figures and as discussed herein, each block may represent a processing of information and/or a transmission of information in accordance with example embodiments. Alternative embodiments are included within the scope of these example embodiments. In these alternative embodiments, for example, functions described as blocks, transmissions, communications, requests, responses, and/or message may be executed out of order from that shown or discussed, including substantially concurrent or in reverse order, depending on the functionality involved. Further, more or fewer blocks and/or functions may be used with any of the ladder diagrams, message flows, and flow charts discussed herein, and these ladder diagrams, message flows, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data), and the program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
receiving an application at a computing device, the application comprising a stack and a database, the stack comprising one or more pages for a user interface to the application; and
executing the application using the computing device, wherein executing the application comprises:
locating a compiled script for the application based on a global identifier assigned to the compiled script, the compiled script including a scripting-language instruction for the application, wherein the global identifier comprises an application identifier for specifically identifying the application in a plurality of applications and an object identifier for specifically identifying an object of a computational model, and wherein the computational model is either the stack or the database,
injecting the compiled script into the application,
executing the injected script in the application, wherein the injected script is configured to perform at least one transaction of the computational model,
wherein locating the compiled script comprises:
determining that a script is to be compiled;
requesting that the script be compiled comprises:
receiving the script at a script compiler of the computing device, the script comprising at least one scripting-language instruction for the application, wherein the at least one instruction comprises a script extension for specifying use of the computational model, wherein the script extension comprises a key character and an identifier of the computational model;
locating, by the script compiler of the computing device, the script extension within the script based on the key character;
determining, by the script compiler of the computing device, the identifier for the computational model specified by the script extension; and
generating, by the script compiler of the computing device, the compiled script corresponding to the script, wherein the compiled script comprises scripting-language code that replaces the script extension, and
wherein the scripting-language code is configured to access the computational model identified by the identifier of the computational model; and
receiving the compiled script, wherein the compiled script corresponds to the script.

2. The method of claim 1, wherein executing the application further comprises removing the injected script from the application.

3. The method of claim 1, wherein the at least one scripting-language instruction of the script further comprises a method extension, wherein the method extension corresponds to an invocation of a function of the computational model, and wherein the compiled script further comprises additional scripting-language code to replace the method extension with the invocation of the function of the computational model.

4. The method of claim 1, further comprising: determining a function of the computational model based on one or more method descriptions.

5. The method of claim 4, further comprising:
determining a return value of the function of the computational model based on the one or more method descriptions.

6. A system, comprising:
one or more computing devices configured to:
receive an application, the application comprising a stack and a database, the stack comprising one or more pages for a user interface to the application; and
execute the application by at least:
locating a compiled script for the application based on a global identifier assigned to the compiled script, the compiled script including a scripting-language instruction for the application, wherein the global identifier comprises an application identifier for specifically identifying the application in a plurality of applications and an object identifier for specifically identifying an object of a computational model, and wherein the computational model is either the stack or the database;
injecting the compiled script into the application,
executing the injected script in the application, wherein the injected script is configured to carry out at least one transaction of the computational model,
wherein locating the compiled script comprises:
determining that a script is to be compiled;
requesting that the script be compiled comprises:
receiving a script comprising at least one scripting-language instruction for the application, wherein the at least one instruction comprises a script extension for specifying use of the computational model, wherein the script extension comprises a key character and an identifier of the computational model,
locating the script extension within the script based on the key character, determining an identifier for the computational model specified by the script extension, and
generating the compiled script corresponding to the script, wherein the compiled script comprises scripting-language code that replaces the script extension, and wherein the scripting-language code is configured to access the computational model identified by the identifier of the computational model; and
receiving the compiled script, wherein the compiled script corresponds to the script.

7. The system of claim 6, wherein executing the application further comprises removing the injected script from the application.

8. The system of claim 6, wherein the at least one scripting-language instruction of the script further comprises a method extension, wherein the method extension corresponds to an invocation of a function of the computational model, and wherein the compiled script further comprises additional scripting-language code to replace the method extension with the invocation of the function of the computational model.

9. The system of claim 6, wherein the one or more script compilers are further configured to determine a function of the computational model based on one or more method descriptions.

10. The system of claim 9, wherein the one or more script compilers are further configured to determine a return value of the function of the computational model based on the one or more method descriptions.

11. An article of manufacture including a tangible, non-transitory computer-readable storage medium having computer-readable instructions encoded thereon, the instructions comprising:
instructions for receiving an application, the application comprising a stack and a database, the stack comprising one or more pages for a user interface application; and
instructions for executing the application comprising:
instructions for locating a compiled script for the application based on a global identifier assigned to the compiled script, the compiled script including a scripting-language instruction for the application, wherein the global identifier comprises an application identifier for specifically identifying the application in a plurality of applications and an object identifier for specifically identifying an object of a computational model, and wherein the computational model is either the stack or the database;
instructions for injecting the compiled script into the application;
instructions for executing the injected script in the application, wherein the injected script is configured to carry out at least one transaction of the computational model,
wherein the instructions for locating the compiled script comprise:
instructions for determining that a script is to be compiled;
instructions for requesting that the script be compiled comprise:
instructions for receiving a script comprising at least one scripting-language instruction for the application, and wherein the at least one scripting-language instruction comprises a script extension that specifies the computational model, wherein the script extension comprises a key character and an identifier of the computational model;
instructions for locating the script extension within the script based on the key character;
instructions for determining an identifier for the computational model specified by the script extension; and
instructions for generating the compiled script corresponding to the script, wherein the compiled script comprises scripting-language code that replaces the script extension, and wherein the scripting-language code is configured to access the computational model identified by the identifier of the computational model; and
instructions for receiving the compiled script, wherein the compiled script corresponds to the script.

12. The article of manufacture of claim 11, wherein the instructions for executing the application further comprise instructions for removing the injected script from the application.

13. The article of manufacture of claim 11, wherein the at least one scripting-language instruction of the script instructions further comprises a method extension, wherein the method extension corresponds to an invocation of a function of the computational model, and wherein the compiled script further comprises additional scripting-language code to replace the method extension with the invocation of the function of the computational model.

14. The article of manufacture of claim 11, wherein the instructions further comprise instructions for determining a function of the computational model based on one or more method descriptions.

15. The article of manufacture of claim 14, wherein the instructions further comprise instructions for determining a return value of the function of the computational model based on the one or more method descriptions.

16. A system, comprising:
   means for receiving an application, the application comprising a stack and a database, the stack comprising one or more pages for a user interface to the application; and
   means for executing the application comprising:
   means for locating a compiled script for the application based on a global identifier assigned to the compiled script, the compiled script including a scripting-language instruction for the application, wherein the global identifier comprises an application identifier for specifically identifying the application in a plurality of applications and an object identifier for specifically identifying an object of a computational model, and wherein the computational model is either the stack or the database;
   means for injecting the compiled script into the application;
means for executing the injected script in the application, wherein the injected script is configured to perform at least one transaction of the computational model,
   wherein the means for locating the compiled script comprises:
      means for determining that the script is to be compiled;
      means for requesting that the script be compiled comprises:
         means for receiving the script, the script comprising at least one scripting-language instruction for the application, wherein the at least one instruction comprises a script extension for specifying use of the computational model, wherein the script extension comprises a key character and an identifier of the computational model;
         means for determining the script extension within the script based on the key character;
         means for determining the identifier for the computational model specified by the script extension; and
         means for generating the compiled script corresponding to the script,
      wherein the
         compiled script comprises scripting-language code that replaces the script extension, and
         wherein the scripting-language code is configured to access the computational model identified by the identifier of the computational model; and
      means for receiving the compiled script, wherein the compiled script corresponds to the script.

17. The system of claim 16, wherein executing the application further comprises removing the injected script from the application.

18. The system of claim 16, wherein the at least one scripting-language instruction of the script further comprises a method extension, wherein the method extension corresponds to an
   invocation of a function of the computational model, and wherein the compiled script further comprises additional scripting-language code to replace the method extension with the invocation of the function of the computational model.

19. The system of claim 16, further comprising means for determining a function of
   the computational model based on one or more method descriptions.

20. The system of claim 19, further comprising means for determining a return value of the function of the computational model based on the one or more method descriptions.

* * * * *